United States Patent
Yoshida

(10) Patent No.: US 11,126,337 B2
(45) Date of Patent: *Sep. 21, 2021

(54) PICTURE DISPLAY CONTROL DEVICE, AND OPERATING PROGRAM AND OPERATING METHOD OF PICTURE DISPLAY CONTROL DEVICE

(71) Applicant: FUJIFILM Corporation, Tokyo (JP)

(72) Inventor: Masako Yoshida, Tokyo (JP)

(73) Assignee: FUJIFILM Corporation, Tokyo (JP)

(*) Notice: Subject to any disclaimer, the term of this patent is extended or adjusted under 35 U.S.C. 154(b) by 92 days.

This patent is subject to a terminal disclaimer.

(21) Appl. No.: 16/574,787

(22) Filed: Sep. 18, 2019

(65) Prior Publication Data

US 2020/0097158 A1 Mar. 26, 2020

(30) Foreign Application Priority Data

Sep. 25, 2018 (JP) .............................. JP2018-179079

(51) Int. Cl.
*G06F 3/0484* (2013.01)
*G06F 3/0488* (2013.01)
*G06F 3/0485* (2013.01)

(52) U.S. Cl.
CPC ........ *G06F 3/04845* (2013.01); *G06F 3/0485* (2013.01); *G06F 3/04883* (2013.01)

(58) Field of Classification Search
None
See application file for complete search history.

(56) References Cited

U.S. PATENT DOCUMENTS

2002/0033848 A1* 3/2002 Sciammarella ....... G06F 3/0481
715/838
2005/0190280 A1 9/2005 Haas et al.
(Continued)

FOREIGN PATENT DOCUMENTS

JP 2001-306375 A 11/2001
JP 2007-005864 A 1/2007
(Continued)

OTHER PUBLICATIONS

An Office Action; "Notice of Reasons for Refusal", mailed by the Japanese Patent Office dated Jun. 1, 2021, which corresponds to Japanese Patent Application No. 2018-179079 and is related to U.S. Appl. No. 16/574,787; with English language translation.

*Primary Examiner* — Peter Hoang
(74) *Attorney, Agent, or Firm* — Studebaker & Brackett PC

(57) ABSTRACT

A picture display control device includes a screen generation unit, a picture designation acceptance unit, an operation acceptance unit, and a scroll processing unit. The screen generation unit generates a picture arrangement screen on which a plurality of picture display cells in which pictures are disposed frame by frame are arranged in a grid shape. The picture designation acceptance unit accepts designation of a picture. The operation acceptance unit accepts an execution instruction to perform scroll processing of replacing a picture to be disposed on the picture arrangement screen. The scroll processing unit executes the scroll processing for other pictures in the picture arrangement screen in a state where a scroll lock for fixing a disposition position in the picture arrangement screen is set to the picture subjected to the designation operation.

14 Claims, 64 Drawing Sheets

(56) References Cited

U.S. PATENT DOCUMENTS

2013/0238964 A1    9/2013   Perrodin et al.
2018/0143734 A1*   5/2018   Ochenas ............. G06F 3/04817

FOREIGN PATENT DOCUMENTS

| JP | 2014-232379 A | 12/2014 |
| JP | 2015-518590 A | 7/2015 |
| JP | 2017-117479 A | 6/2017 |

* cited by examiner

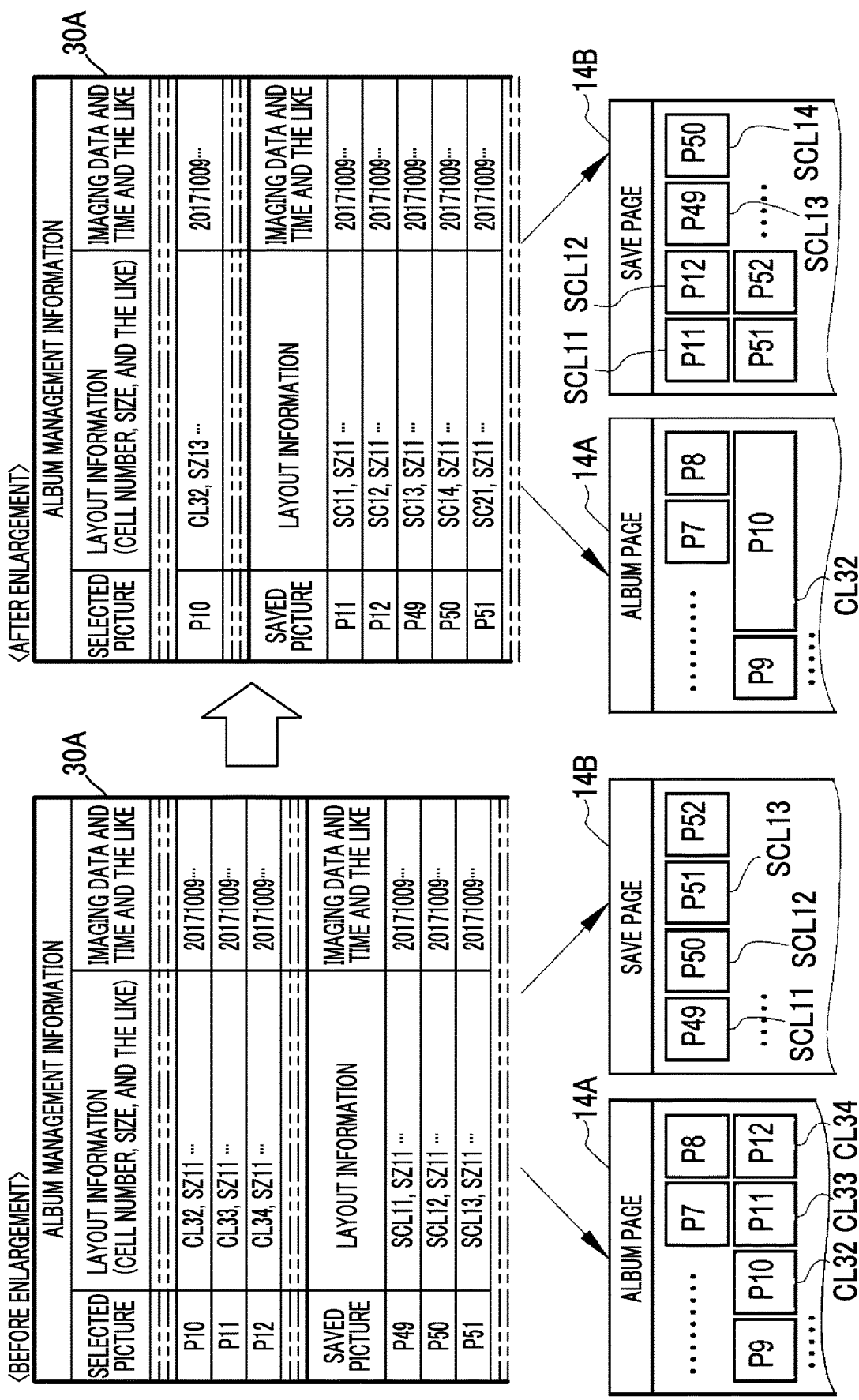

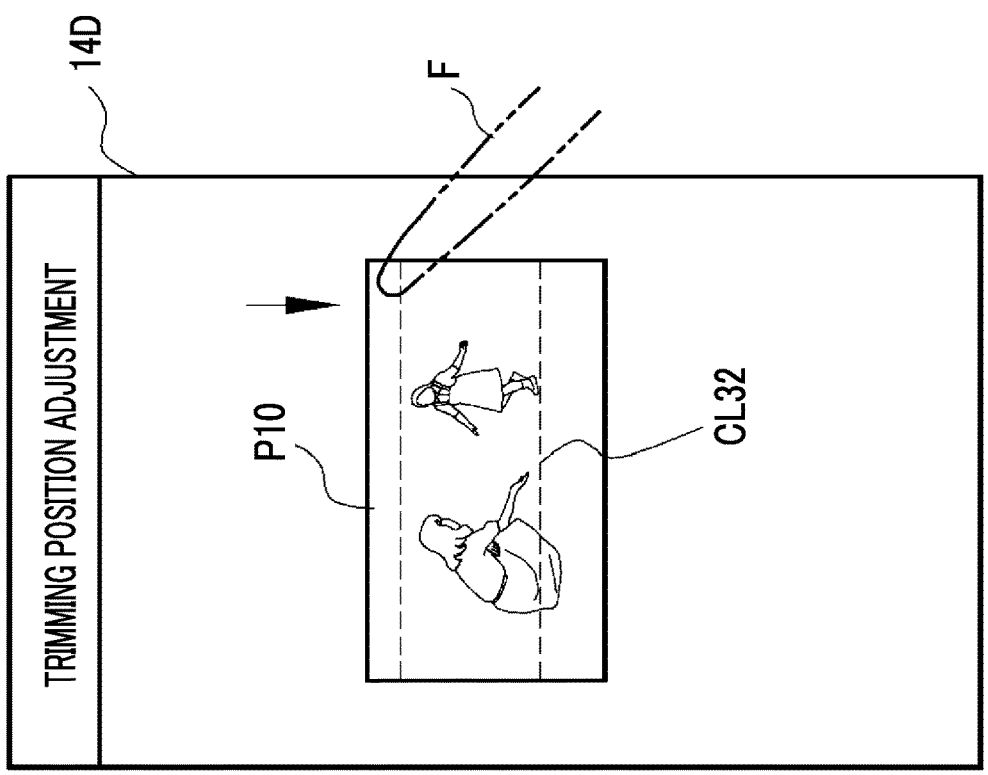
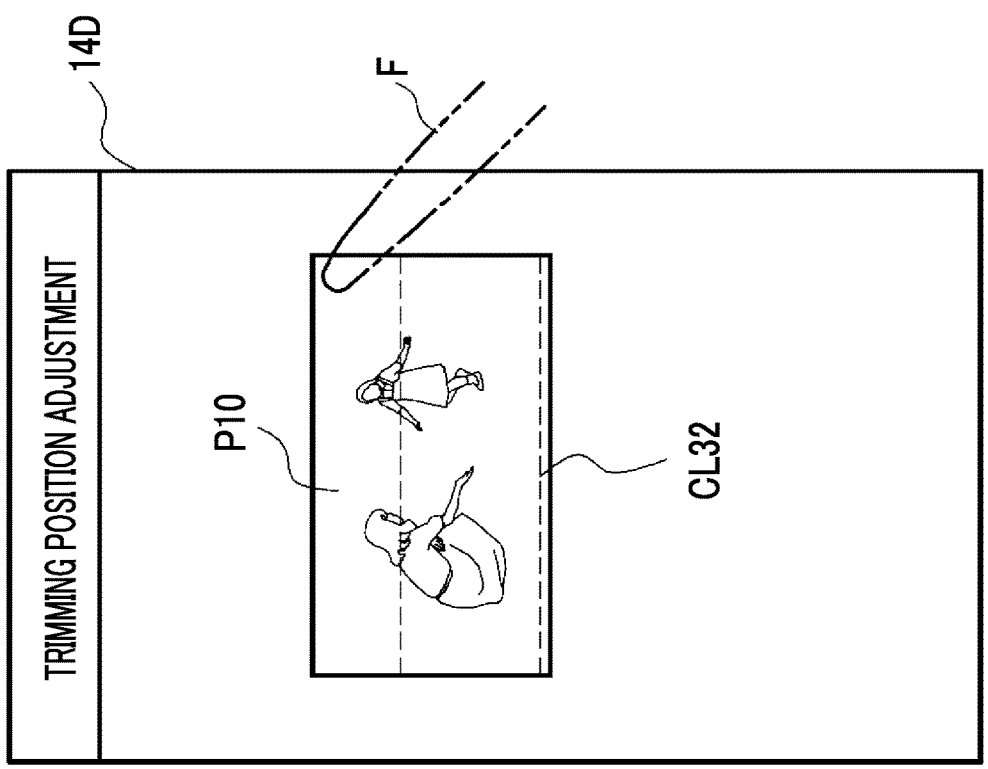

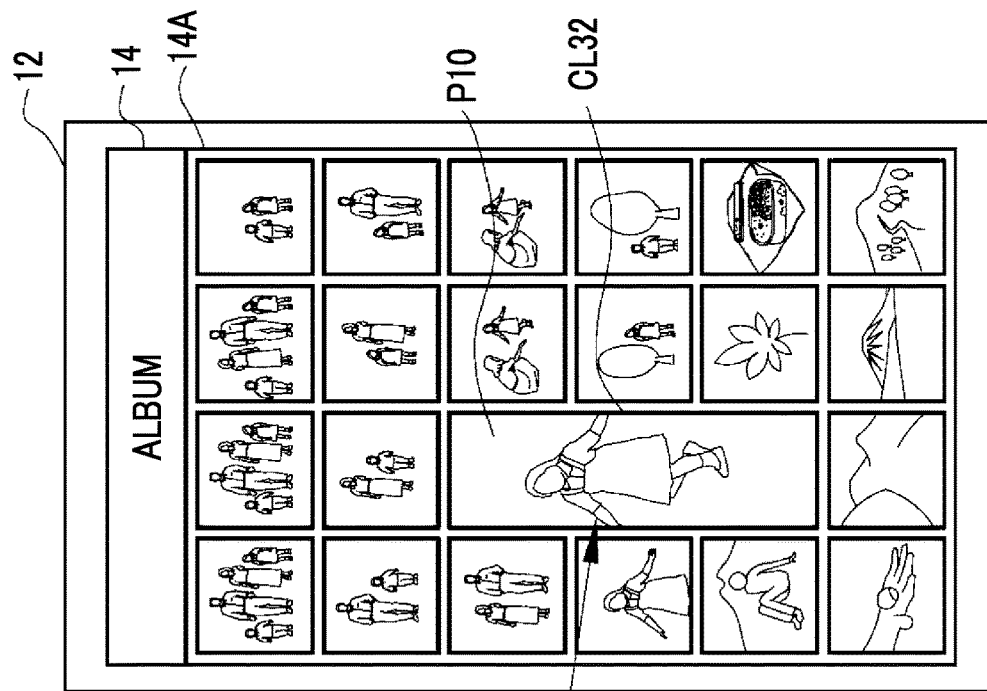
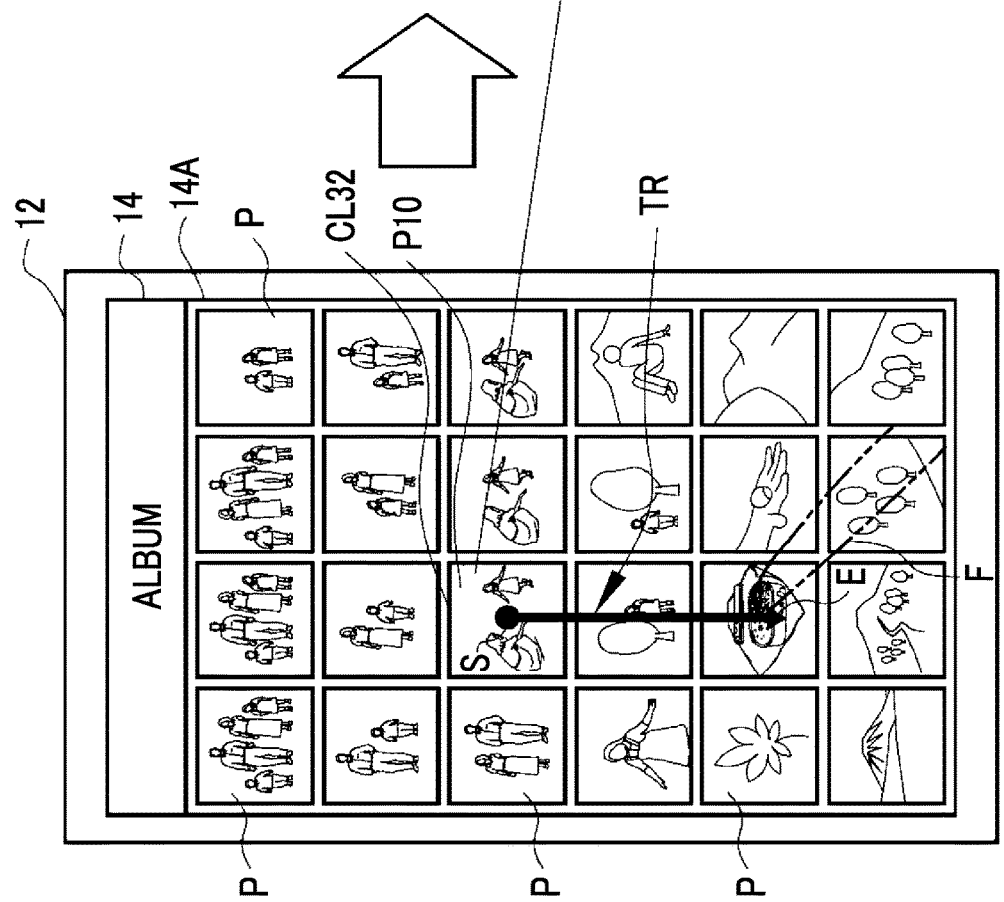

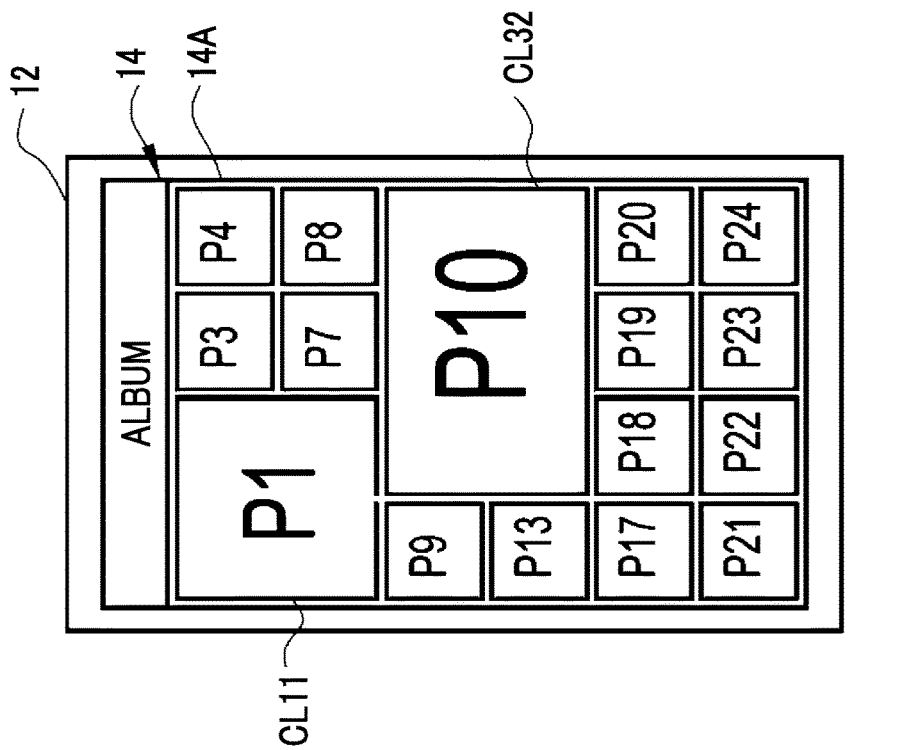
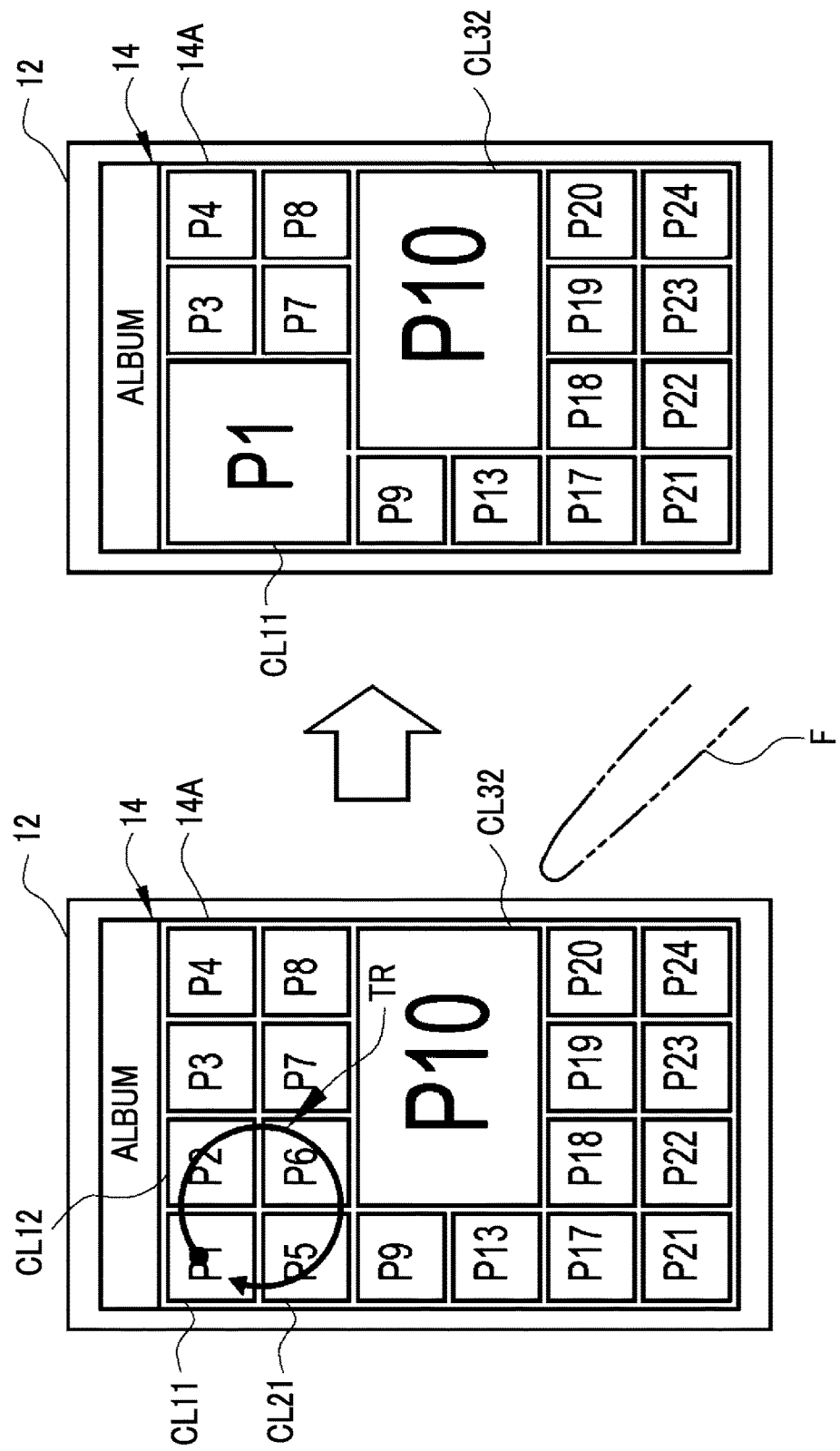

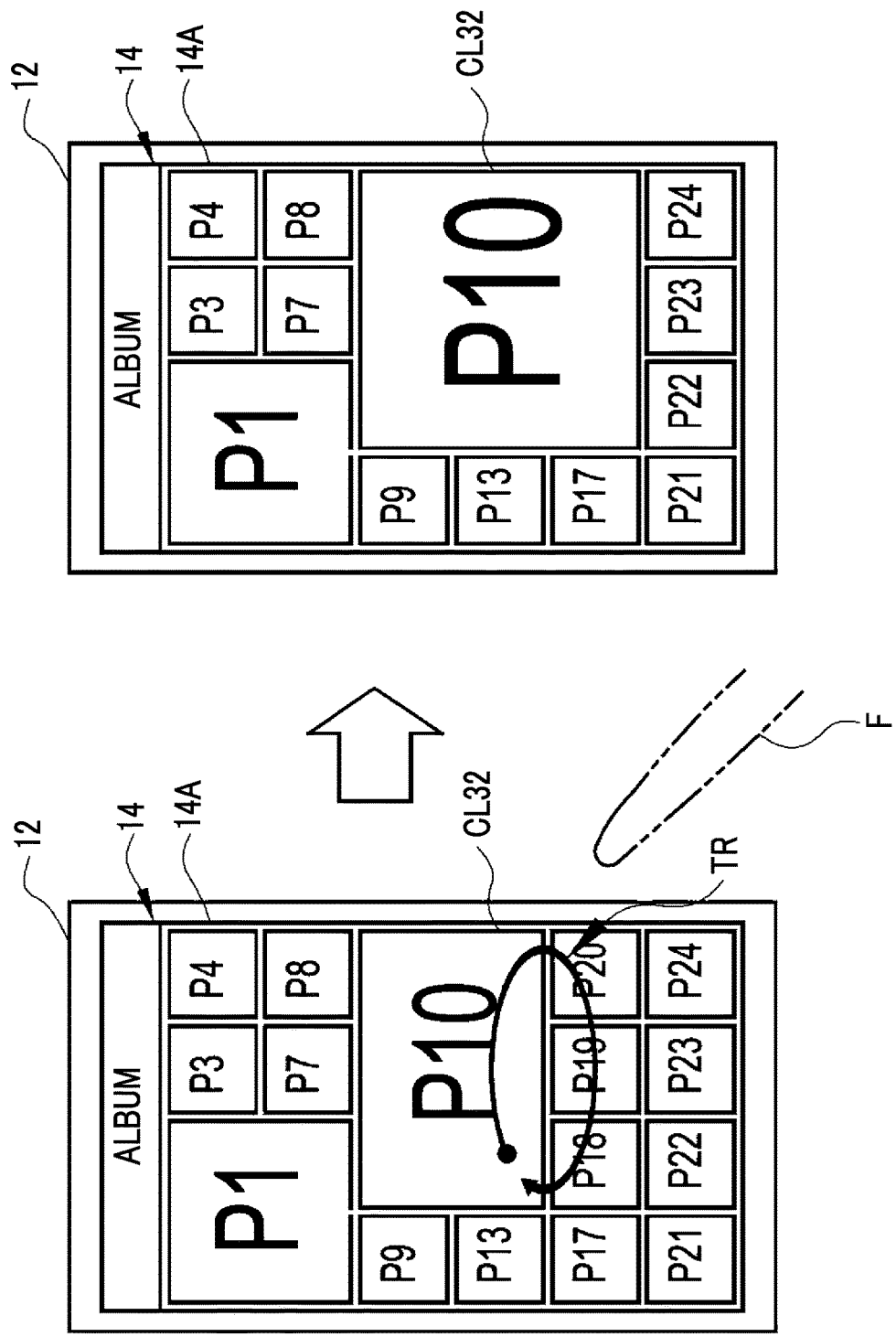

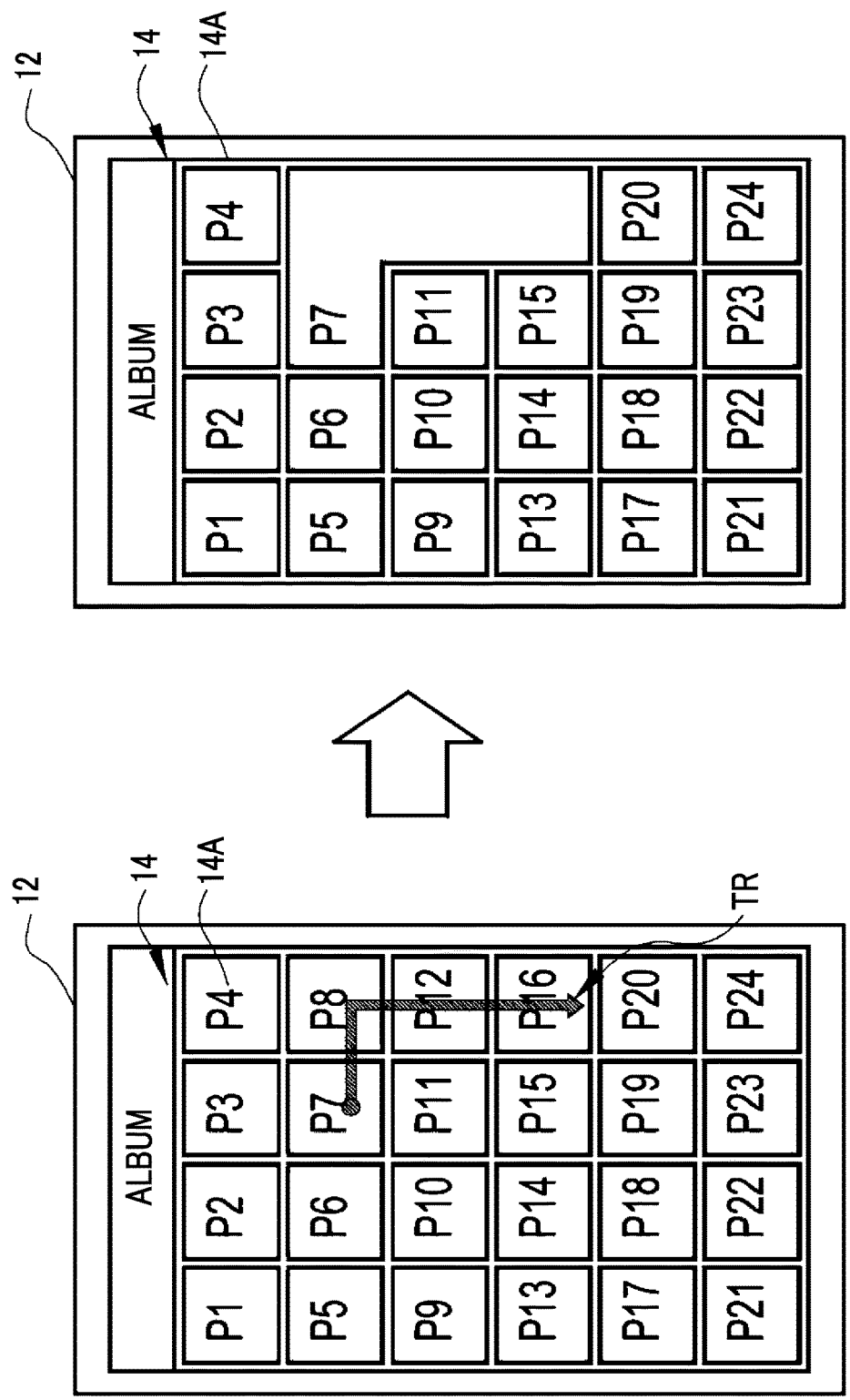

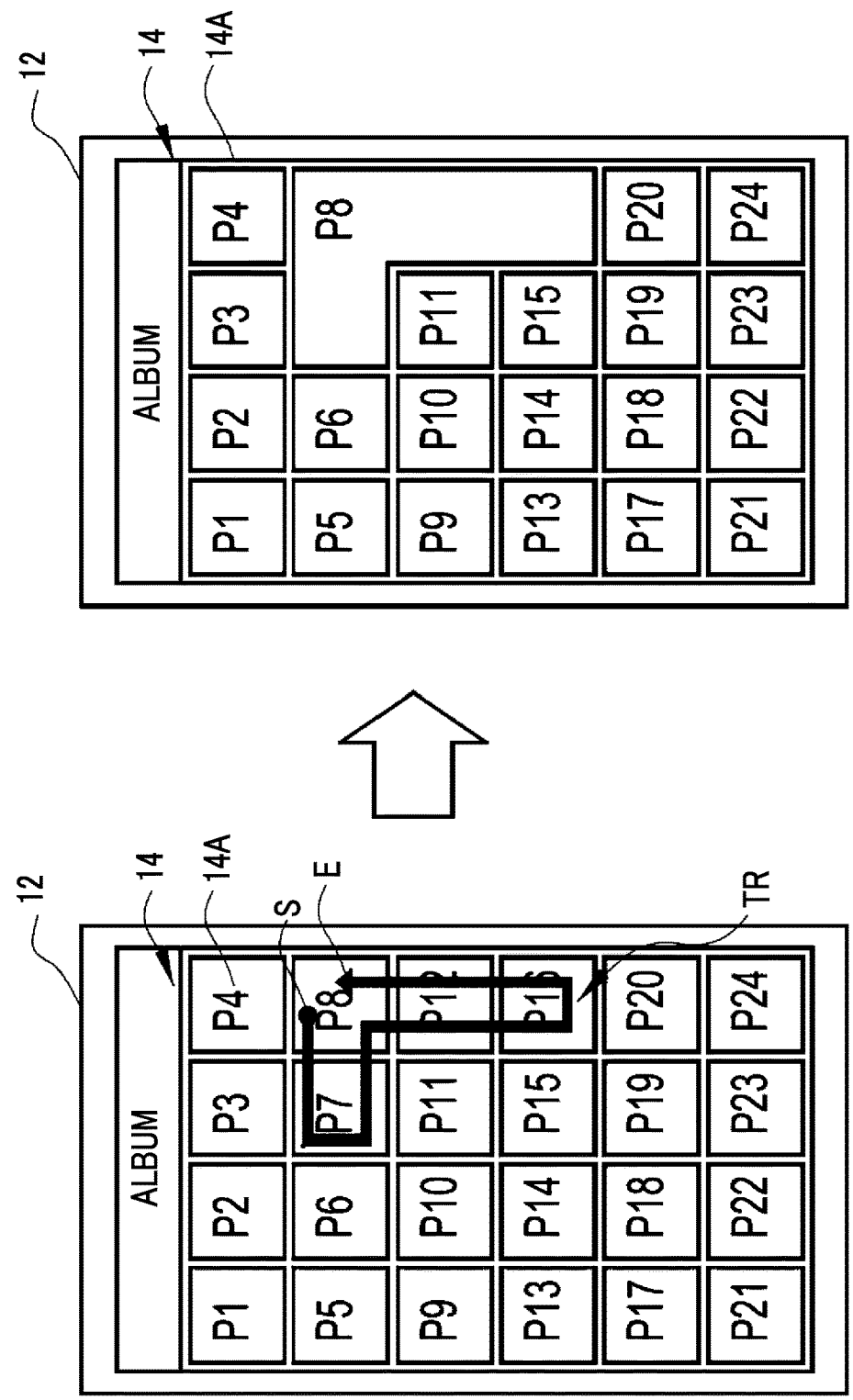

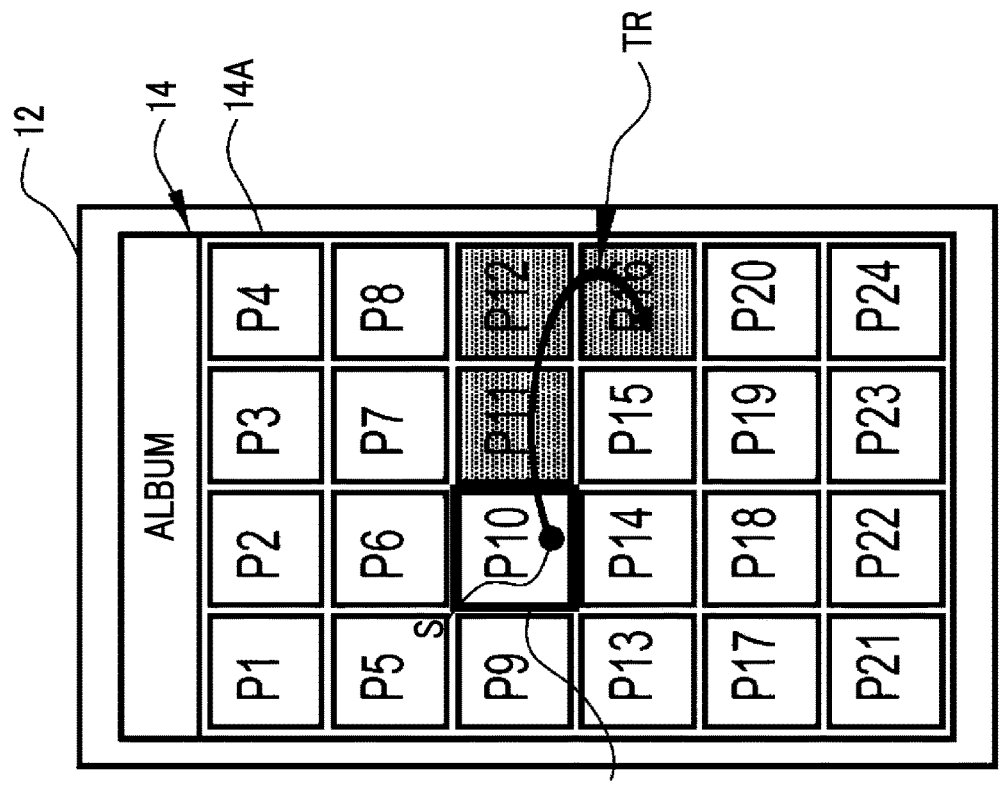
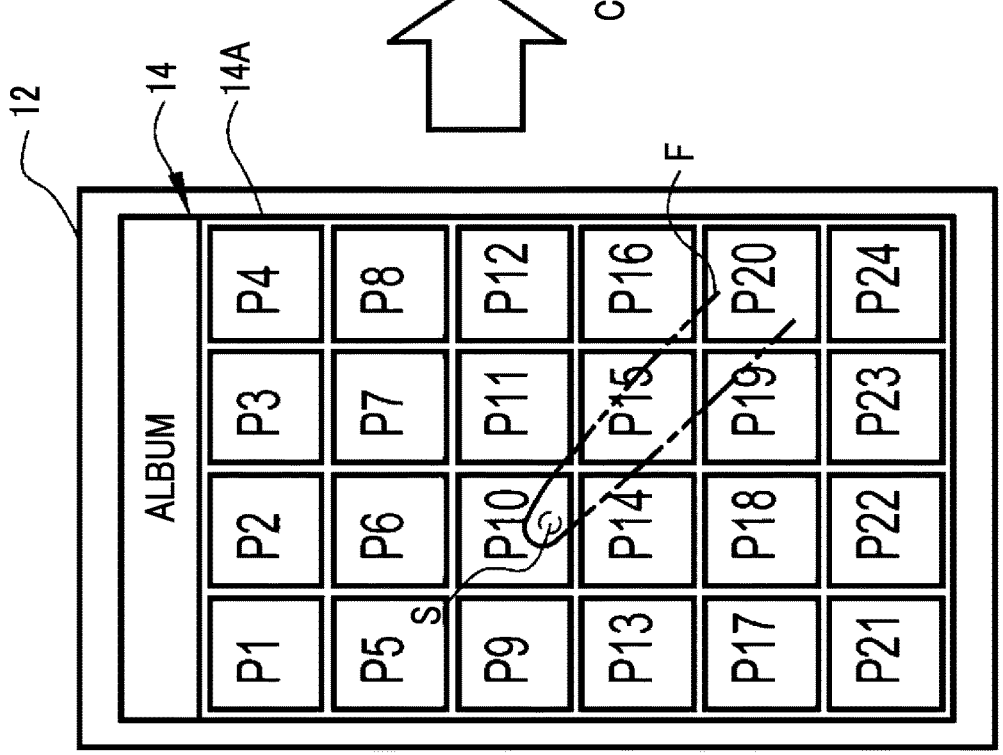

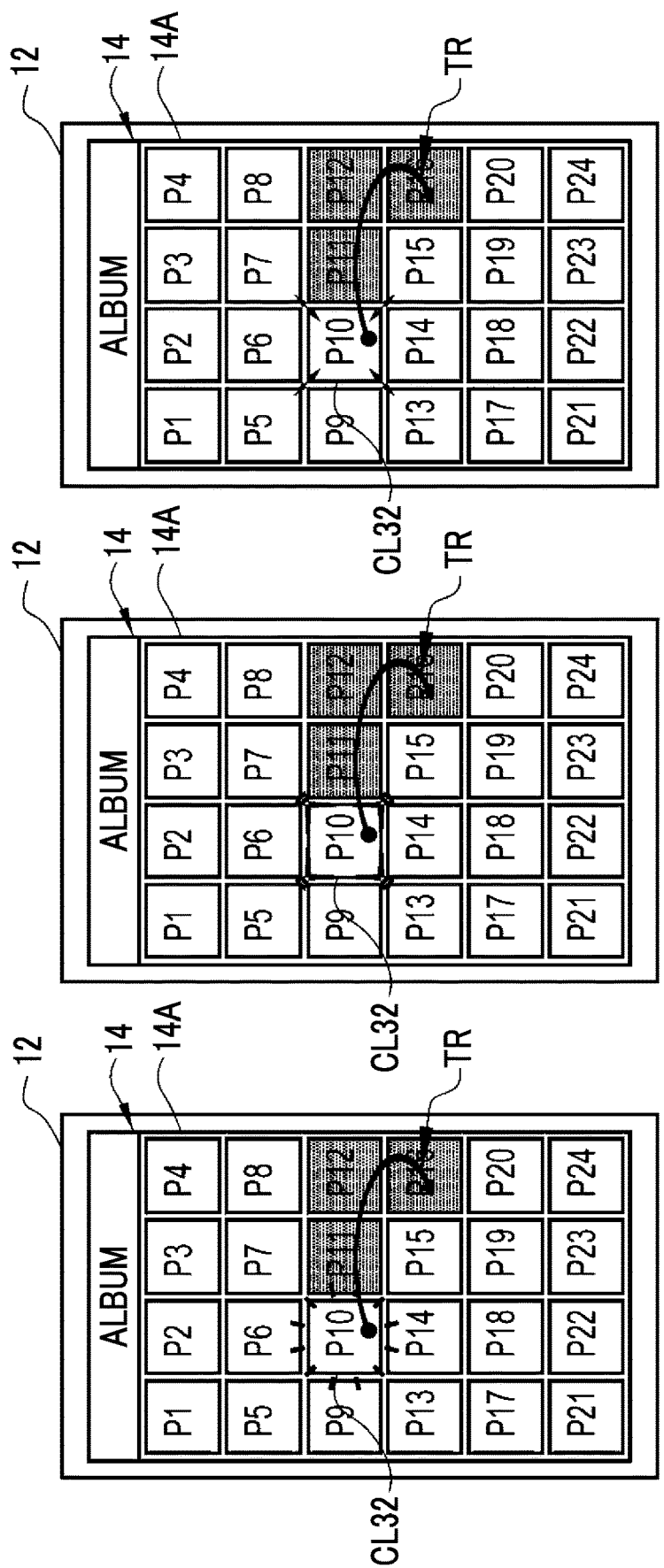

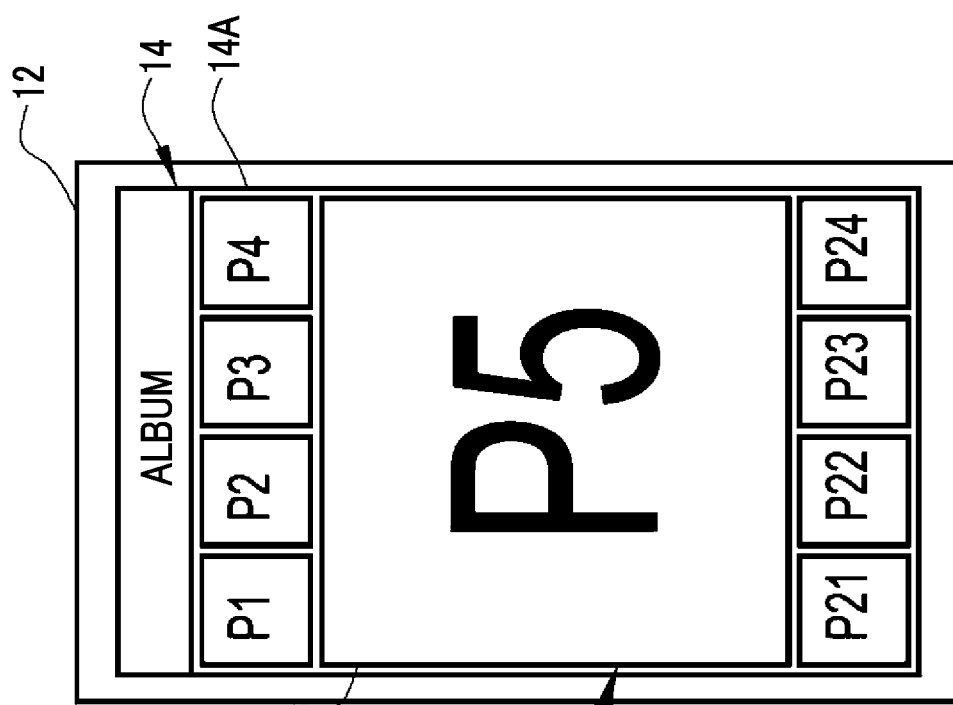
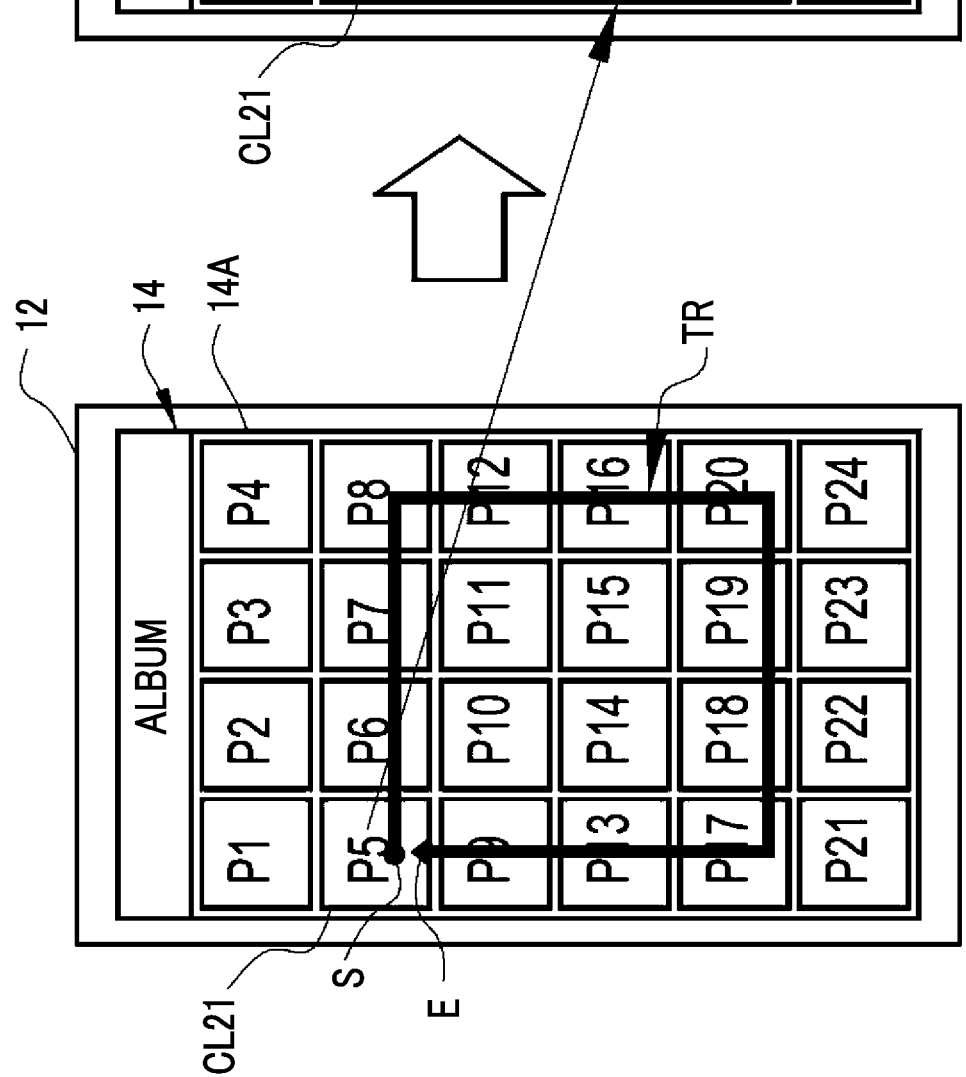

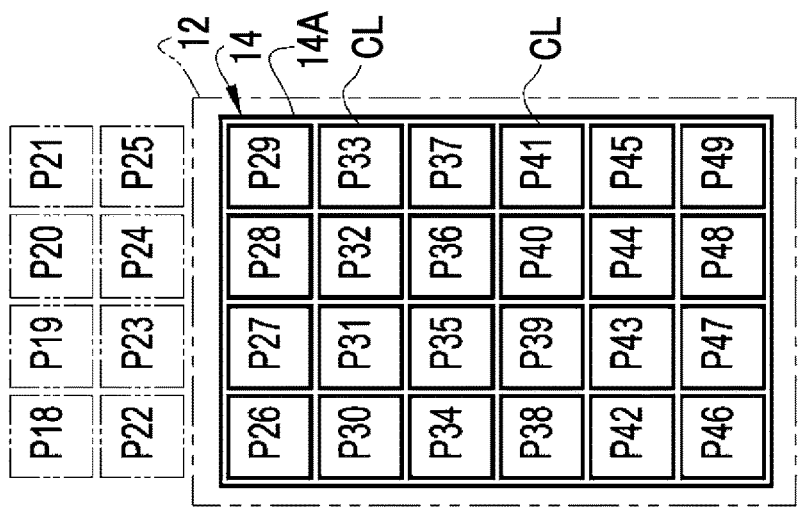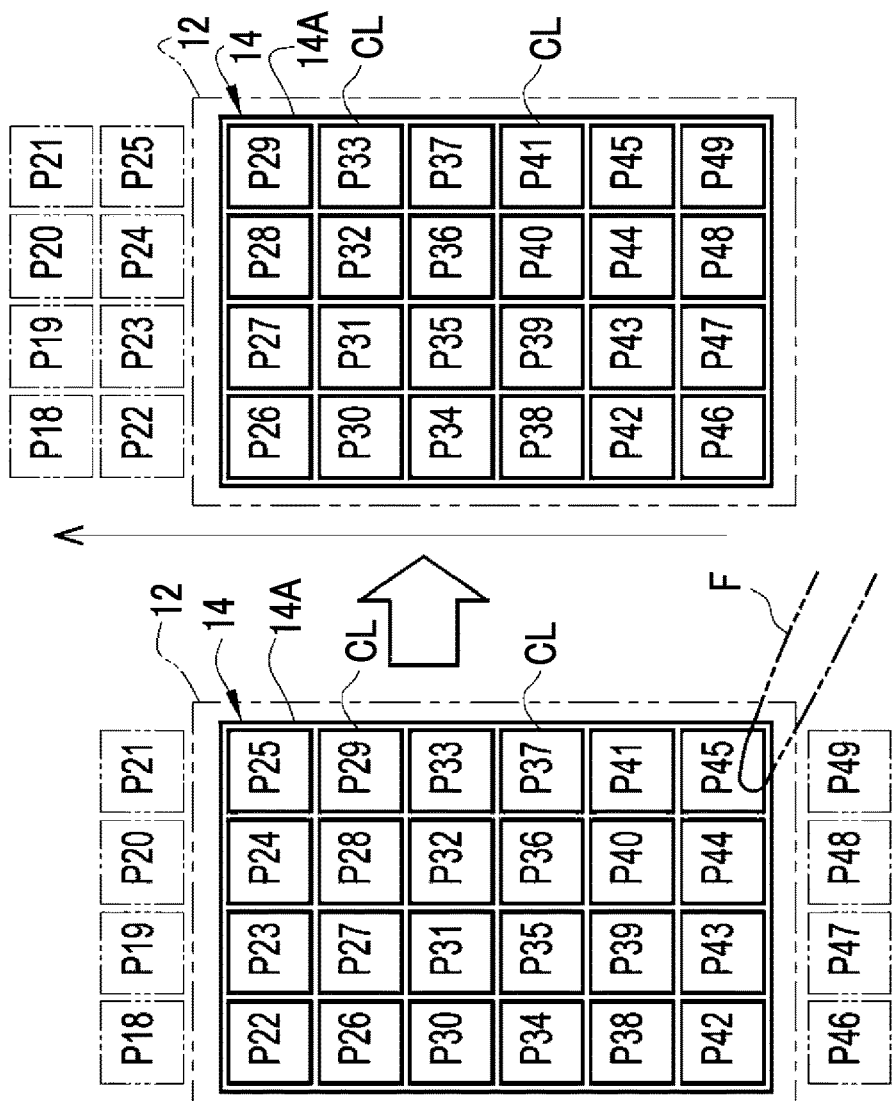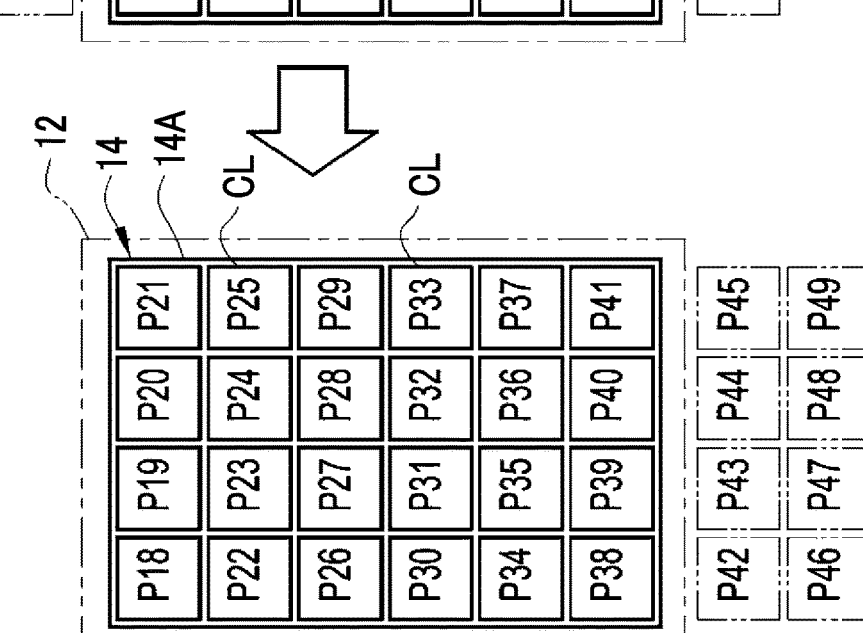

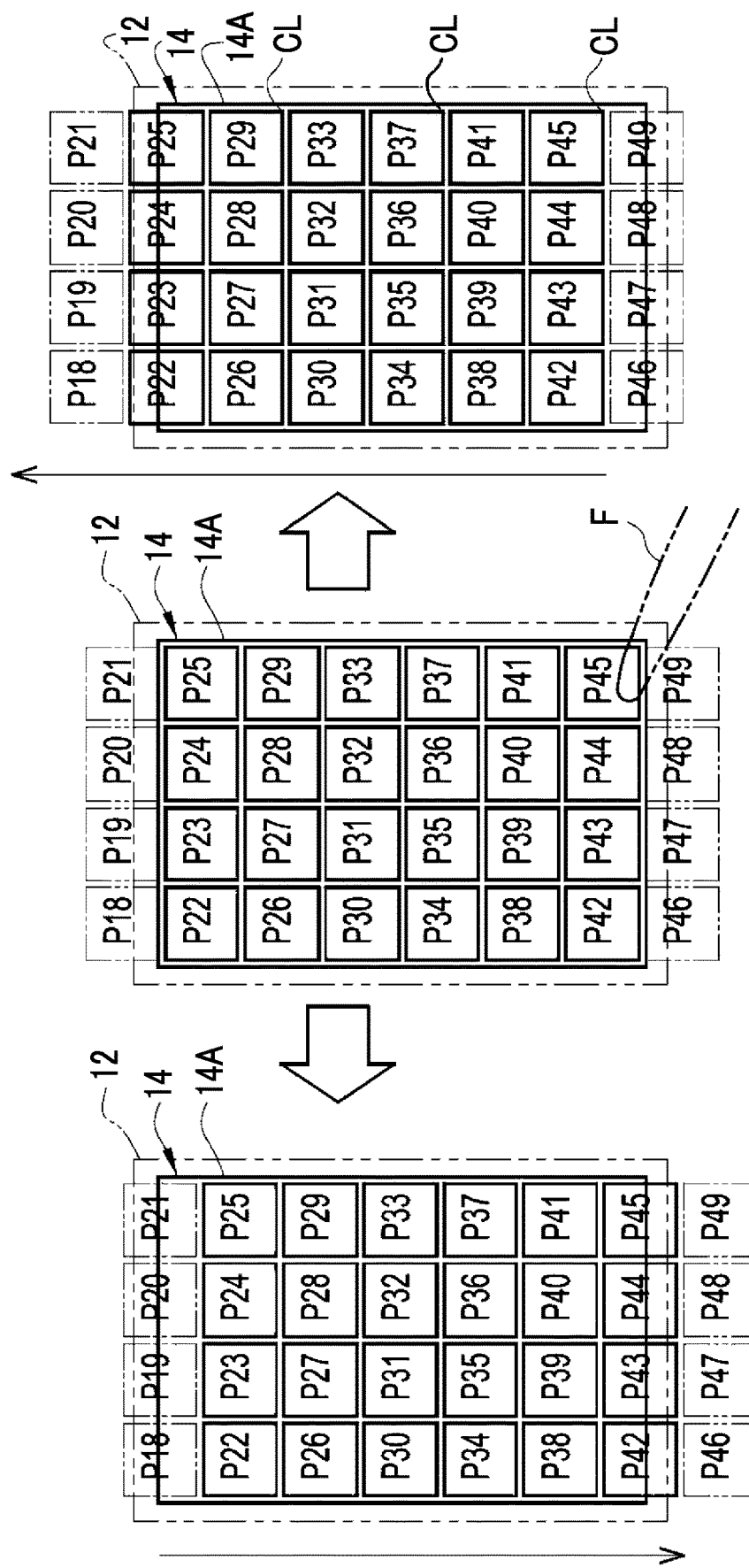

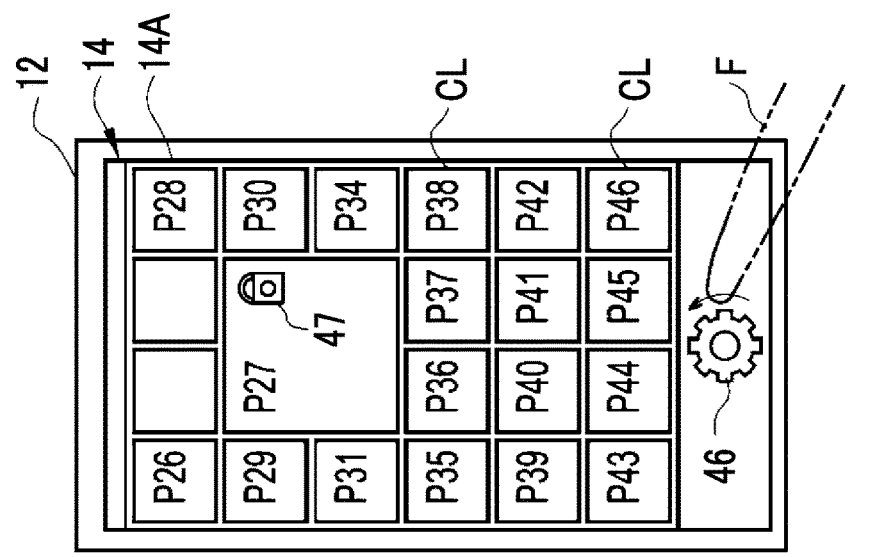
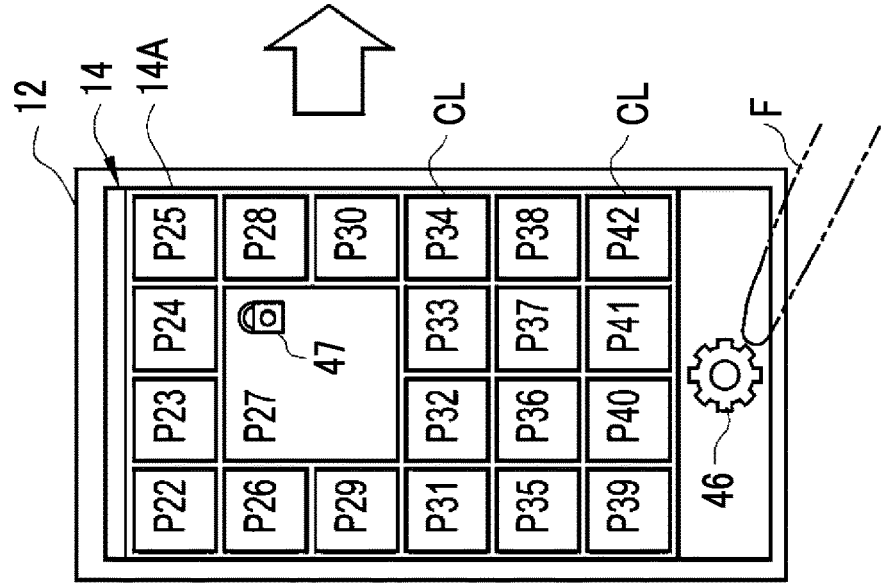
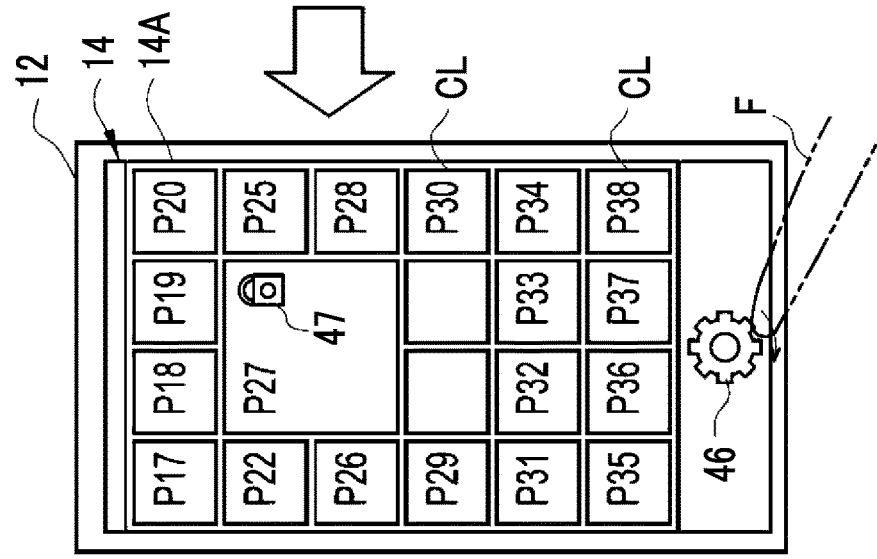

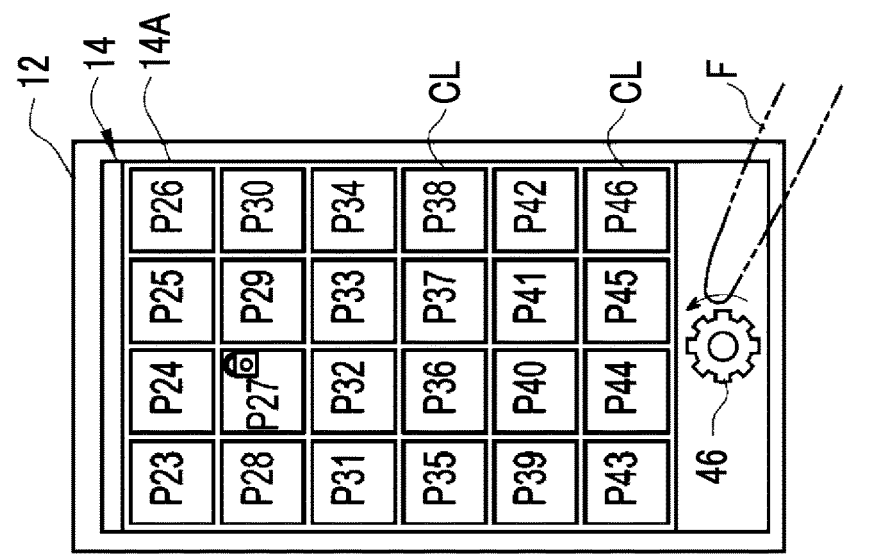
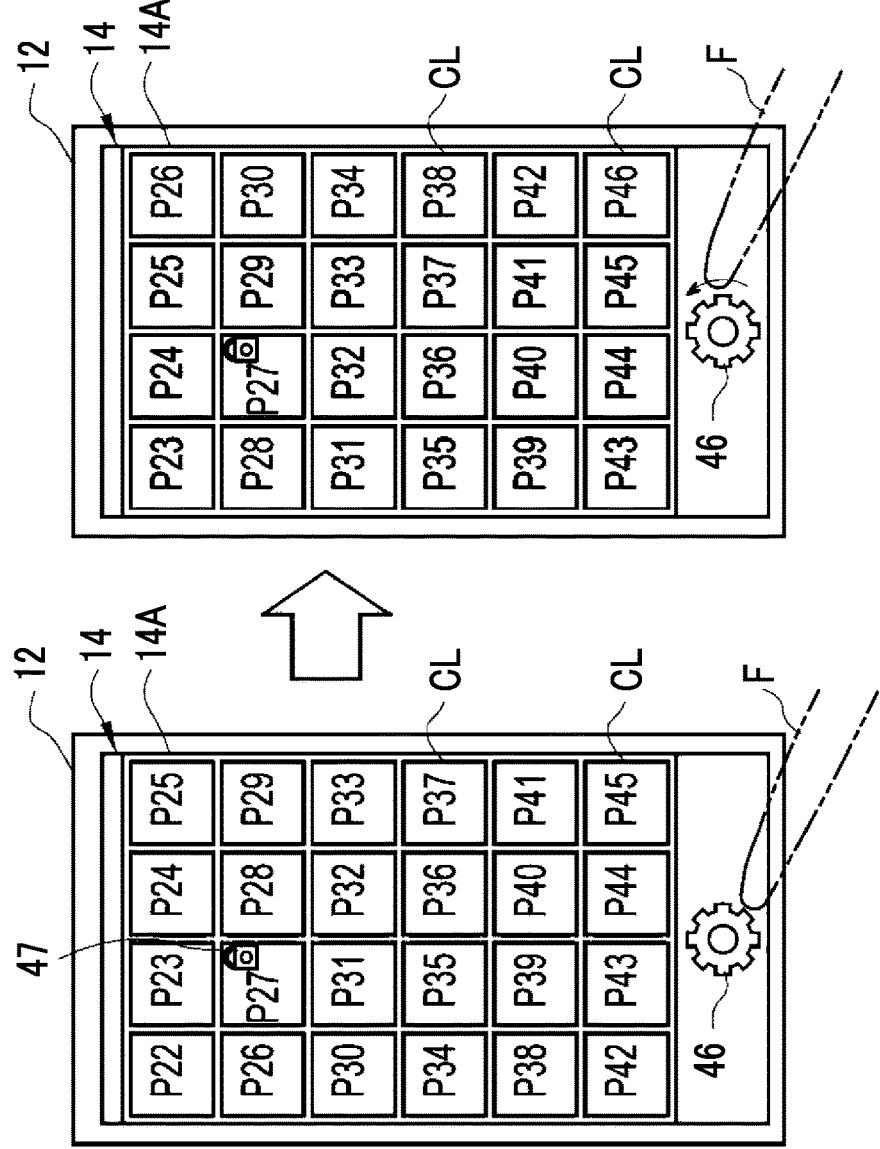
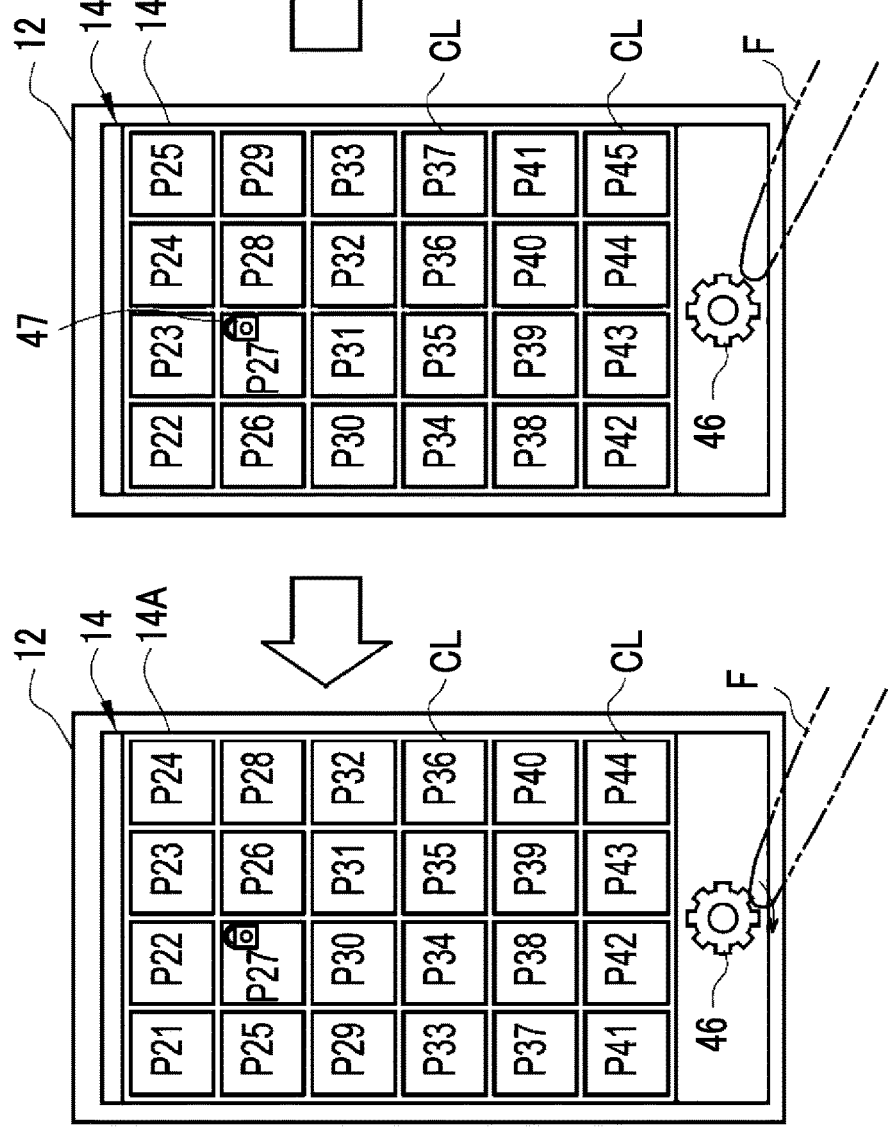

PICTURE DISPLAY CONTROL DEVICE, AND OPERATING PROGRAM AND OPERATING METHOD OF PICTURE DISPLAY CONTROL DEVICE

CROSS-REFERENCE TO RELATED APPLICATIONS

The present application claims priority under 35 U.S.C. § 119 to Japanese Patent Application No. 2018-179079 filed on Sep. 25, 2018. The above application is hereby expressly incorporated by reference, in its entirety, into the present application.

BACKGROUND

1. Technical Field

A technique of the present disclosure relates to a picture display control device, and an operating program and an operating method of a picture display control device.

2. Description of the Related Art

A portable information terminal such as a smartphone or a tablet terminal comprises a function of displaying a picture display page on which a plurality of pictures such as imaged photographs are arranged on a display unit (for example, JP2017-117479A). On the picture display page, for example, a plurality of pictures stored in a memory in a portable information terminal are arranged in a grid shape. It is possible to scroll such a picture display page with respect to the display unit.

SUMMARY

In some cases, such a portable information terminal is provided with a picture layout edit function of selecting a plurality of favorite pictures selected by a user to dispose the selected pictures on the picture display page. It is possible for the user to create an edited picture display page on which the favorite pictures are laid out using such an edit function. For enjoyment, it is possible for the user to print the created picture display page to send the printed page to an acquaintance as a photograph print, or store data of the created picture display page to reproduce and view the picture display page on the display unit later.

In a case where such a picture layout edit is performed, a scroll function is frequently used in a case of performing a picture search for finding a favorite picture. In a picture display control device, an imaged picture is stored in a memory, and a plurality of pictures read from the memory are, for example, arranged and displayed in time series on a picture display page. A user searches for the favorite picture in the memory while scrolling the picture display page.

However, in the case where the portable information terminal is used, there is a problem that it is difficult to search for a plurality of pictures only with the scroll function in the related art.

For example, in a case of searching for a plurality of favorite pictures, the scroll is repeated such as one picture is found and then the picture display page is further scrolled to search for a next picture. In the case, in a case where the scroll is performed to search for the next favorite picture, the selected first favorite picture disappears from the display unit since the scroll is performed including the selected first favorite picture. Consequently, it is impossible to always display the selected favorite picture on the display unit. Therefore, it is necessary to repeat the scroll for checking the selected first picture and thus it is difficult to search for the plurality of pictures.

In a case of a device having a large display unit in screen size, such as a desktop personal computer, compared with the picture display control device, it is possible to cope with such a problem by using a screen division function. For example, with the screen division function, one screen is set as a selection screen that displays the pictures in the memory for selection and the other screen is set as an edit screen that disposes a favorite picture selected from the selection screen. With this, since the picture once disposed on the edit screen is not scrolled even in a case where the scroll is repeated on the selection screen, it is possible to display the favorite picture selected once on the edit screen.

On the contrary, the portable information terminal has a small display unit in screen size compared with the desktop personal computer and thus it is difficult to divide the screen thereof. Even in a case where the screen division function can be used, the visibility of the picture is poor since one screen is small. Therefore, there is a demand for a technique of easily searching for the plurality of pictures even in a case where the screen is small as in the portable information terminal.

An object of a technique of the disclosure is to provide a picture display control device, and an operating program and an operating method of a picture display control device capable of easily searching for a plurality of pictures even in a case where a screen is small.

In order to achieve the above object, a picture display control device of the disclosure comprises a screen generation unit that generates a picture arrangement screen on which a plurality of picture display cells in which pictures are disposed frame by frame are arranged and which is displayed on a display unit, a picture designation acceptance unit that accepts a designation operation to designate the picture disposed at least one picture display cell in the picture arrangement screen, an operation acceptance unit that accepts an execution instruction to perform scroll processing of replacing the picture to be disposed on the picture arrangement screen, and a scroll processing unit that executes the scroll processing in a case where the operation acceptance unit accepts the execution instruction, in which the scroll processing is executed for other pictures in the picture arrangement screen in a state where a scroll lock for fixing a disposition position in the picture arrangement screen is set to the picture subjected to the designation operation.

It is preferable that the picture to which the scroll lock is set and other pictures are displayed in an identifiable manner at least during the execution of the scroll processing on the picture arrangement screen.

It is preferable that the operation acceptance unit accepts the execution instruction to perform the scroll processing through a touch operation on the display unit.

It is preferable that the picture display control device has a function of editing a picture layout in the picture arrangement screen.

It is preferable that the edit of the picture layout includes at least one of enlargement, deletion, or movement of the picture.

It is preferable that the edit of the picture layout is prohibited for the picture to which the scroll lock is set.

It is preferable that the scroll lock is settable also to the enlarged picture.

It is preferable that the scroll lock is set to the enlarged picture in a case where the picture is enlarged.

It is preferable that the picture which is a target of the scroll lock includes a picture representing a mark or a character string in addition to a photograph, and the mark includes at least one of a character, a figure, a pattern, or combinations of two or more items selected among these items.

It is preferable that the picture display control device has a function of issuing an instruction to store the picture arrangement screen as data or an instruction to print the picture arrangement screen.

It is preferable that the data of the picture arrangement screen is storable as template data in a state where the picture display cell for which the picture to be disposed is not designated is included and only a layout of the picture display cell in the picture arrangement screen is decided.

It is preferable that a plurality of picture display cells are arranged in a grid shape on the picture arrangement screen, and the scroll processing unit executes the scroll processing by shifting a disposition position of each pictures frame by frame while an arrangement state of the plurality of picture display cells on the display unit is maintained.

An operating program of a picture display control device of the disclosure causes a computer to function as the picture display control device comprising a screen generation unit that generates a picture arrangement screen on which a plurality of picture display cells in which pictures are disposed frame by frame are arranged and which is displayed on a display unit, a picture designation acceptance unit that accepts a designation operation to designate the picture disposed at least one picture display cell in the picture arrangement screen, an operation acceptance unit that accepts an execution instruction to perform scroll processing of replacing the picture to be disposed on the picture arrangement screen, and a scroll processing unit that executes the scroll processing in a case where the operation acceptance unit accepts the execution instruction, in which the scroll processing is executed for other pictures in the picture arrangement screen in a state where a scroll lock for fixing a disposition position in the picture arrangement screen is set to the picture subjected to the designation operation.

An operating method of a picture display control device of the disclosure comprises a screen generation step of generating a picture arrangement screen on which a plurality of picture display cells in which pictures are disposed frame by frame are arranged and which is displayed on a display unit, picture designation acceptance step of accepting a designation operation to designate the picture disposed at least one picture display cell in the picture arrangement screen, an operation acceptance step of accepting an execution instruction to perform scroll processing of replacing the picture to be disposed on the picture arrangement screen, and a scroll processing step of executing the scroll processing in a case where the execution instruction is accepted in the operation acceptance step, and executing the scroll processing for other pictures in the picture arrangement screen in a state where a scroll lock for fixing a disposition position in the picture arrangement screen is set to the picture subjected to the designation operation.

With the technique of the disclosure, it is possible to provide the picture display control device, and the operating program and the operating method of the picture display control device capable of easily searching for the plurality of pictures even in the case where the screen is small.

BRIEF DESCRIPTION OF THE DRAWINGS

Exemplary embodiments according to the technique of the present disclosure will be described in detail based on the following figures, wherein:

FIG. 5A is an explanatory diagram of an edit menu that performs an instruction to select or save the picture on the album screen. FIG. 5B is an explanatory diagram showing a state where the album screen is divided into the album page and a save page;

FIG. 6A is an explanatory diagram of an operation of selecting a picture to register the picture on the album page. FIG. 6B is an explanatory diagram of an operation of saving the picture from the album page;

FIG. 7A shows a state before the enlargement, and FIG. 7B shows a state after the enlargement;

FIG. 8A shows a designation operation of an enlargement target, FIG. 8B shows the designation operation of an enlargement area, and FIG. 8C shows the state after the enlargement;

FIGS. 9A and 9B are explanatory diagrams showing changes in album management information in a case where the operations of FIG. 8 are performed. FIG. 9A shows the album management information before the enlargement, and FIG. 9B shows the album management information after the enlargement;

FIGS. 11A and 11B are explanatory diagrams of an adjustment method of a trimming position. FIGS. 11A and 11B show states where a display cell CL and a picture P are relatively moved;

FIGS. 12A and 12B are explanatory diagrams of processing of enlarging the display cell having the reference size to a size of three rows and one column. FIG. 12A shows a state before the enlargement, and FIG. 12B shows a state after the enlargement;

FIG. 13A shows the designation operation of an enlargement area, and FIG. 13B shows the state after the enlargement;

FIG. 15A shows a state before the enlargement, and FIG. 15B shows a state after the enlargement;

FIG. 16A shows the designation operation of an enlargement area, and FIG. 16B shows the state after the enlargement;

FIG. 21A shows a state before the enlargement, and FIG. 21B shows a state after the enlargement;

FIGS. 22A and 22B are schematic diagrams showing an operation of the processing of FIG. 21. FIG. 22A shows the designation operation of an enlargement area, and FIG. 22B shows the state after the enlargement;

FIG. 23A shows the designation operation of an enlargement area, and FIG. 23B shows a state after the enlargement;

FIGS. 24A and 24B are schematic diagrams showing an operation of the processing of FIG. 23. FIG. 24A shows the designation operation of an enlargement area, and FIG. 24B shows the state after the enlargement;

FIG. 25A shows the designation operation of an enlargement area, and FIG. 25B shows a state after the enlargement;

FIGS. 26A and 26B are diagrams showing an example that sets the enlargement area to a key type. FIG. 26A shows a trajectory of a swipe gesture, and FIG. 26B shows a state after the enlargement;

FIGS. 28A and 28B are diagrams showing a designation method of the key type enlargement area. FIG. 28A shows a trajectory of a swipe gesture, and FIG. 28B shows a state after the enlargement;

FIGS. 29A, 29B, and 29C are diagrams showing a first modification example of the designation method of the key type enlargement area. FIG. 29A shows a trajectory of a first-stage swipe gesture, and FIG. 29B shows a trajectory of a second-stage swipe gesture.

FIG. 29C shows the state after the enlargement;

FIG. 30A shows a state before replacement of a picture, and FIG. 30B shows a state after the replacement of the picture;

FIG. 31A shows a trajectory of the swipe gesture, FIG. 31B shows a state where an enlargement target is designated, and FIG. 31C shows a state after the enlargement;

FIG. 32A shows the designation operation of the enlargement area, and FIG. 32B shows a state after the enlargement;

FIGS. 33A and 33B are explanatory diagrams of an example of identifying and displaying an enlargement target. FIG. 33A shows the designation operation of an enlargement area, and FIG. 33B shows a state after the enlargement;

FIGS. 34A, 34B, and 34C are explanatory diagrams of a modification example of identifying and displaying the enlargement target. Examples of identifying and displaying the enlargement target are respectively shown by flickering in FIG. 34A, by vibration in FIG. 34B, and by expansion and contraction in FIG. 34C;

FIG. 35A shows an example of reducing transparency of a display cell, and FIG. 35B shows an example of displaying a trajectory;

FIG. 36A shows the designation method of the enlargement target, FIG. 36B shows the designation operation of an enlargement area, and FIG. 36C shows a state after the enlargement;

FIG. 37A shows the designation method of the enlargement target, FIG. 37B shows the designation operation of an enlargement area, and FIG. 36C shows a state after the enlargement;

FIGS. 38A and 38B are explanatory diagrams showing a modification example of the enlargement area designation method according to the second embodiment. FIG. 38A shows the designation operation of an enlargement area, and FIG. 38B shows a state after the enlargement;

FIGS. 40A, 40B, and 40C are diagrams showing a row unit scroll. FIG. 40A shows a state where a row older than FIG. 40B is displayed, and FIG. 40B shows a reference state. FIG. 40C shows a state where a row newer than FIG. 40B is displayed;

FIGS. 41A, 41B, and 41C are diagrams showing a continuous page scroll. FIG. 41A shows a state where a page is moved in a direction older than FIG. 41B, and FIG. 41B shows a reference state. FIG. 41C shows a state where a page is moved in a direction newer than FIG. 41B;

FIG. 45A shows a state where a frame older than FIG. 45B is displayed, and FIG. 45B shows a reference state. FIG. 45C shows a state where a frame newer than FIG. 45B is displayed;

FIG. 48A shows an initial state before a scroll start. FIG. 48B shows a state where the display cells are contracted;

FIG. 49A shows a performance of disturbing an arrangement state of the display cells, and FIG. 49B shows the arrangement state after a scroll completion;

FIG. 54A shows the scroll in the return direction with FIG. 54B as the reference. FIG. 54B shows a reference state. FIG. 54C shows the scroll in the feed direction with FIG. 54B as the reference;

FIG. 56A shows the scroll in the return direction with FIG. 56B as the reference, and FIG. 56B shows a reference state. FIG. 56C shows the scroll in the feed direction with FIG. 56B as the reference;

FIGS. 57A, 57B, and 57C are diagrams showing an example of combining the scroll lock and the row unit scroll;

FIGS. 58A, 58B, and 58C are diagrams showing an example of setting the scroll lock to a picture that is not enlarged;

DETAILED DESCRIPTION

First Embodiment

Figure 1:
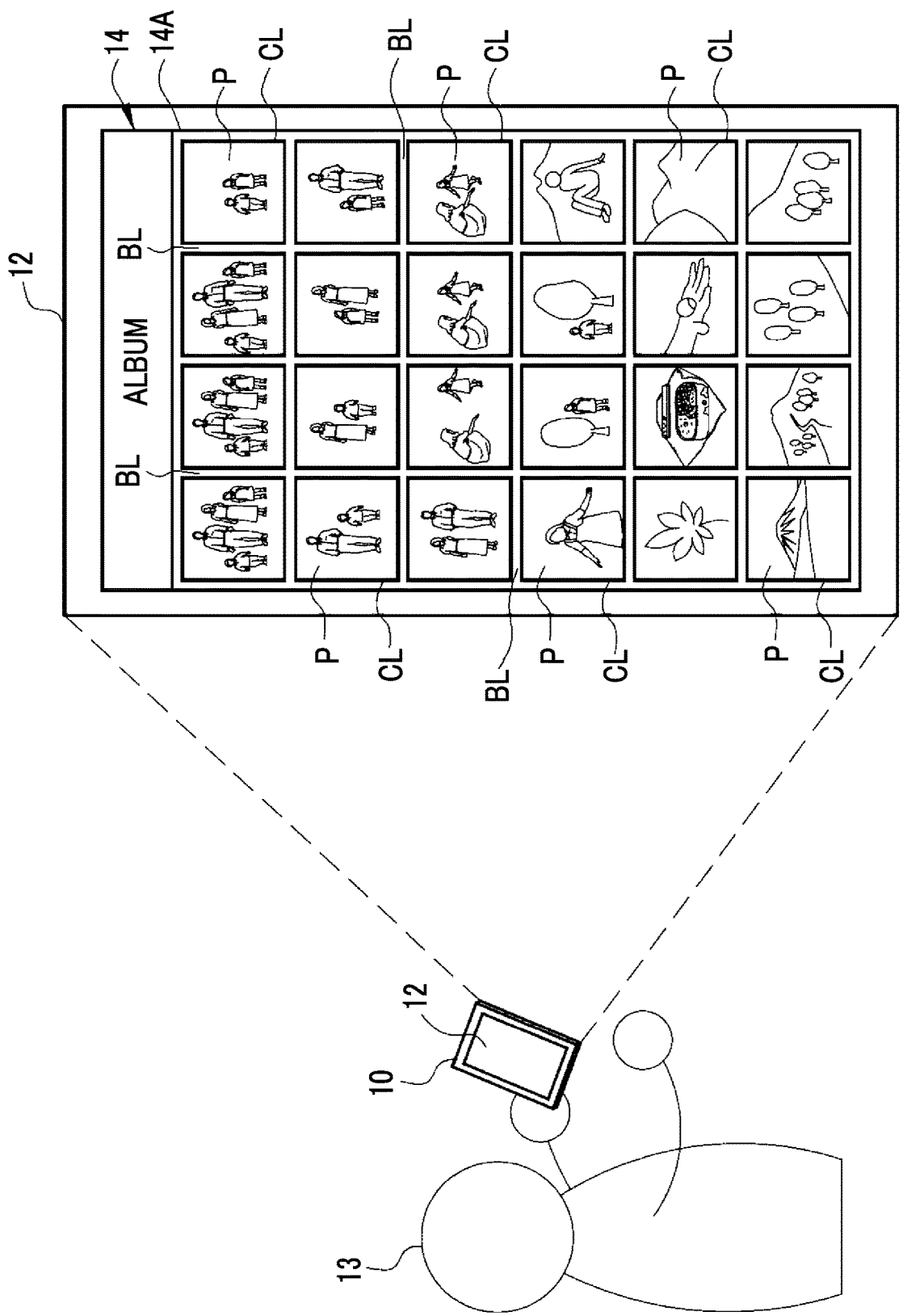
FIG. 1 is an explanatory diagram showing a portable information terminal.

Hereinafter, an example of embodiments according to a technique of the disclosure will be described with reference to drawings. In FIG. 1, a portable information terminal 10 is, for example, a smartphone. The portable information terminal 10 not only functions as a mobile phone, but also functions as a computer executing various application programs called an application or the like. The portable information terminal 10 also has a camera function and thus it is possible to image a photograph with the portable information terminal 10.

A touch panel display (hereinafter referred to as touch panel) 12 is provided on the front surface of a main body of the portable information terminal 10. As one of applications, an electronic album application 30 (refer to FIGS. 2 and 3) is installed in the portable information terminal 10. The electronic album application 30 is a picture viewer program for a user 13 to browse a plurality of pictures P such as an imaged photograph.

The electronic album application 30 generates an album screen 14 and displays the album screen 14 on the touch panel 12. The album screen 14 displays an album page 14A on which the plurality of pictures P are arranged in a predetermined order. The album page 14A is provided with a plurality of picture display cells CL (hereinafter simply referred to as display cell) which is a block in which each picture P is disposed frame by frame. Each display cell CL is set to have the same size and the same square shape in an initial state. In the album page 14A, each display cell CL is disposed in a matrix of a plurality of rows and a plurality of columns, and each picture P is arranged in a grid shape as a whole by being disposed frame by frame in each display cell CL. The grid shape means a form where a block line BL of each display cell CL longitudinally and laterally extends and each display cell CL constitutes a square of the grid. The album screen 14 is an example of a picture arrangement screen.

In the electronic album application 30, it is possible to scroll the album page 14A and select each picture P to enlarge and display the picture by accepting a touch operation on the touch panel 12. The user 13 browses the plurality of pictures P while performing such an operation.

Here, the electronic album refers to a group of a plurality of pictures recorded as digital data such as imaged pictures and a group of pictures grouped so as to be able to be handled as one unit in a case of displaying or storing the imaged pictures. The electronic album is also referred to as a digital photograph album. For example, a group of pictures that groups photographs imaged at various events such as a tour, sports, a birthday party, a welcome and farewell party, an exhibition, or various classes (cooking class, yoga class, or surfing class) in an event unit constitutes an electronic album of each event. The album screen 14 is an example of the picture arrangement screen displayed on the touch panel 12 which is an example of a display unit.

The electronic album application 30 is an example of an operating program of a picture display control device for causing the portable information terminal 10 which is the computer to function as the picture display control device.

Figure 2:
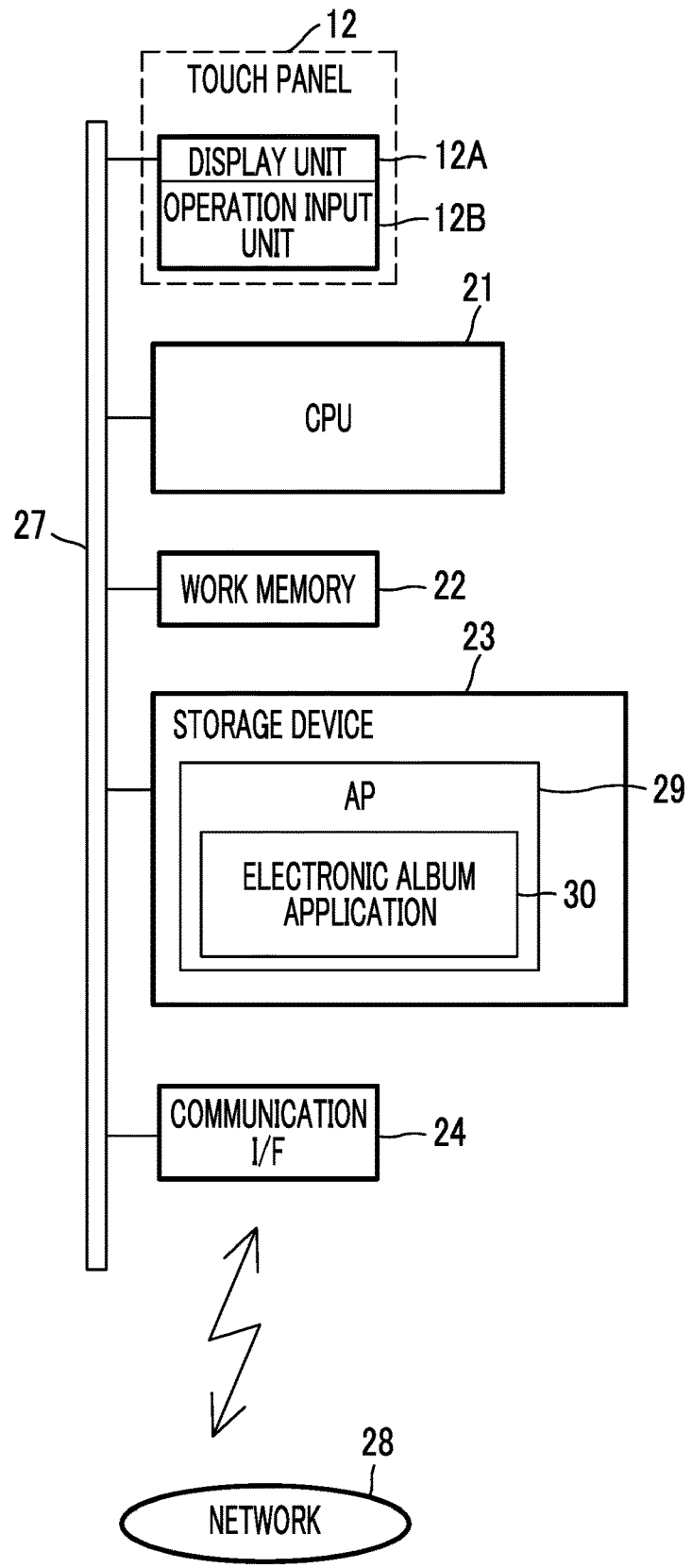
FIG. 2 is a block diagram showing an outline of an electric configuration of the portable information terminal.

As shown in FIG. 2, the portable information terminal 10 comprises a central processing unit (CPU) 21, a work memory 22, a storage device 23, a communication interface (I/F) 24, and the touch panel 12. These are connected through a data bus 27.

The work memory 22 is a memory for the CPU 21 to execute processing and is composed of a random access memory (RAM). The CPU 21 loads a control program stored in the storage device 23 to the work memory 22 and executes processing according to the program to integrally control each unit of the portable information terminal 10.

The communication I/F 24 is, for example, a wireless communication interface and performs a transfer control in a case of the wireless communication. The wireless communication interface includes a mobile communication interface connecting to a mobile communication network, a wireless interface of the institute of electrical and electronics engineers, Inc. (IEEE) 802.11 series wireless local area network (LAN) standard for connecting to a wireless router, a short-range wireless communication interface using infrared or the like, and the like. The portable information terminal 10 can be connected to a network 28 such as the mobile communication network and the Internet through the communication I/F 24.

The touch panel 12 is composed of a display unit 12A that displays various operation screens including the album screen 14 and an operation input unit 12B for inputting the touch operation using a finger of the user 13 as an operation instruction.

The storage device 23 is, for example, a non-volatile semiconductor memory, such as a flash memory and a solid state drive (SSD), and stores the control program and an application program (AP) 29. The application program 29 includes various applications including the electronic album application 30. The application program 29 also includes a program that is downloaded and installed by the user 13 from a predetermined application distribution server to the portable information terminal 10 through the network 28 such as the Internet in addition to a program that is pre-installed in the portable information terminal 10.

Figure 3:
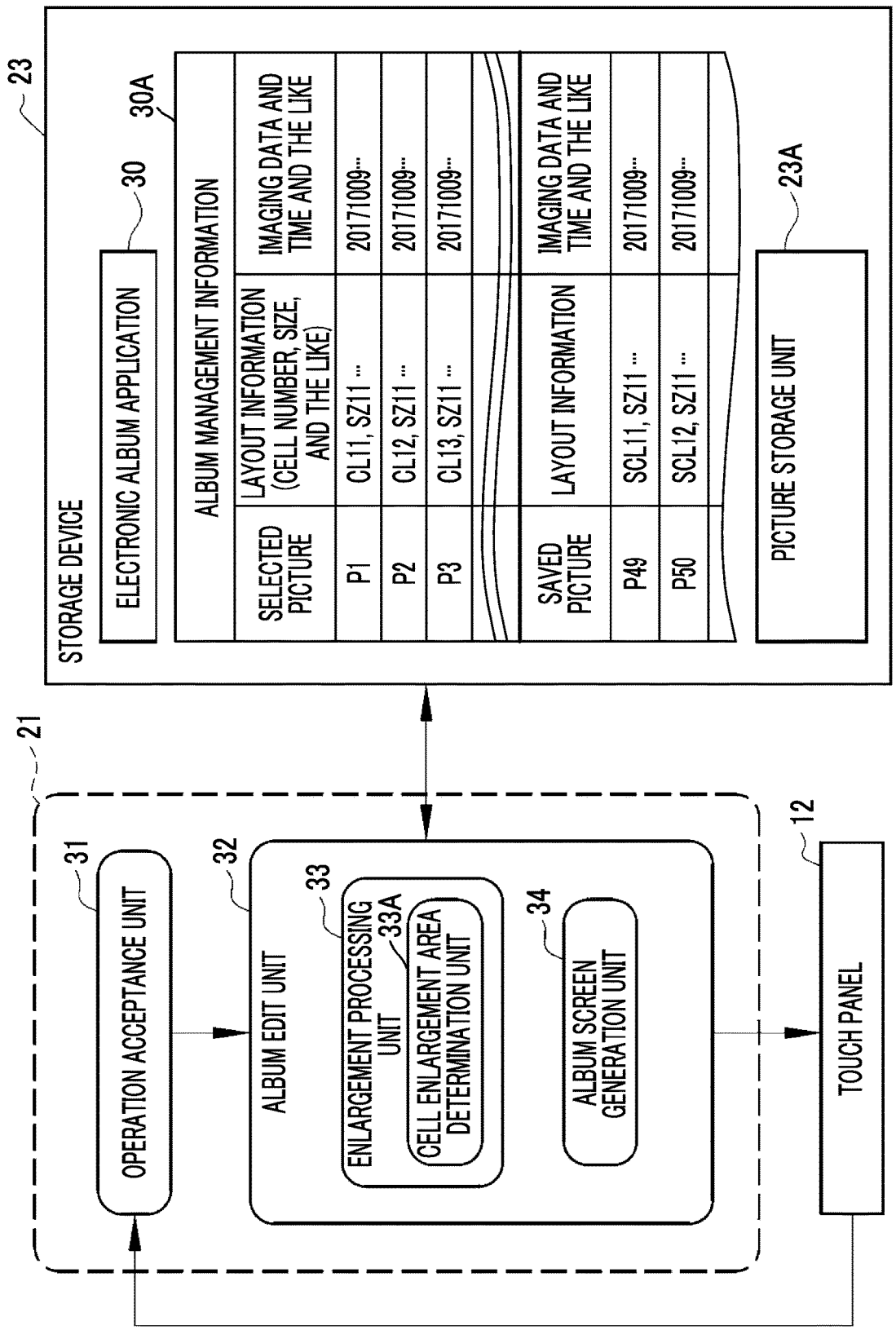
FIG. 3 is a functional block diagram realized by a CPU of the portable information terminal executing an operating program.

As shown in FIG. 3, the storage device 23 has a picture storage unit 23A that stores electronic data of the picture P such as a photograph imaged by the user 13. The storage device 23 stores an album management information 30A generated by the electronic album application 30.

In a case where the electronic album application 30 is activated, the CPU 21 functions as an operation acceptance unit 31 and an album edit unit 32. The album edit unit 32 comprises an enlargement processing unit 33, a cell enlargement area determination unit 33A, and an album screen generation unit 34.

The operation acceptance unit 31 accepts the operation instruction by the touch operation to be input through the operation screen such as the album screen 14 displayed on the touch panel 12. The touch operation includes a tap operation of hitting the album screen 14, a gesture of tracing the album screen 14 with the finger, and the like. That is, the operation acceptance unit 31 functions as an operation acceptance unit that accepts the touch operation including the gesture of tracing the album screen 14 with the finger. An operation button (not shown) is provided in the main body of the portable information terminal 10, and the operation acceptance unit 31 accepts the operation instruction from the operation button.

The album edit unit 32 reads, for example, the plurality of pictures P stored in the picture storage unit 23A and disposes the plurality of read pictures P on the album page 14A. The album edit unit 32 generates the album screen 14 as a screen displaying the album page 14A created in this manner.

A photograph imaged by the portable information terminal 10 is sequentially added to the picture storage unit 23A, and the added picture P is automatically registered to the album page 14A. That is, the picture storage unit 23A stores all the imaged pictures P in an order of imaging date and time. Such a group of pictures that is not edited by the user 13 is called as an unedited album. The user 13 selects a picture P among the group of unedited pictures under an edit policy to edit an album for each event such as tour or party.

In a state where an edited album is not designated such as at the time of initial activation, the album edit unit 32 reads all the groups of pictures, in the order of imaging date and time, stored in the picture storage unit 23A to generate the album screen 14 based on the groups of pictures. In a case where an edited album is designated, the album screen 14 is generated based on a plurality of pictures P included in the album.

Figure 4:
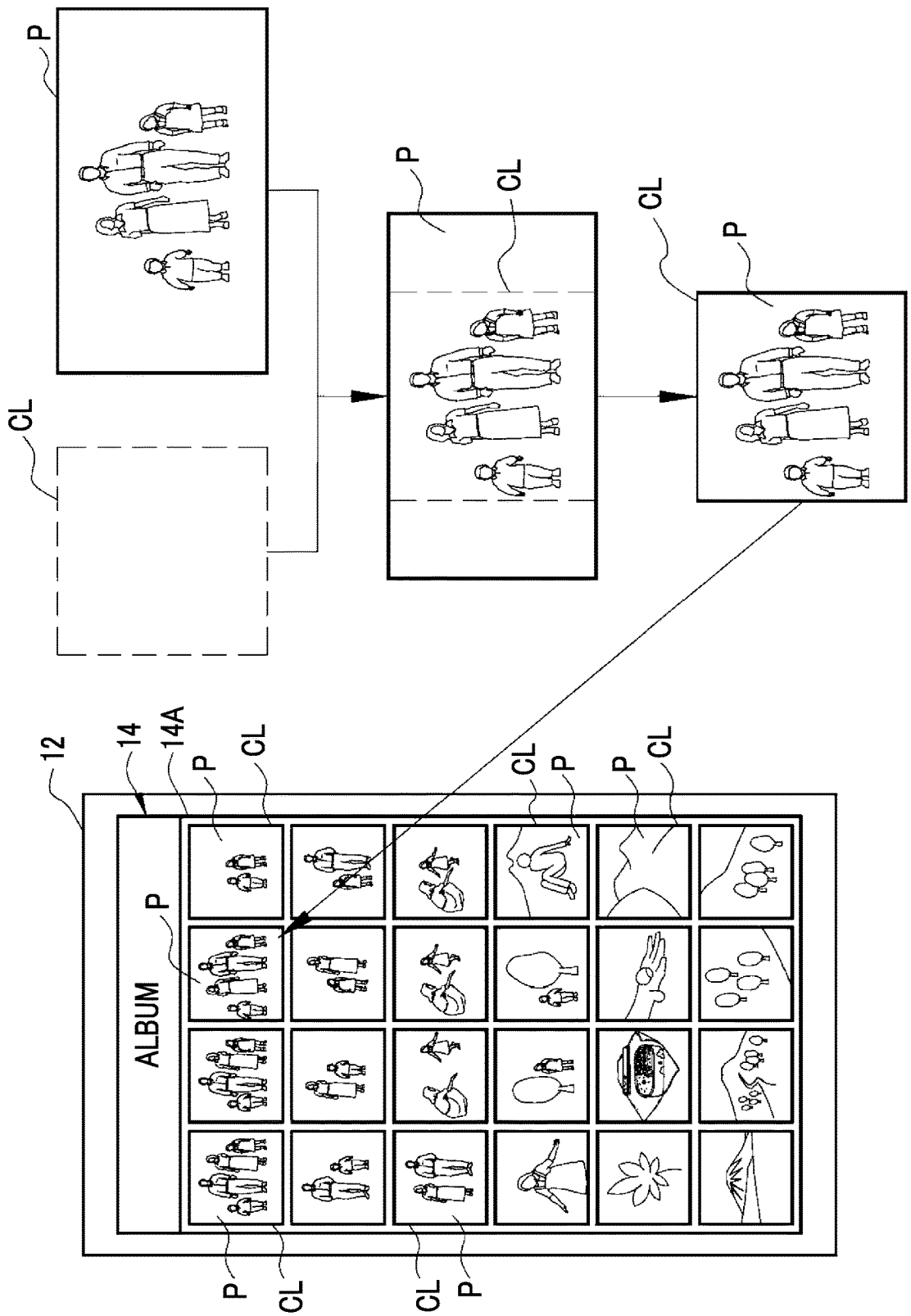
FIG. 4 is an explanatory diagram of processing of disposing a picture to a display cell of an album screen.

As shown in FIG. 4, a plurality of display cells CL are provided in the grid shape on the album page 14A. The album edit unit 32 disposes the picture P in each display cell CL. In this case, the album edit unit 32 trims the picture P in accordance with a shape of the display cell CL. In the example of FIG. 4, the display cell CL has the square shape in the initial state. In contrast, the picture P has a rectangular shape with an aspect ratio of 16:9. The album edit unit 32 adjusts the size of the picture P, for example, such that a length of one side of the display cell CL matches a longitudinal length of the picture P. A part of the picture P is trimmed in accordance with the display cell CL. The trimmed portion is a display portion, and the picture P after the trimming is disposed on the album page 14A.

The operation instruction with respect to the electronic album application 30 is an album edit instruction mainly relating to the album edit, and the album edit instruction includes a picture selection instruction, a picture save instruction, a cell enlargement instruction, and the like.

The picture selection instruction is an instruction to select the picture P to be disposed on the album page 14A. As described above, at the time of initial activation of the electronic album application 30, all the pictures P in the picture storage unit 23A are disposed on the album page 14A and all the pictures P are set to be selected pictures. From this state, in a case where a save instruction to save a picture P on the album page 14A from the album page 14A is performed, the picture P is saved from the album page 14A. The saved picture P is accommodated on a saved picture accommodation page 14B (refer to FIG. 5B and hereinafter simply referred to as save page) as a saved picture to be saved from the album page 14A. The picture P saved to a save page 14B is not displayed on the album page 14A. The save page is provided at the bottom in FIG. 5B, but may be provided at the top.

The picture selection instruction is an instruction to select again the saved picture in the save page 14B as the selected picture to be disposed on the album page 14A. Conversely, the picture save instruction is an instruction to save the picture P on the album page 14A to the save page 14B.

Figure 5B:
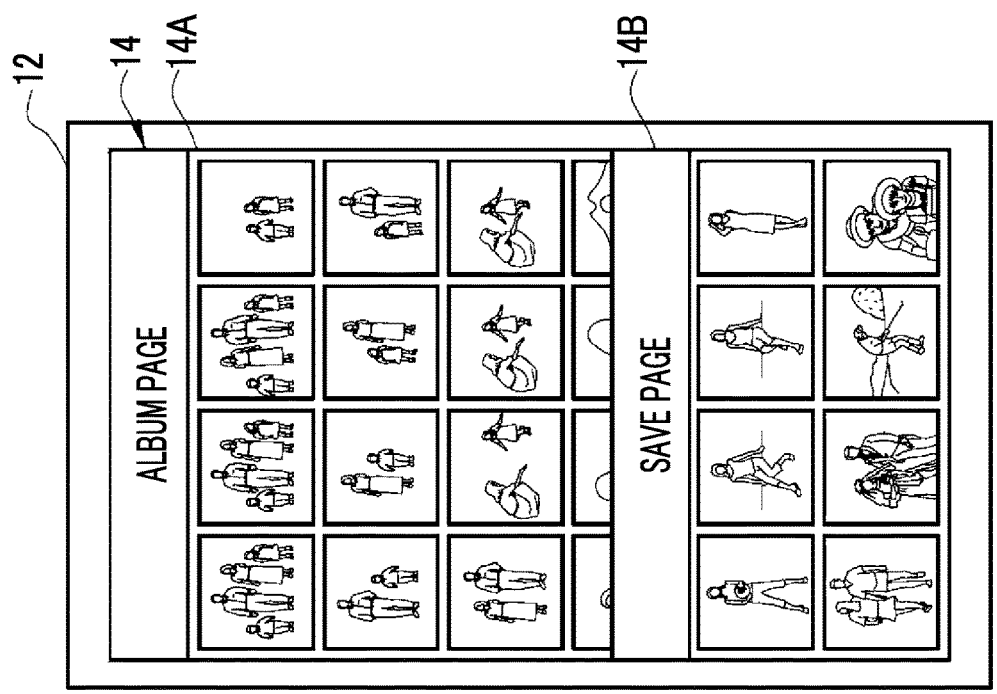
FIGS. 5A and 5B are explanatory diagrams of the album screen for selecting and saving a picture to be disposed on an album page.
Figure 5A:
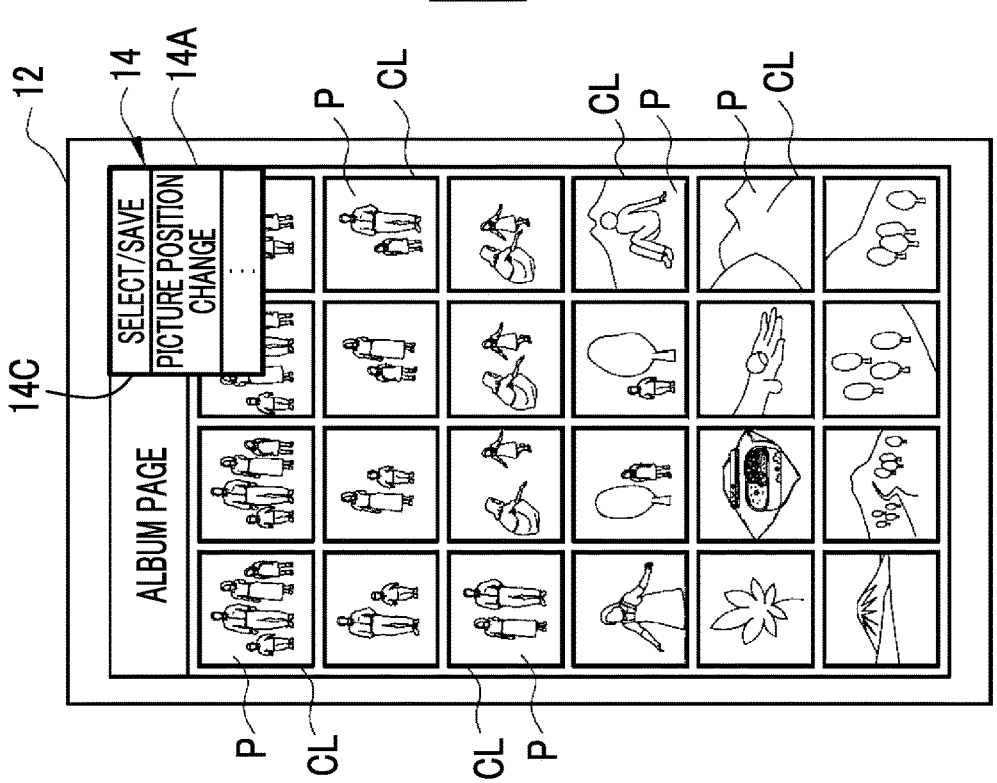

As shown in FIG. 5, in the case of performing the picture selection instruction or the picture save instruction, the operation is started from an edit menu 14C. As shown in FIG. 5A, the edit menu 14C is displayed, for example, in a case where the user 13 performs the tap operation of hitting a predetermined portion of a menu bar displayed at the top of the album screen 14 with the finger. The edit menu 14C includes items such as select or save and picture position change.

In the edit menu 14C, in a case where the tap operation is performed on the select or save item, for example, the album screen 14 is vertically divided into two, and the album page 14A and the save page 14B are respectively displayed in the divided regions as shown in FIG. 5B.

In the edit menu 14C, the picture position change item is an item for performing the operation instruction to change the display cell CL which is a disposition destination of the picture P. In a case where the tap operation is performed on the picture position change item, it is possible to move the disposition destination of a designated picture P from a current display cell CL to another display cell CL through a predetermined touch operation.

Figure 6A:
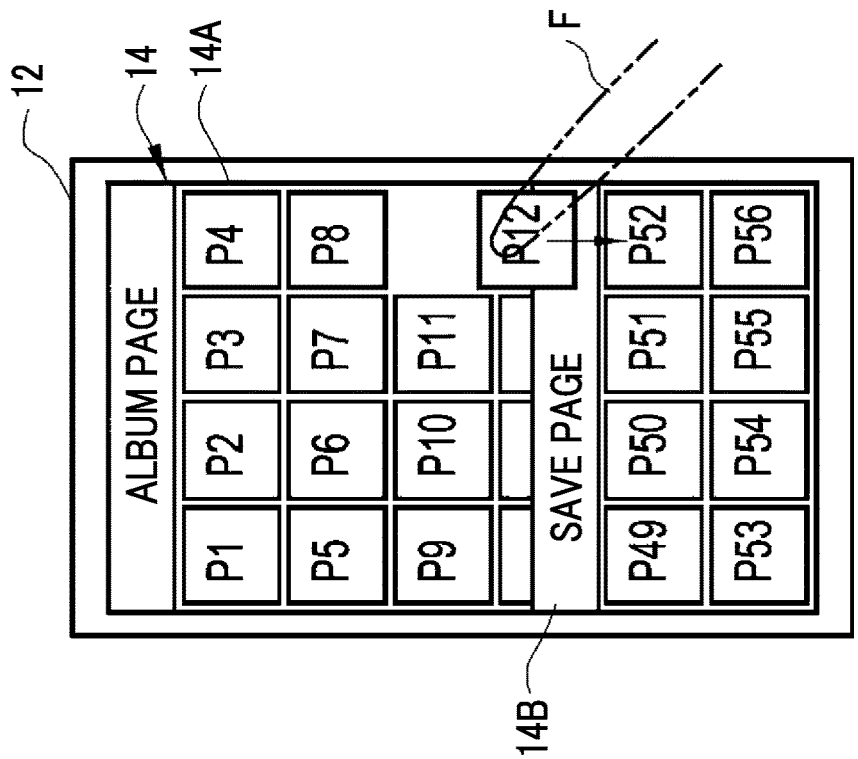
FIGS. 6A and 6B are explanatory diagrams of an operation method of selecting and saving a picture.
Figure 6B:
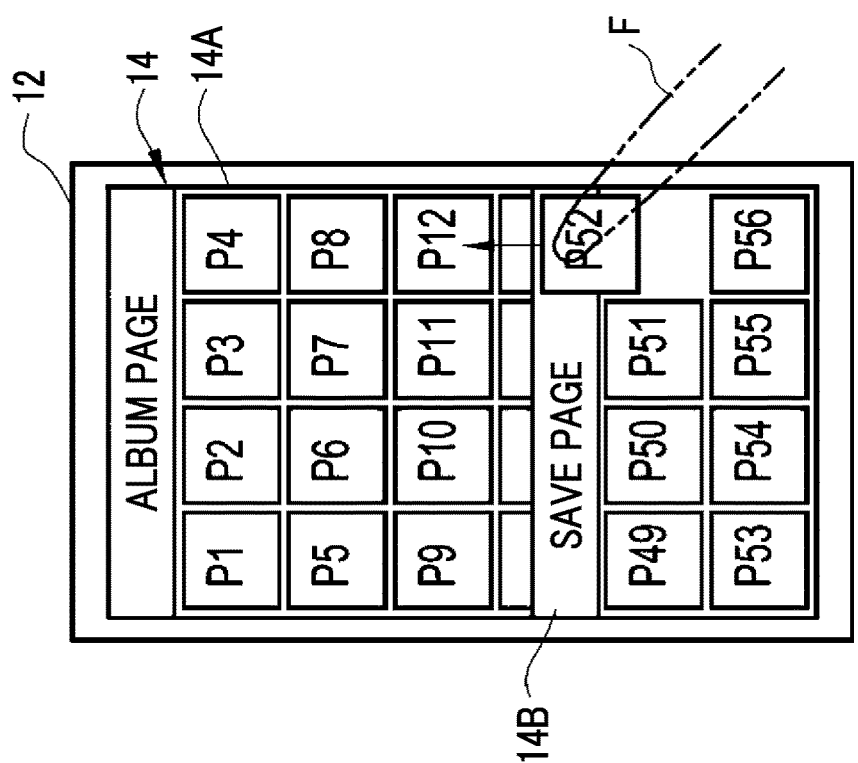

FIGS. 6A and 6B show states where the tap operation is performed on the select or save item in the edit menu 14C and the album screen 14 is divided into the album page 14A and the save page 14B. In FIGS. 5A and 5B, the pictures P are shown in states where subjects are drawn. However, in FIGS. 6A and 6B, each picture P is shown in a state where P1, P2, P3, and • • • which are identification numbers of the pictures are assigned instead of omitting the subjects of the pictures P. FIGS. 6A and 6B are schematic diagrams of the album screen 14 shown in states where arrangement states of the pictures P are simplified.

As described above, in the state where the album screen 14 is divided into two and the album page 14A and the save page 14B are displayed side by side, it is possible to perform an operation of designating a picture P and moving the designated picture P from one page to the other page.

For example, as shown in FIG. 6A, a picture P52 in the save page 14B is touched by a finger F and a drag operation of dragging the picture P52 into the album page 14A while the touched contact state is maintained is performed to move the designated picture P from the save page 14B to the album page 14A. In this manner, the picture selection instruction is performed.

On the other hand, as shown in FIG. 6B, conversely to the picture selection, in a case where a picture P12 designated on the album page 14A with the finger F is dragged toward the save page 14B, the designated picture P12 is saved from the album page 14A and accommodated on the save page 14B.

Returning to FIG. 3, pieces of information on the selected picture which is the picture P to be disposed on the album page 14A and on the saved picture which is the picture P saved from the album page 14A and accommodated on the save page 14B are registered in the album management information 30A. The album screen generation unit 34 reads the pictures P in the picture storage unit 23A to dispose each picture P on the album page 14A or the save page 14B with reference to the album management information 30A. In this manner, a layout of each picture P on the album page 14A and the save page 14B is decided.

In the example of the album management information 30A of FIG. 3, the pictures P1, P2, P3, and • • • are registered as the selected picture, and layout information and information such as imaging date and time of each selected picture are also registered. The layout information includes cell numbers CL11, CL12, CL13, and • • • indicating the position of the display cell CL on the album page 14A, the size SZ11 of the display cell CL, and the like. The cell number is identification information for specifying the position of each display cell CL.

Of two digits subsequent to "CL" in the cell numbers CL11, CL12, CL13, and . . . , a second digit indicates a row and a first digit indicates a column. For example, CL11 indicates the cell number of the display cell CL located in the first row and the first column, and CL12 indicates the cell number of the display cell CL located in the first row and the second column. That is, the example of FIG. 3 indicates that a picture P1 which is one of the selected pictures is disposed in the display cell CL of the cell number CL11 in the first row and the first column on the album page 14A. Similarly, a picture P2 is disposed in the display cell CL of the cell number CL12 in the first row and the second column on the album page 14A.

Of two digits subsequent to "SZ" in the size SZ11, a second digit indicates a longitudinal size and a first digit indicates a lateral size. The size of the display cell CL can be enlarged. However, the size thereof is not changed to a predetermined size, but is gradually changed to N times a reference size in units of the reference size which is a minimum size of the display cell CL. Here, N is a natural number of one or more. In the case of SZ11, it is indicated that the size of the display cell CL is the reference size and the display cell CL has the square shape having the same longitudinal and lateral lengths.

A size two times the reference size is a size of two squares of the display cell CL having the reference size. In this case, the display cell CL has a rectangular shape in which the display cells CL of two squares are arranged in series longitudinally or laterally, that is, a longitudinally long rectangular shape of two rows and one column or a laterally long rectangular shape of one row and two columns. A size four times the reference size is a size of four squares of the reference size. The size four times the reference size is the size of four squares of the reference size, and there are cases where the display cell CL has a longitudinally long rectangular shape of four rows and one column or a laterally long rectangular shape of one row and four columns, and the display cell CL has a square shape of two rows and two columns where both longitudinal and lateral lengths are two times the reference size.

Similarly, for the saved picture, in the album management information 30A of FIG. 3, the pictures P49, P50, and • • • are registered, and the layout information and the imaging date and time of the pictures P49, P50, and • • • are registered. Information on cell numbers SCL11 and SCL12 and sizes SZ11 and SZ11 of the display cells CL in which the pictures P49, P50, and • • • are disposed is registered in the layout information. For the cell number of the display cell CL on the save page 14B, a symbol "SCL" is assigned in order to distinguish from the cell number of the display cell CL of the selected picture. Similarly to the case of the selected picture, two digits subsequent to "SCL" indicate the row number and the column number.

The album edit instruction additionally includes a temporary enlargement instruction for temporarily enlarging and displaying the picture P selected on the album page 14A, a scroll instruction to scroll the album page 14A to display a non-displayed page, and the like. In the temporary enlargement instruction, in a case where a double tap operation of hitting a desired picture P twice consecutively is performed on the album page 14A, the picture P is enlarged and displayed on the full screen of the touch panel 12 for only one frame. In a case where the enlargement display ends, the original album page 14A is restored. The scroll instruction is performed by, for example, an operation of touching the album page 14A with the finger F and swiping the album page 14A in a vertical direction.

The album edit instruction includes the cell enlargement instruction separately from the temporary enlargement instruction. The cell enlargement instruction is an instruction to enlarge the size of the display cell CL to be provided on the album page 14A on the album page 14A. In a case where the display cell CL is enlarged, a display size of the picture P to be disposed in the display cell CL is also enlarged according to a size of the display cell CL after the enlargement. The cell enlargement instruction is input by performing the gesture using the finger F as shown in FIGS. 7 and 8 on the album screen 14.

Figure 7A:
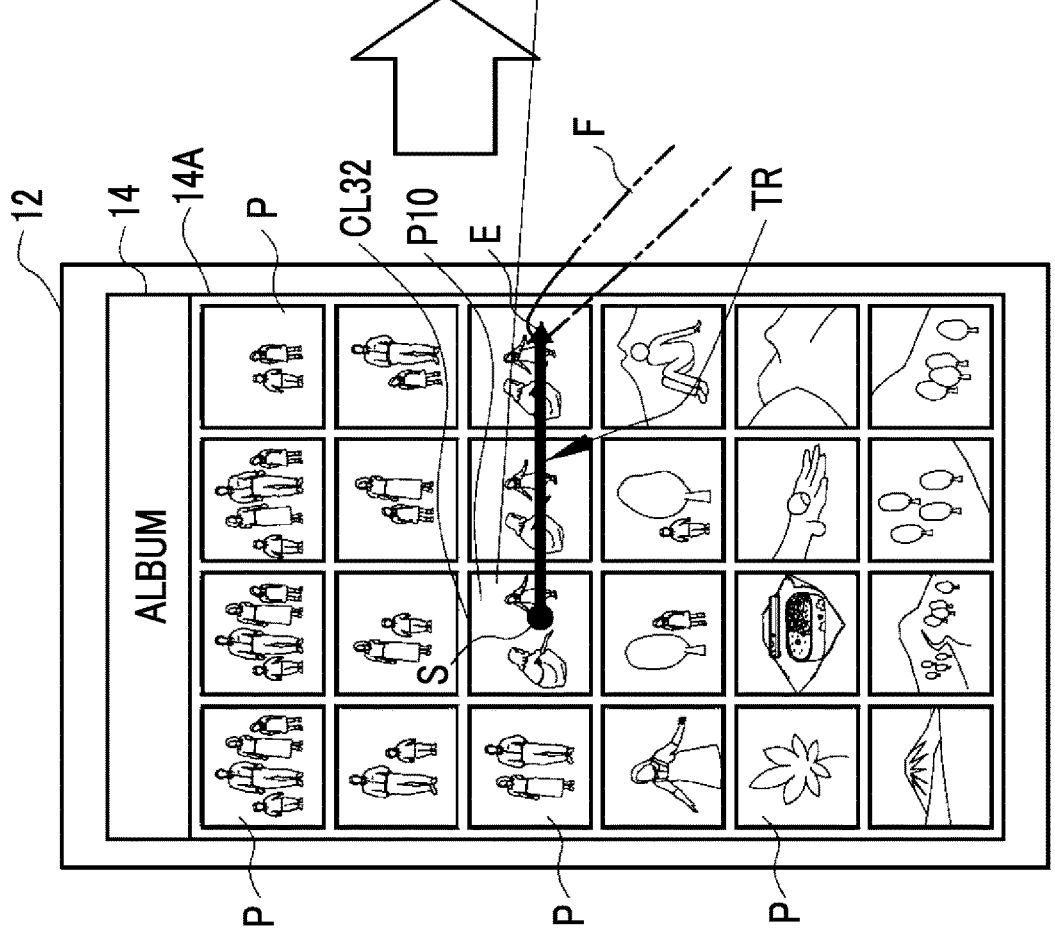
FIGS. 7A and 7B are explanatory diagrams of processing of enlarging the display cell having a reference size to a size of one row and three columns.
Figure 7B:
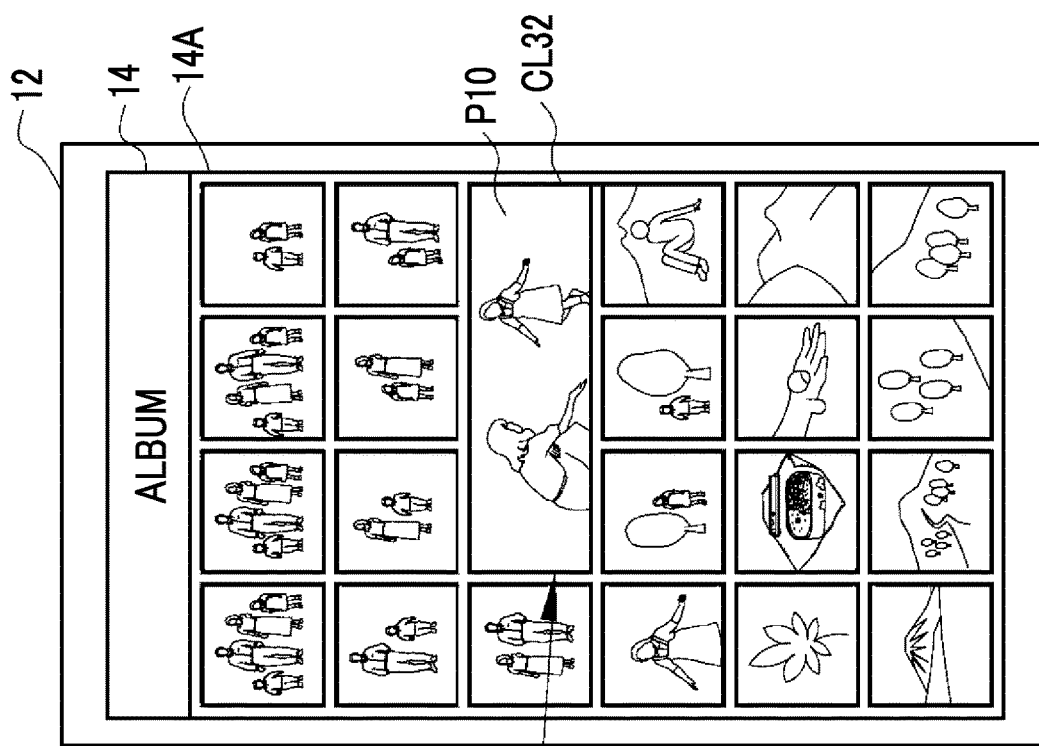
Figure 8C:
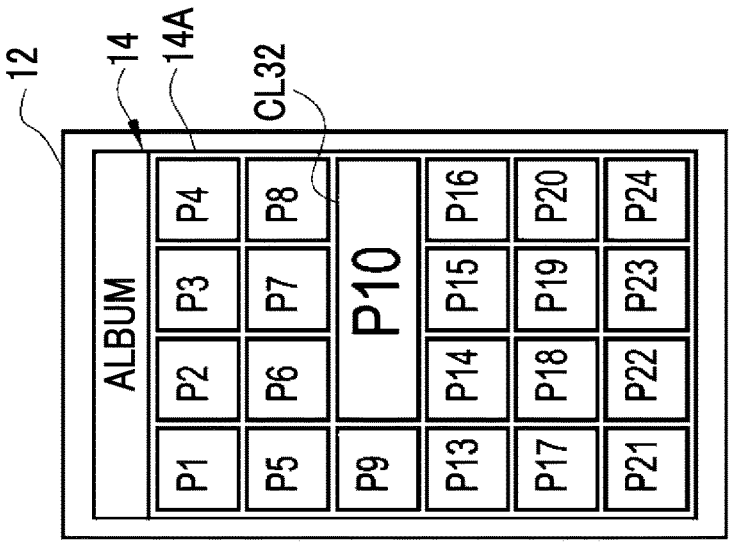
FIGS. 8A, 8B, and 8C are schematic diagrams showing an operation of the processing of FIG. 7.
Figure 8B:
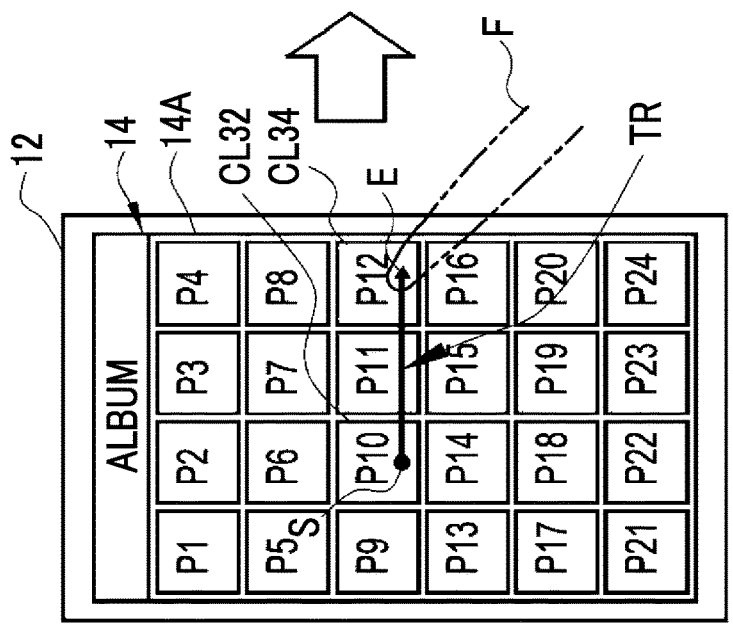
Figure 8A:
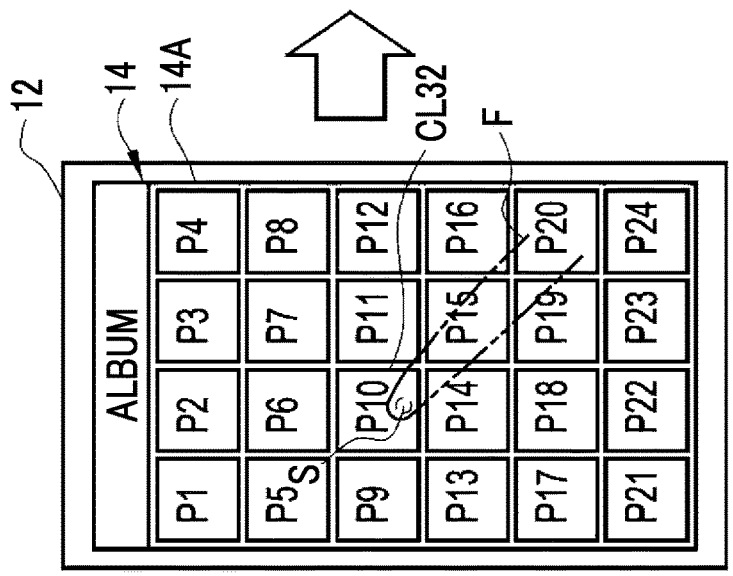

FIGS. 7A and 7B are explanatory diagrams showing contents of enlargement processing. FIG. 7A shows a state before the enlargement of the display cell CL (example is CL32) and the picture P (example is P10) which are the enlargement targets, and FIG. 7B shows a state after the enlargement of the enlargement targets. FIGS. 8A, 8B, and 8C are schematic diagrams similar to FIG. 6 showing an operation method of the enlargement processing shown in FIGS. 7A and 7B.

As described above, it is possible to enlarge the display cell CL to N times the reference size in units of the reference size. In the example of FIG. 7, the display cell CL (example is CL32) of one square which is the reference size shown in FIG. 7A is enlarged to a display cell CL of one row and three columns having a size of three squares which is three times the reference size as shown in FIG. 7B.

As shown in FIG. 8A, designation of the display cell CL to be enlarged is performed by a long press operation of pressing the picture P disposed in the display cell CL to be enlarged for a long time with the finger F. The long press operation refers to an operation of touching the picture P with the finger F and continuing the touched state for a determined time or more. In a case where the long press operation is performed, the display cell CL and the picture P to be enlarged are designated. In this example, the display cell CL32 and the picture P10 are designated as the enlargement target as indicated by a start point S.

In a case where the long press operation is accepted as the touch operation, the operation acceptance unit 31 determines one of the display cells CL as the enlargement target based on coordinate information on a position where the long press operation is performed. That is, the operation acceptance unit 31 functions as an enlargement target determination unit.

After the enlargement target is designated, as shown in FIG. 8B, the user 13 touches again the enlargement target with the finger F and performs a swipe gesture of tracing the album page 14A with the finger F while the touched state is maintained to designate the enlargement area. Specifically, the gesture is a swipe gesture of tracing the album page 14A with one finger F toward an end point with the display cell CL to be enlarged as the start point S. As shown in FIG. 8B, a trajectory TR of the swipe gesture in this example is a straight line extending in a lateral direction to the display cell CL34 in which the picture P12, which is an end point E, is disposed with the display cell CL32 in which the picture P10 is disposed as the start point S.

In a case where a gesture with respect to the album screen 14 is detected, the operation acceptance unit 31 determines which operation instruction corresponds to the detected gesture. In a case where the swipe gesture as shown in FIG. 8B is detected following the long press operation as shown in FIG. 8A, the operation acceptance unit 31 determines that the gesture is the cell enlargement instruction. The operation acceptance unit 31 inputs coordinate information for specifying the trajectory TR to the album edit unit 32 as the information on the cell enlargement instruction.

As described above, in the example, the designation of the display cell CL to be enlarged, which is performed prior to the swipe gesture, is performed by the long press operation. In a case where the long press operation is performed, the operation acceptance unit 31 distinguishes the swipe gesture following the long press operation from a scroll operation in which the entire album page 14A is scrolled.

The designation operation of the display cell CL to be enlarged may not be the long press operation. For example, the designation operation thereof may be a single tap operation of tapping the display cell CL to be enlarged once instead of the long press operation. It is possible to distinguish the swipe gesture following the long press operation from the scroll operation also with the single tap operation.

For the designation operation of the display cell CL to be enlarged, the following method may also be considered in addition to the single tap operation and the long press operation. For example, in the case of enlarging the display cell CL, an operation menu screen (not shown) is first displayed and an operation item such as "display cell enlargement" in the operation menu screen is selected. The operation acceptance unit 31 is transferred to a display cell enlargement mode by performing the operation of selecting the operation item. The operation acceptance unit 31 performs the determination of the enlargement target and the determination of the cell enlargement area through the swipe gesture following the long press operation. In this case, the operation acceptance unit 31 determines a display cell CL existing at a position of the start point S in the swipe gesture after transferring to the display cell enlargement mode as the enlargement target. With this, the long press operation and the single tap operation as the designation operation of the enlargement target are unnecessary.

In order to distinguish the swipe gesture from the scroll operation of the album page 14A, the following may be devised. That is, for the scroll operation of the album page 14A, a scroll bar is provided on an end part of the album page 14A such that the scroll operation is performed through the scroll bar. In this case, even in a case where a region where the display cell CL on the album page 14A exists is touched in various ways, the touch is not recognized as the scroll operation so as to accept only the swipe gesture for the region where the display cell CL exists. For the designation of the enlargement target in this case, the display cell CL at the position of the start point S of the swipe gesture may also be accepted as the display cell CL to be enlarged without the long press operation and the single tap operation.

As described above, it is possible to designate the display cell CL to be enlarged only with the swipe gesture even without performing the designation of the display cell CL to be enlarged by the single tap operation and the long press operation.

With the method of selecting the display cell enlargement mode from the operation menu and the method of providing the scroll bar, it is possible to distinguish the scroll operation of the album page 14A from the swipe gesture for enlarging the display cell CL. In a case where the swipe gesture in a longitudinal direction shown in FIGS. 12 to 14 described below is performed, the distinguishment between the scroll operation of the album page 14A and the swipe gesture for enlarging the display cell CL is particularly problematic. However, it is possible to clearly distinguish the swipe gesture from the scroll operation with the methods described above.

In the album edit unit 32, the cell enlargement area determination unit 33A determines how many reference sizes in units of the reference size corresponds to the size of the display cell CL after the enlargement according to the trajectory TR specified based on the coordinate information. The cell enlargement area determination unit 33A determines what shape the enlargement area, which is the area of the display cell CL after the enlargement, has according to the trajectory TR in addition to the size of the display cell CL after the enlargement. The enlargement processing unit 33 decides the enlargement size of the picture P according to the size of the display cell CL after the enlargement.

In the example, the cell enlargement area determination unit 33A determines that the area where the plurality of display cells CL overlapping the trajectory TR are included is the enlargement area.

In FIG. 8B, the number of display cells CL overlapping the trajectory TR is three squares, and the trajectory TR is a straight line extending in the lateral direction from the start point S to the end point E. Therefore, the cell enlargement area determination unit 33A determines that the enlargement area is the size of three squares of the reference size and the enlargement area has the laterally long rectangular shape of one row and three columns with the longitudinal size of one square and the lateral size of three squares. The cell enlargement area determination unit 33A decides the enlargement size of the picture P according to the size of the enlargement area.

As shown in FIG. 8C, the enlargement processing unit 33 enlarges a display cell C32 which has the square shape having the reference size of one row and one column with the longitudinal and lateral sizes of one square before the enlargement to the laterally long rectangular shape of one row and three columns in accordance with the size and shape of the determined enlargement area.

In a case where the cell enlargement of the display cell CL is performed as described above, the display cells CL existing before the enlargement in the enlargement area occupied by the display cell CL after the enlargement are deleted on the album page 14A. The pictures disposed in the deleted display cells CL are saved to the save page 14B.

In the examples of FIGS. 7 and 8, the enlargement target is the display cell CL32. In the album page 14A, display cells CL33 and CL34 (not shown) exist before the enlargement in the enlargement area occupied by the display cell CL32 after the enlargement after the display cell CL32 is enlarged. Therefore, the display cells CL33 and CL34 (not shown) are deleted accompanying the enlargement of the display cell CL32. Pictures P11 and P12 disposed in the display cells CL33 and CL34 are saved from the album page 14A to the save page 14B.

FIGS. 9A and 9B show a change in the album management information 30A in the case where the cell enlargement shown in FIGS. 7 and 8 is performed. FIG. 9A is the album management information 30A before the enlargement, and FIG. 9B is the album management information 30A after the enlargement. In the album management information 30A before the enlargement shown in FIG. 9A, the pictures P10, P11, P12, and • • • are registered as the selected picture. As the layout information on the picture P10, it is registered that the cell number thereof is CL32, the picture P10 is disposed in the display cell CL32, the size thereof is SZ11, and the picture P10 has the square shape having the reference size of one row and one column with the aspect ratio of 1:1. In the layout information on the pictures P11 and P12, CL33 and CL34 as the cell number and SZ11 as the size are respectively registered.

In the save page 14B, the pictures P49, P50, P51, and • • • are registered. In the layout information on the pictures P49, P50, and P51, SCL11, SCL12, and SCL13 as the cell number and SZ11 as the size are registered.

On the contrary, as shown in FIG. 9B, the size of the display cell CL32 of the picture P10 is changed from SZ11 to SZ13 in the album management information 30A after the enlargement shown in FIGS. 7 and 8. As described above, SZ13 indicates that the display cell has the laterally long rectangular shape of one row and three columns in size. The pictures P11 and P12 are saved from the album page 14A and accommodated in the save page 14B. The display cells CL33 and CL34 on the album page 14A are deleted accompanying the saving of the pictures P11 and P12.

On the other hand, in the album management information 30A of FIG. 9B, the pictures P11 and P12 are registered in the save page 14B. Since the pictures P11 and P12 are disposed in display cells SCL11 and SCL12 of two squares from the head of the save page 14B, the positions of display cells SCL of the pictures P49 to P51 are shifted backward by two squares. Specifically, the pictures P49 and P50 are disposed in the display cells SCL11 and SCL12 as shown in FIG. 9A before the enlargement, but are disposed in display cells SCL13 and SCL14 as shown in FIG. 9B after the enlargement.

Figure 10:
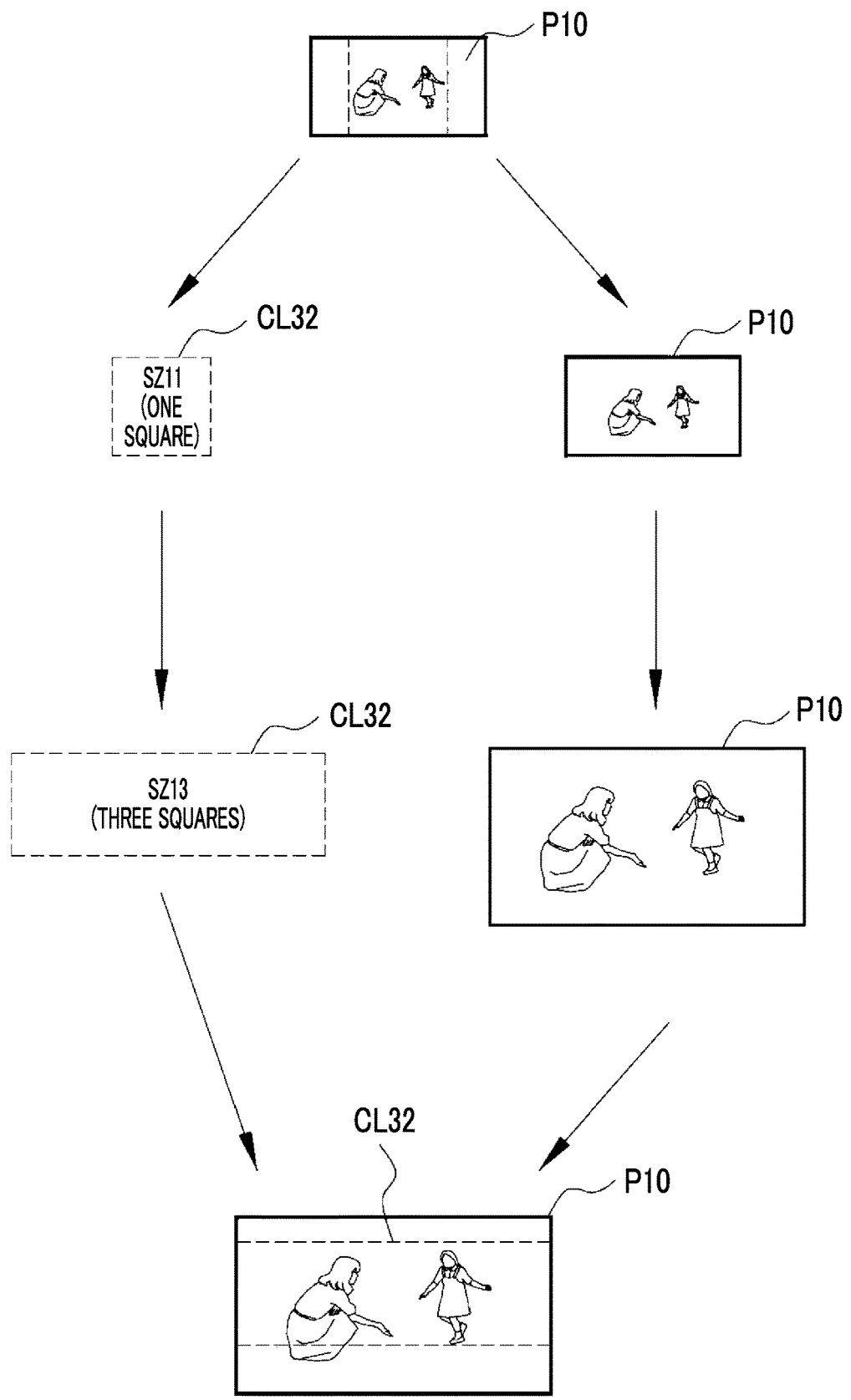
FIG. 10 is an explanatory diagram of trimming processing in the case of FIG. 7.

As shown in FIG. 10, for the picture P10 to be enlarged, the enlargement processing unit 33 trims a part of the picture P10 after the enlargement in accordance with the shape of the display cell CL32 and disposes the trimmed picture in the display cell CL32.

As shown in FIG. 10, a source picture of the picture P10 is a laterally long picture having the shape with the aspect ratio of 16:9. On the contrary, as shown in FIGS. 7A and 8A, the display cell CL32 before the enlargement has the square shape having the reference size of one square as indicated by SZ11 (one square). In the case where the aspect ratio of the display cell CL32 and the picture P10 is different as described above, a part of the picture P10 is trimmed in accordance with the shape of the display cell CL32. In the example of FIG. 10, in the example before the enlargement, the display size of the picture P10 is decided such as the longitudinal length of the picture P10 matches the longitudinal length of the display cell CL32. A part of the picture P10 is trimmed in accordance with the lateral length of the display cell CL32. In this manner, the part of the picture P10 is partially displayed in accordance with the shape of the display cell CL32 on the album page 14A.

On the other hand, after the enlargement, the display cell CL32 is enlarged to the laterally long rectangular shape of one row and three columns as indicated by SZ13 (three squares). The size of the picture P10 is enlarged in a state of maintaining the aspect ratio in accordance with the size and shape of the display cell CL32. Specifically, the picture P10 is enlarged such that the lateral length of the display cell CL32 matches the lateral length of the picture P10. A part of the picture P10 is trimmed in accordance with the longitudinal length of the display cell CL32.

As shown in FIGS. 11A and 11B, a display portion of the picture P (example is picture P10) to be trimmed in accordance with the shape of the display cell CL can be changed. In a case where a predetermined operation to designate the picture P to be trimmed on the album page 14A is performed, a trimming position adjustment screen 14D shown in FIGS. 11A and 11B is displayed. Here, the predetermined operation is, for example, the double tap operation of hitting the picture P twice consecutively with the finger F on the album page 14A.

In the trimming position adjustment screen 14D, the picture P is displayed with the aspect ratio of the source picture, and the display cell CL (example is display cell CL32) is displayed overlapping the picture P. A position of the display cell CL is fixed, and a position of the picture P can be moved longitudinally and laterally with respect to the display cell CL. As shown in FIGS. 11A and 11B, in a case of touching the picture P with the finger F and dragging the picture P in the state, the position of the picture P is moved with respect to the display cell CL. It is possible to adjust a display portion to be trimmed by moving the picture P such that a desired display portion of the picture P is located in the display cell CL through such an operation. In a case where the adjustment of the trimming position is completed, the album page 14A is restored, for example, in a case where the double tap operation is performed on the picture P. In the display cell CL, the display portion of the picture P after the adjustment is displayed on the album page 14A.

The adjustment of the trimming position may be automatically performed by picture analysis processing. For example, the album edit unit 32 performs picture analysis on the picture P to recognize a face of a person. In the picture P, the trimming position is decided such that a portion where the recognized face exists is contained in the display cell CL.

Figure 13B:
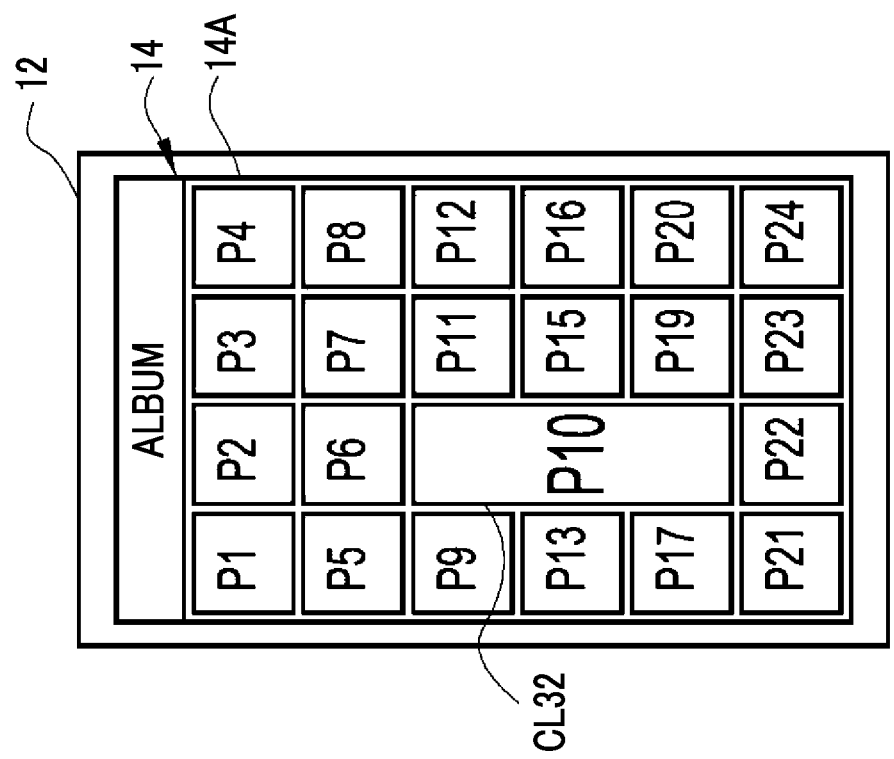
FIGS. 13A and 13B are schematic diagrams showing an operation of the processing of FIG. 12.
Figure 13A:
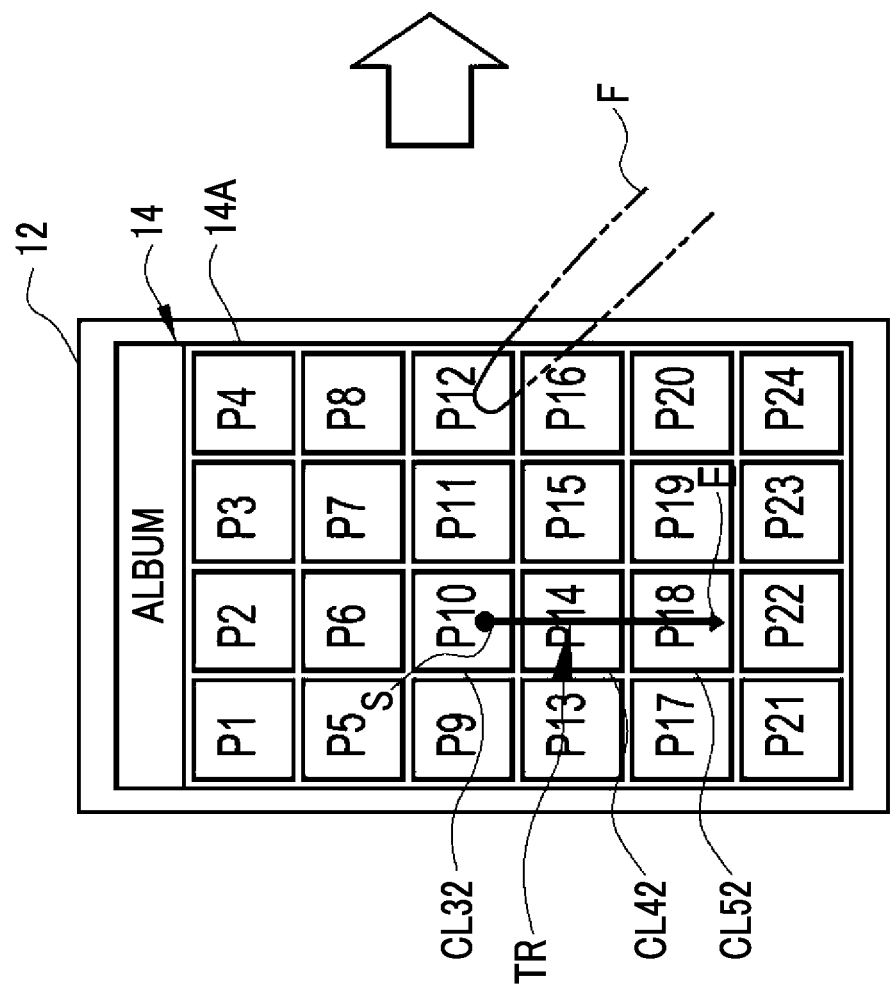
Figure 14:
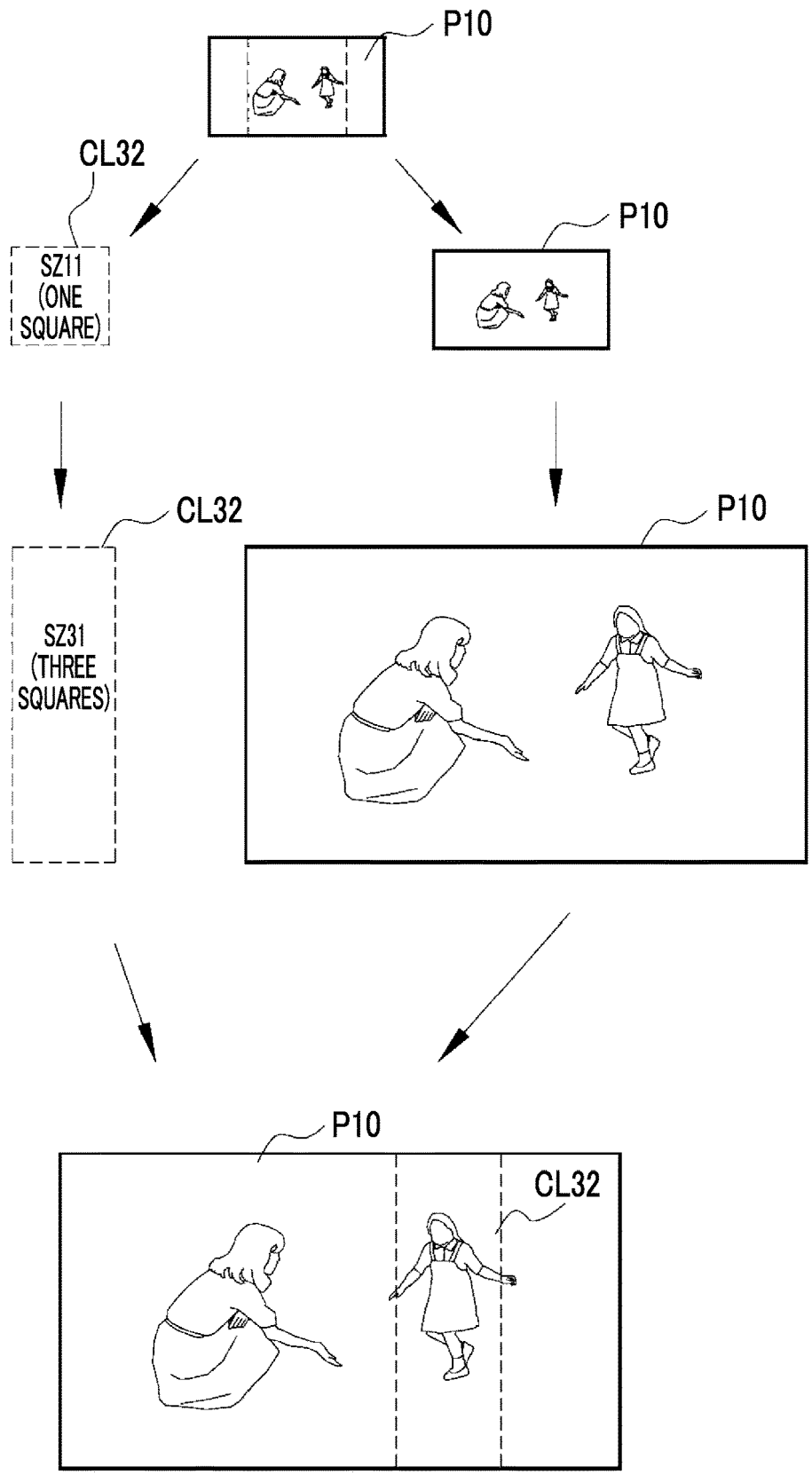
FIG. 14 is an explanatory diagram of the trimming processing in the case of FIG. 12.

The enlargement area of the display cell CL may have any size and shape, and may not have a laterally long shape of one row and three columns. For example, as shown in FIGS. 12 to 14, the display cell CL32 having the reference size of one row and one column may be a longitudinally long shape of three rows and one column. As shown in FIGS. 12A and 13A, the user 13 designates the display cell CL32 having the reference size of one row and one column as the enlargement target by the long press operation. Thereafter, swiping is performed linearly in the longitudinal direction with the finger F from the display cell CL32 which is the start point S to the display cell CL52.

The cell enlargement area determination unit 33A determines that the enlargement area of the display cell CL32 has the longitudinally long rectangular shape of three rows and one column based on the trajectory TR of the finger F. As shown in FIGS. 12B and 13B, the display cell CL32 is enlarged longitudinally and the size of the picture P10 is enlarged according to the enlargement area of the display cell CL32 after the enlargement.

The enlargement and trimming of the picture P10 in the example are performed as shown in FIG. 14. The enlargement processing unit 33 enlarges the picture P10 in a state of maintaining the aspect ratio such that the longitudinal length of the display cell CL32 of three rows and one column after the enlargement matches the longitudinal length of the picture P10. A part of the picture P10 is trimmed in accordance with the size and shape of the longitudinally long display cell CL32 of three rows and one column corresponding to the size (SZ31) of three squares of the reference size. A part of the trimmed picture P10 is displayed in the display cell CL32 after the enlargement.

Figure 15B:
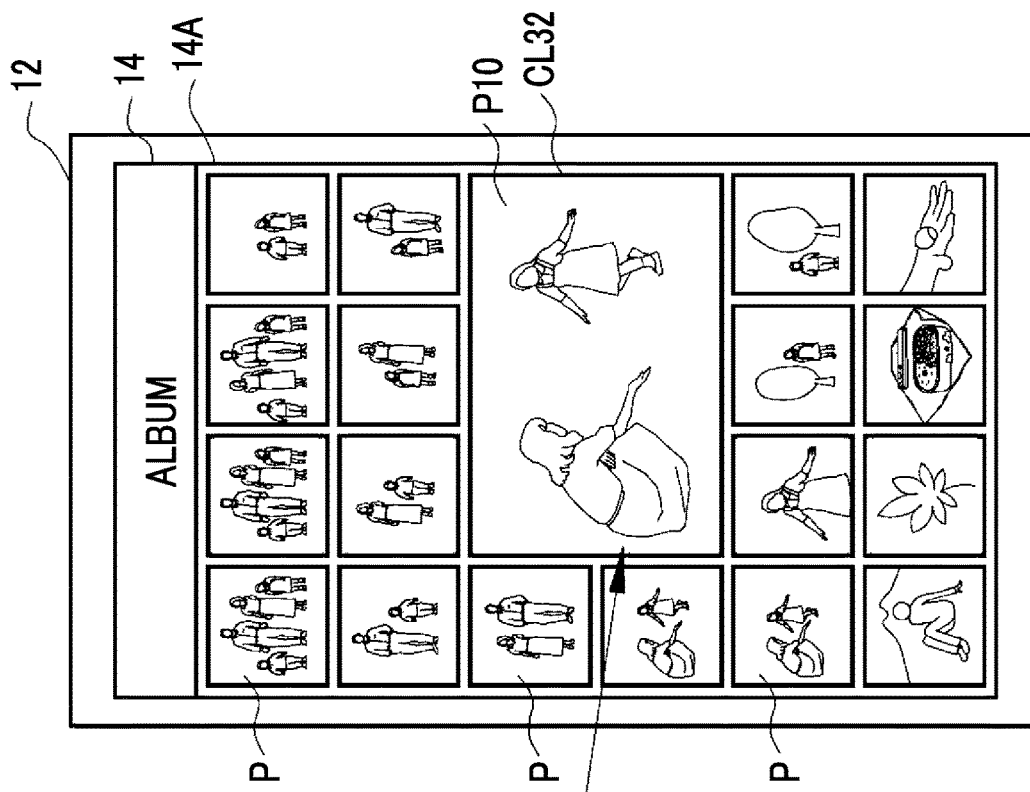
FIGS. 15A and 15B are explanatory diagrams of processing of enlarging the display cell having the reference size to a size of two rows and three columns.
Figure 15A:
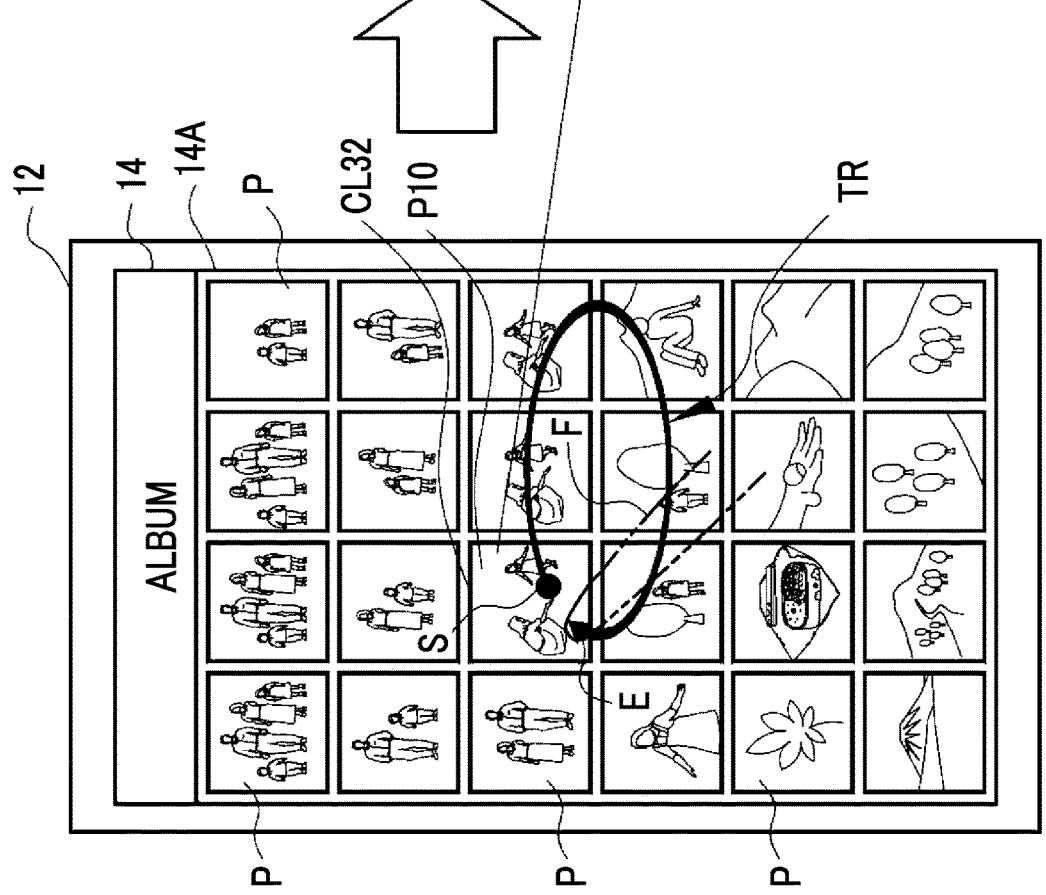
Figure 16B:
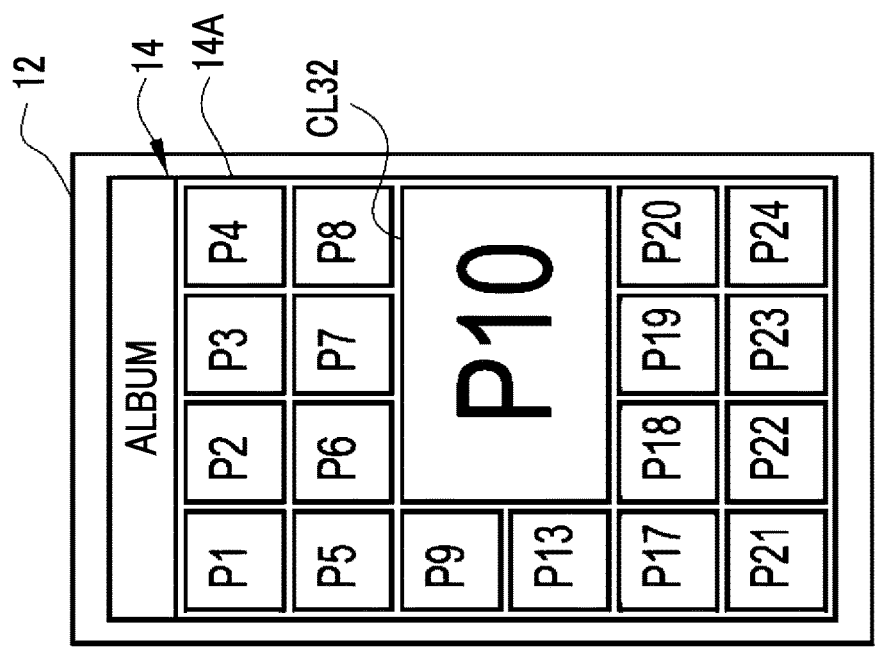
FIGS. 16A and 16B are schematic diagrams showing an operation of the processing of FIG. 15.
Figure 16A:
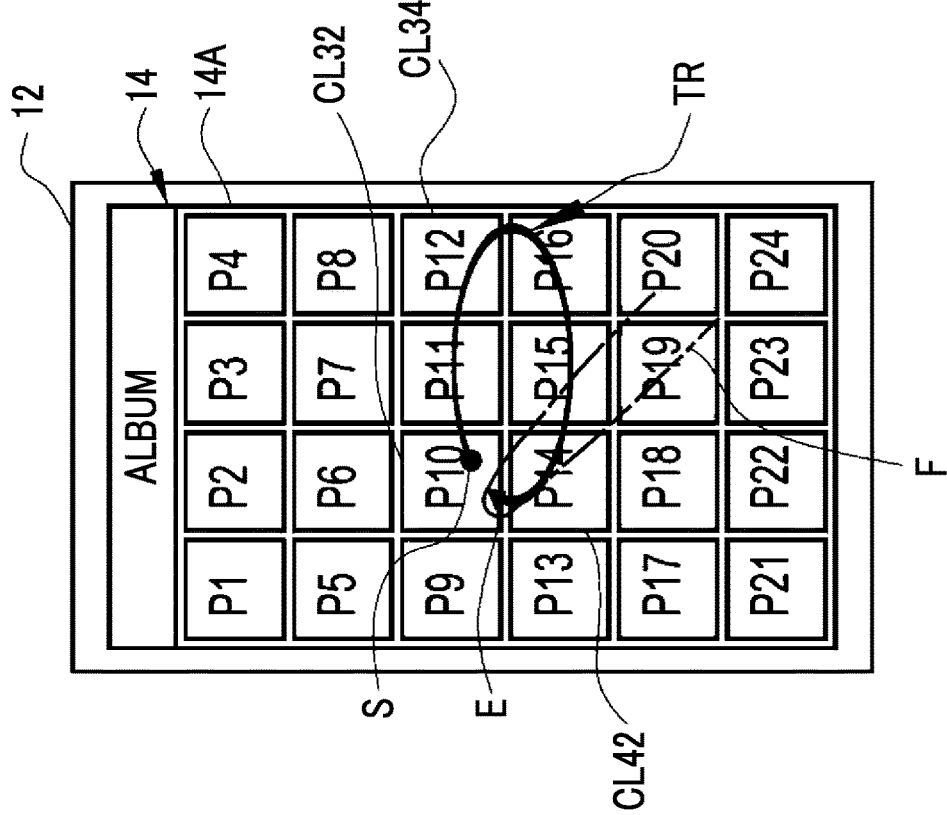
Figure 17:
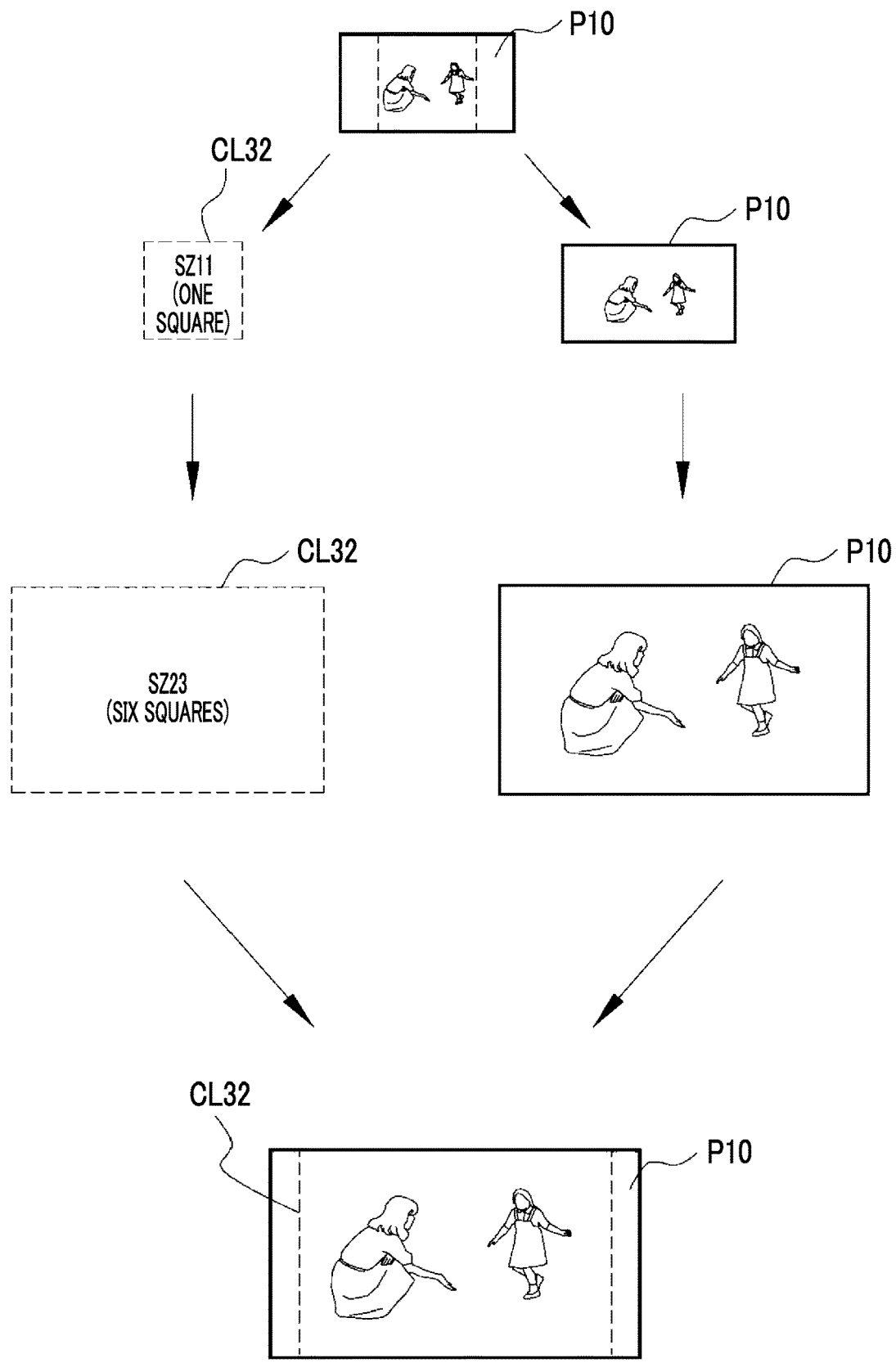
FIG. 17 is an explanatory diagram of the trimming processing in the case of FIG. 15.

As shown in FIGS. 15 to 17, it is possible to enlarge the display cell CL32 having the reference size of one row and one column to a rectangular shape of two rows and three columns. In this case, as shown in FIGS. 15A and 16A, the user 13 designates the display cell CL32 having the reference size of one row and one column as the enlargement target by the long press operation and then swipes to draw an ellipse so as to overlap the display cells CL of two rows and three columns. Specifically, the swiping is performed with the finger F so as to draw the ellipse such that the same display cell CL32 as the start point S becomes the end point by passing through the display cells CL33, CL34, CL44, CL43, and CL42 from the display cell CL32 which is the start point S.

The cell enlargement area determination unit 33A determines that the enlargement area of the display cell CL32 has the rectangular shape of two rows and three columns based on the trajectory TR of the finger F. As shown in FIGS. 15B and 16B, the display cell CL32 is enlarged and the size of the picture P10 is enlarged according to the enlargement area of the display cell CL32 after the enlargement.

The enlargement and trimming of the picture P10 in the example are performed as shown in FIG. 17. The enlargement processing unit 33 enlarges the picture P10 in a state of maintaining the aspect ratio such that the longitudinal length of the display cell CL32 of two rows and three columns after the enlargement matches the longitudinal length of the picture P10. A part of the picture P10 is trimmed in accordance with the size and shape of the longitudinally long display cell CL32 of two rows and three columns corresponding to the size (SZ23) of six squares of the reference size. A part of the trimmed picture P10 is displayed in the display cell CL32 after the enlargement.

Figure 18:
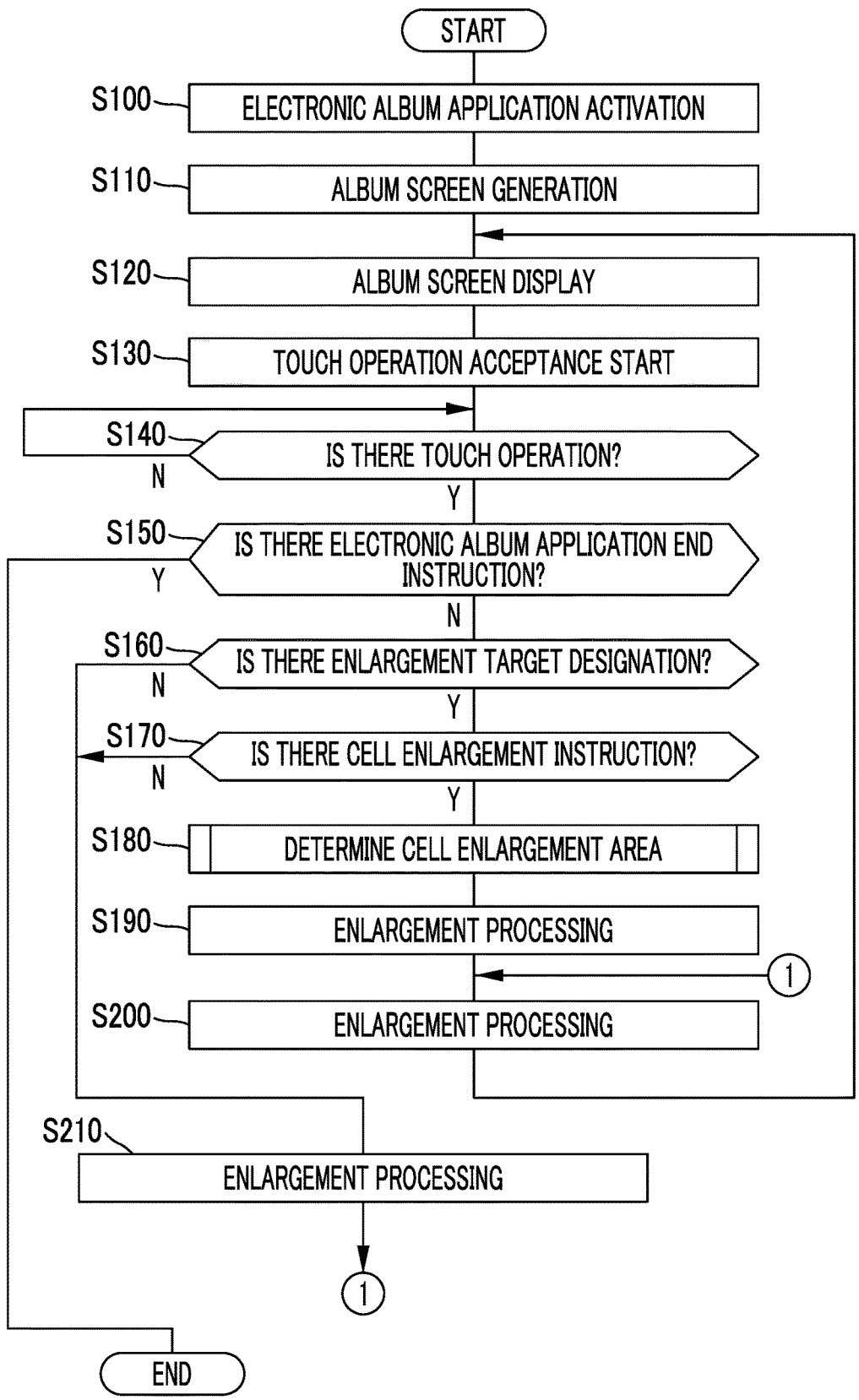
FIG. 18 is a flowchart showing an action.

The action of the above configuration will be described with reference to flowcharts of FIGS. 18 and 19. In the portable information terminal 10, in a case where the electronic album application 30 is activated (step (S) 100), the CPU 21 functions as each unit shown in FIG. 3. The album screen generation unit 34 starts the generation of the album screen 14 (S110). In S110, the album screen generation unit 34 reads the picture P in the picture storage unit 23A registered in the album management information 30A with reference to the album management information 30A. The album screen generation unit 34 adjusts the size of the read picture P and disposes the adjusted picture in each display cell CL on the album page 14A with reference to the layout information of the album management information 30A. In this manner, the album screen generation unit 34 generates the album screen 14 as shown in FIG. 1. The generated album screen 14 is displayed on the touch panel 12 (S120).

In a case where the album screen 14 is displayed, the operation acceptance unit 31 starts the acceptance of the touch operation through the touch panel 12 (S130). The operation acceptance unit 31 monitors the input of the touch operation (S140). In S140, in a case where the touch operation is input (Y in S140), the operation acceptance unit 31 accepts the touch operation and determines the contents of the touch operation. The operation acceptance unit 31 determines whether the touch operation is an electronic album application end instruction (S150). In S150, in a case where the touch operation is determined to be the electronic album application end instruction (N in S150), the electronic album application 30 is ended.

On the other hand, in S150, in a case where the touch operation is not the electronic album application end instruction, the operation acceptance unit 31 determines whether the touch operation is an operation to designate the enlargement target (S160). In a case where the touch operation is the long press operation on any of the display cells CL, the operation acceptance unit 31 accepts the long press operation as the operation of designating one of the display cells CL as the enlargement target. The operation acceptance unit 31 determines that the designated display cell CL is the enlargement target based on the coordinate information on the position where the long press operation is performed (Y in S160). In a case of an operation other than the long press operation, it is determined that there is another edit processing (N in S160). In a case where it is determined that there is another piece of edit processing, album edit processing according to instruction contents of the touch operation (S210) is performed.

The operation acceptance unit 31 determines whether the touch operation performed subsequently to the long press operation which is the operation of designating the enlargement target is the cell enlargement instruction with respect to the display cell CL32 designated as the enlargement target (S170). In a case where the touch operation is the swipe gesture with the display cell CL32 as the start point, the operation acceptance unit 31 determines that the touch operation is the cell enlargement instruction (Y in S170).

In S170, in a case where the operation instruction is not the cell enlargement instruction (N in S170), for example, an instruction to select or save the picture P, a temporary enlargement display instruction, or the like, the album edit processing is performed according to the contents of the instruction (S210).

In a case where the operation instruction is determined to be the cell enlargement instruction (Y in S170), the cell enlargement area determination unit 33A determines the enlargement size of the display cell CL. The cell enlargement area determination unit 33A determines the enlargement area of the display cell CL designated as the enlargement target based on the operation instruction (S180).

Figure 19:
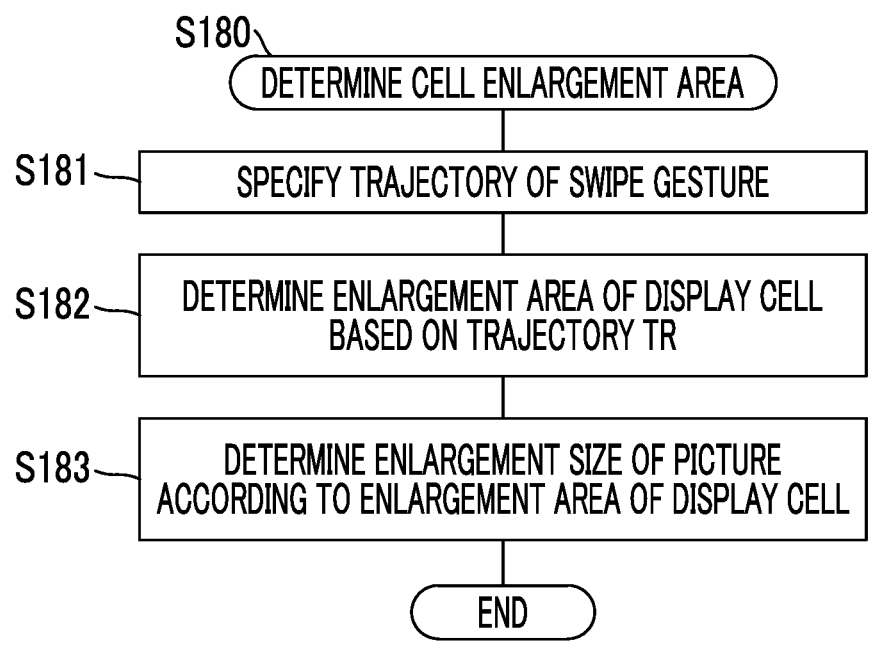
FIG. 19 is a flowchart of cell enlargement area determination processing.

As shown in FIG. 19, in S180, the cell enlargement area determination unit 33A specifies the trajectory TR of the swipe gesture based on the operation instruction (S181). The enlargement area of the display cell CL is determined based on the trajectory TR (S182). In the example, the area where the display cells CL overlapping the trajectory TR are included is determined as the enlargement area.

In the determination of the enlargement area of the display cell CL, in the case where the trajectory TR is the linear trajectory TR in the lateral direction as shown in FIGS. 7 and 8, the cell enlargement area determination unit 33A determines that the enlargement area has the laterally long rectangular shape of one row and three columns. Similarly, in the case where the trajectory TR is the linear trajectory TR in the longitudinal direction as shown in FIGS. 12 and 13, the cell enlargement area determination unit 33A determines that the enlargement area has the longitudinally long rectangular shape of three rows and one column. In the case where the trajectory TR is the elliptical trajectory TR as shown in FIGS. 15 and 16, the cell enlargement area determination unit 33A determines that the enlargement area has the rectangular shape of two rows and three columns.

The enlargement processing unit 33 determines the enlargement size of the picture P based on the determined enlargement area as shown in FIGS. 10, 14, and 17 (S183).

Returning to FIG. 18, the enlargement processing unit 33 performs the enlargement processing (S190). In S190, first, the enlargement processing unit 33 enlarges the display cell CL according to the determined enlargement area. Next, the picture P is enlarged according to the determined enlargement size. Finally, the enlargement processing unit 33 trims a part of the picture P in accordance with the size and the shape of the display cell CL after the enlargement and disposes a part of the trimmed picture P in the display cell CL after the enlargement as shown in FIGS. 10, 14, and 17. The album screen generation unit 34 updates the album screen 14 to a screen that displays the album page 14A on which the display cell CL and the picture P are enlarged (S200).

As described above, in the portable information terminal 10, the pictures P are disposed frame by frame in the display cell CL. The size of the display cell CL is changed to N times the reference size in units of the reference size. The cell enlargement area determination unit 33A determines how many reference sizes in units of the reference size corresponds to the size of the display cell CL after the enlargement and determines what shape the enlargement area after the enlargement has according to the trajectory TR of the gesture of the finger F. Since the size of the display cell CL is enlarged to N times the reference size based on the determination, the block line BL is not shifted even in a case where the instruction to enlarge the picture P is performed by the gesture of the finger F. Therefore, it is possible to maintain an orderly state for the arrangement state of the pictures P on the album screen 14 without disturbing the alignment of the plurality of display cells CL arranged in the grid shape. As a result, it is possible to easily arrange the plurality of pictures P with good appearance on the album screen 14.

The gesture of the enlargement instruction in the example is the swipe gesture of tracing the album screen 14 with one finger with the display cell CL to be enlarged as the start point. Therefore, it is possible to perform the enlargement instruction with one finger F. Such a swipe gesture is particularly effective in a case where the screen size of the touch panel 12 is small as in a case where the portable information terminal 10 is the smartphone.

The cell enlargement area determination unit 33A determines that the area where the plurality of display cells CL overlapping the trajectory TR of the finger F in the swipe gesture are included is the enlargement area. Since such a swipe gesture is an intuitive operation, it is easy to designate the enlargement size as intended by the user 13.

In the above example, on the album page 14A, after the display cell CL is enlarged, the pictures P in the display cells CL existing before the enlargement in the enlargement area occupied by the display cell CL after the enlargement are saved to the save page 14B. For example, in a case where several pictures of the same scene are continuously imaged, several similar pictures P may be continuously arranged on the album page 14A. In such a case, since other adjacent pictures P can be deleted from the album page 14A while one frame picture P to be enlarged is left, it is easy to organize the pictures in the electronic album.

As shown in FIGS. 7, 8, 12, 13, 15, and 16, for the size of the display cell CL, the size of N times the reference size includes at least one of the size of one row×plurality of columns, plurality of rows×one column, or plurality of rows×plurality of columns with the reference size as units of row or column. Therefore, for example, in a case where there is a panoramically imaged picture P, it is possible to set the shape of the display cell CL to an appropriate shape according to the shape of the picture P, such as displaying the picture P in a laterally long shape.

In the above examples, as shown in FIGS. 10, 14, and 17, a part of the picture P is partially displayed in accordance with the aspect ratio of the display cell CL by trimming the picture P. Accordingly, it is possible to display the picture P without generating a blank space in the display cell CL even in a case where the aspect ratio of the picture P and the display cell CL is different. As a result, it is possible to display the picture P with a size as large as possible according to the size of the display cell CL.

In the above example, as shown in FIG. 11, the display portion of the picture P partially displayed in the display cell CL can be changed. Therefore, it is possible to display only a portion of the picture P that is desired to be displayed in the display cell CL.

The above example describes that the pictures P in the display cells CL existing before the enlargement in the enlargement area occupied by the display cell CL after the enlargement are saved to the save page 14B.

However, as shown in FIG. 20, after the enlargement of the display cell CL, the pictures P in the display cells CL existing before the enlargement in the enlargement area occupied by the display cell CL after the enlargement may be disposed again in the display cells CL not overlapping the enlargement area.

Figure 20B:
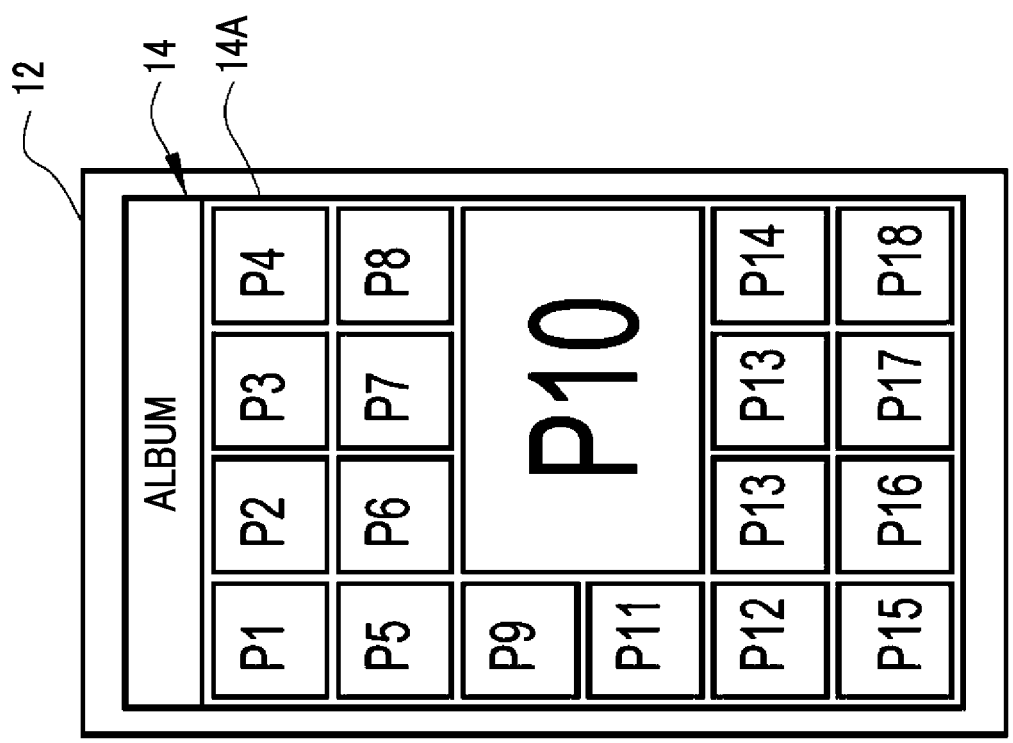
FIGS. 20A and 20B are explanatory diagrams in a case where pictures are disposed again without deleting the pictures accompanying the cell enlargement.
Figure 20A:
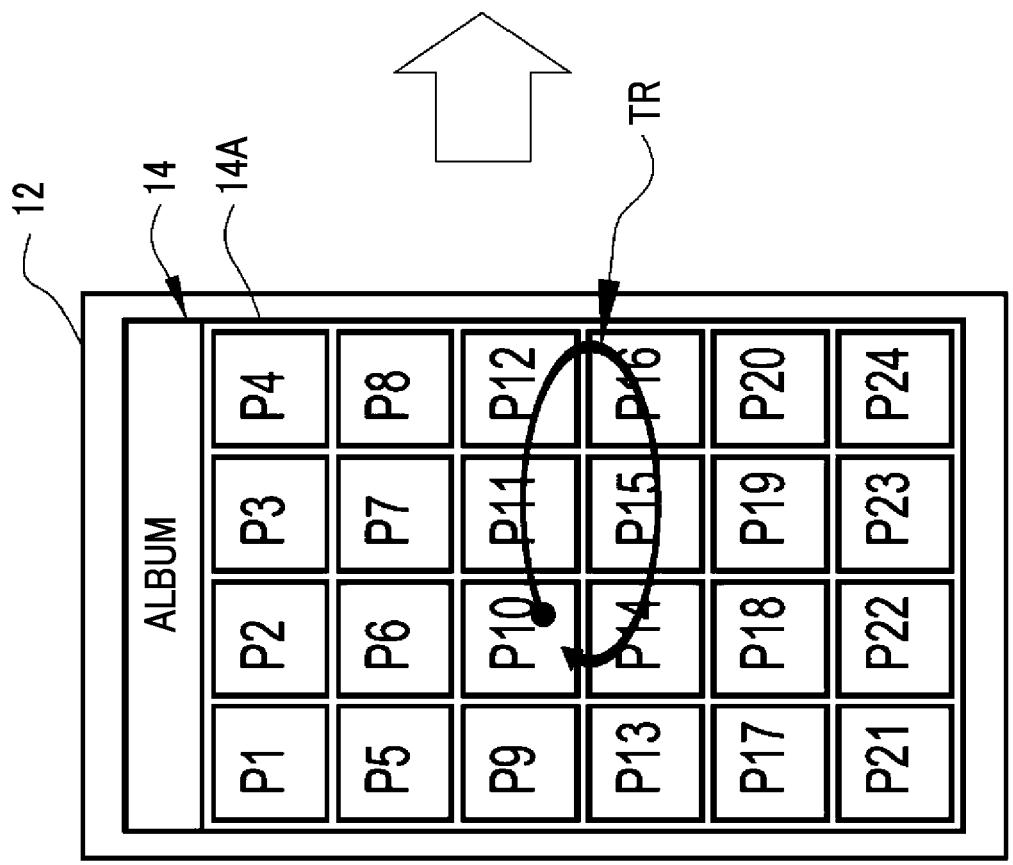

In the example of FIG. 20, FIG. 20A shows a case where the enlargement area of two rows and three columns is designated by the elliptical trajectory TR with the display cell CL32 in which the picture P10 is disposed as the start point S for the display cell CL32 having the reference size of one row and one column.

In this case, there are six squares of the display cells CL32 (picture P10), CL33 (picture P11), CL34 (picture P12), CL42 (picture P14), CL43 (picture P15), and CL44 (picture P16) before the enlargement in the enlargement area of two rows and three columns occupied by the display cell CL32 after the enlargement. Among the six squares of the display cells, the pictures P of five frames of the pictures P11, P12, P14, P15, and P16 disposed in five squares of the display cells excluding the display cell CL32 to be enlarged are disposed again in the display cells CL not overlapping the enlargement area after the enlargement of the display cell CL32 to be enlarged as shown in FIG. 20B. That is, the pictures P of five frames of the pictures P11, P12, P14, P15, and P16 are not saved to the save page 14B, but remain on the album page 14A.

Modification Example 1-1

Figure 21A:
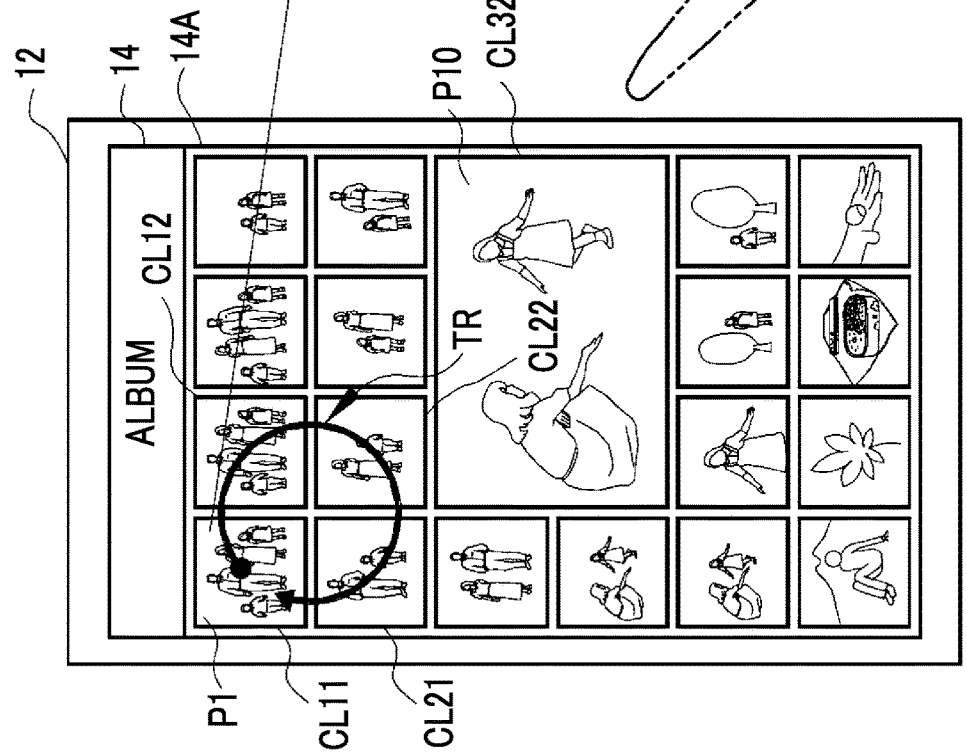
FIGS. 21A and 21B are explanatory diagrams of an example of enlarging a plurality of pictures P.
Figure 21B:
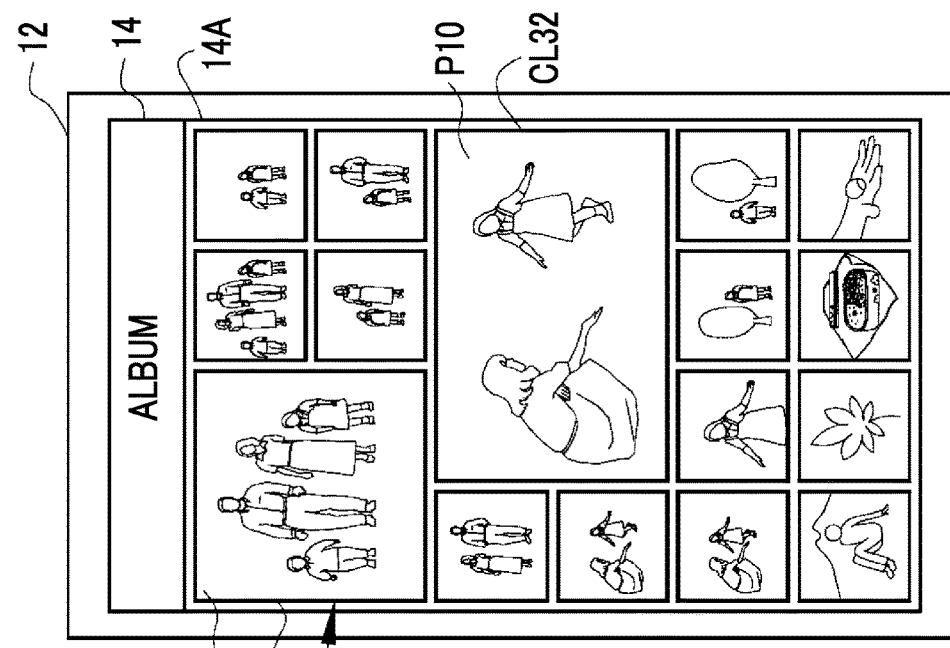

As shown in FIGS. 21 and 22, it is also possible to enlarge a plurality of display cells CL on the album page 14A. In the examples of FIGS. 21 and 22, the display cell CL11 is enlarged in addition to the display cell CL32. In the example, the display cell CL11 is enlarged from the reference size of one row and one column to the display cell CL11 of two rows and two columns. The picture P1 is enlarged accompanying the enlargement of the display cell CL11. The display cells CL12, CL21, and CL22 overlapping the display cell CL11 after the enlargement are deleted. Pictures P2, P5, and P6 to be disposed in the display cells are saved to the save page 14B.

Figure 23B:
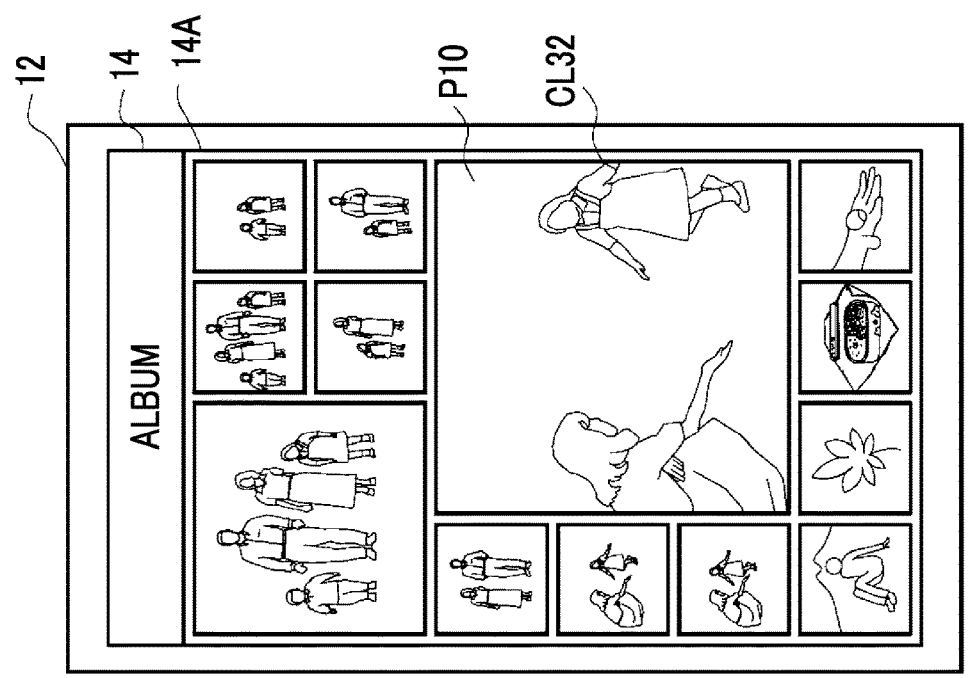
FIGS. 23A and 23B are explanatory diagrams of processing of enlarging again a picture.
Figure 23A:
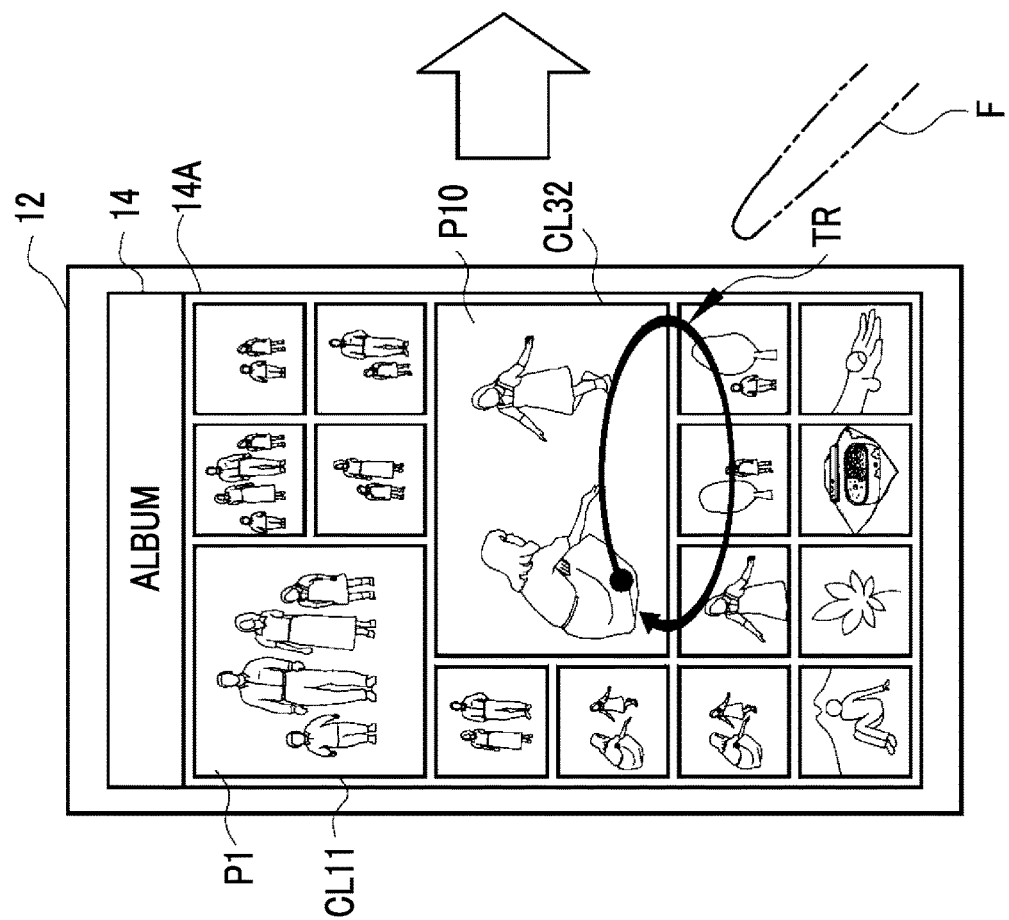

As shown in FIGS. 23 and 24, the display cell CL enlarged once may be enlarged again. In the examples of FIGS. 23 and 24, the display cell CL32 enlarged once to the size of two rows and three columns is further enlarged by enlarging the display cell CL32 again to a size of three rows and three columns. The manner of designating the enlargement area with the swipe gesture of the finger F is the same as the above example.

Figure 25B:
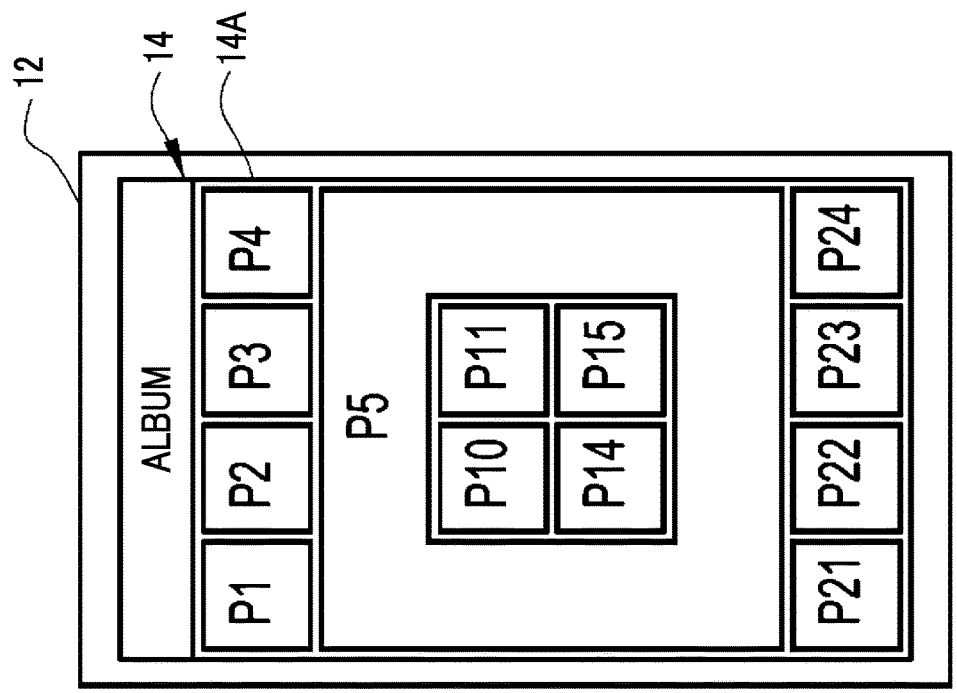
FIGS. 25A and 25B are explanatory diagrams of a modification example of the enlargement area the designation operation.
Figure 25A:
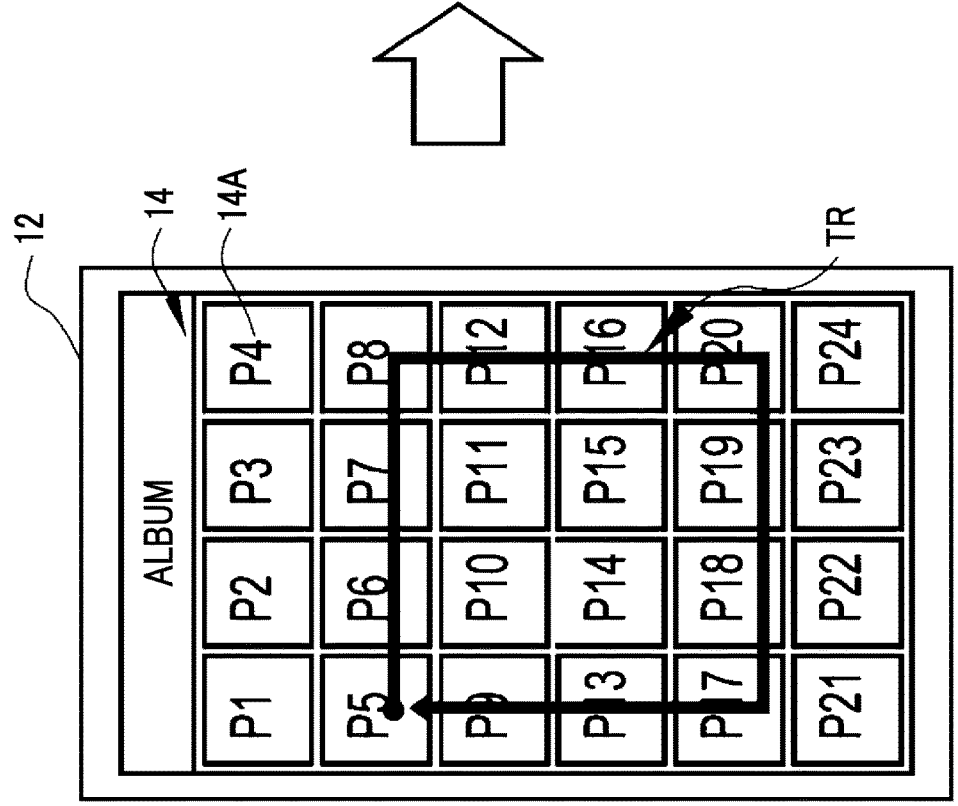

As shown in FIGS. 25A and 25B, the enlargement area having a so-called hollow enclosing frame shape may be designated such as display cells CL in the center are excluded and only display cells CL disposed on the outer periphery of the display cells CL are designated. For example, in the example of FIG. 25A, there are the display cells CL of four squares, in which the pictures P10, P11, P14, and P15 are disposed, in the center. Excluding these display cells CL of four squares, the display cells CL of 12 squares, in which pictures P5, P6, P7, and • • • on the outer periphery of the display cells CL of four squares are disposed, are designated as the enlargement area by the trajectory TR. In this case, as shown in FIG. 25B, the picture P5 to be enlarged located at the start point of the trajectory TR is enlarged to the size of 12 squares overlapping the trajectory TR. However, the display cells CL of four squares disposed inside the trajectory TR and not overlapping the trajectory TR are not included in the enlargement area. Therefore, the picture P5 is displayed in the hollow state. As described above, the enlargement area may have a shape other than the quadrilateral such as the square shape or the rectangular shape.

Figure 27:
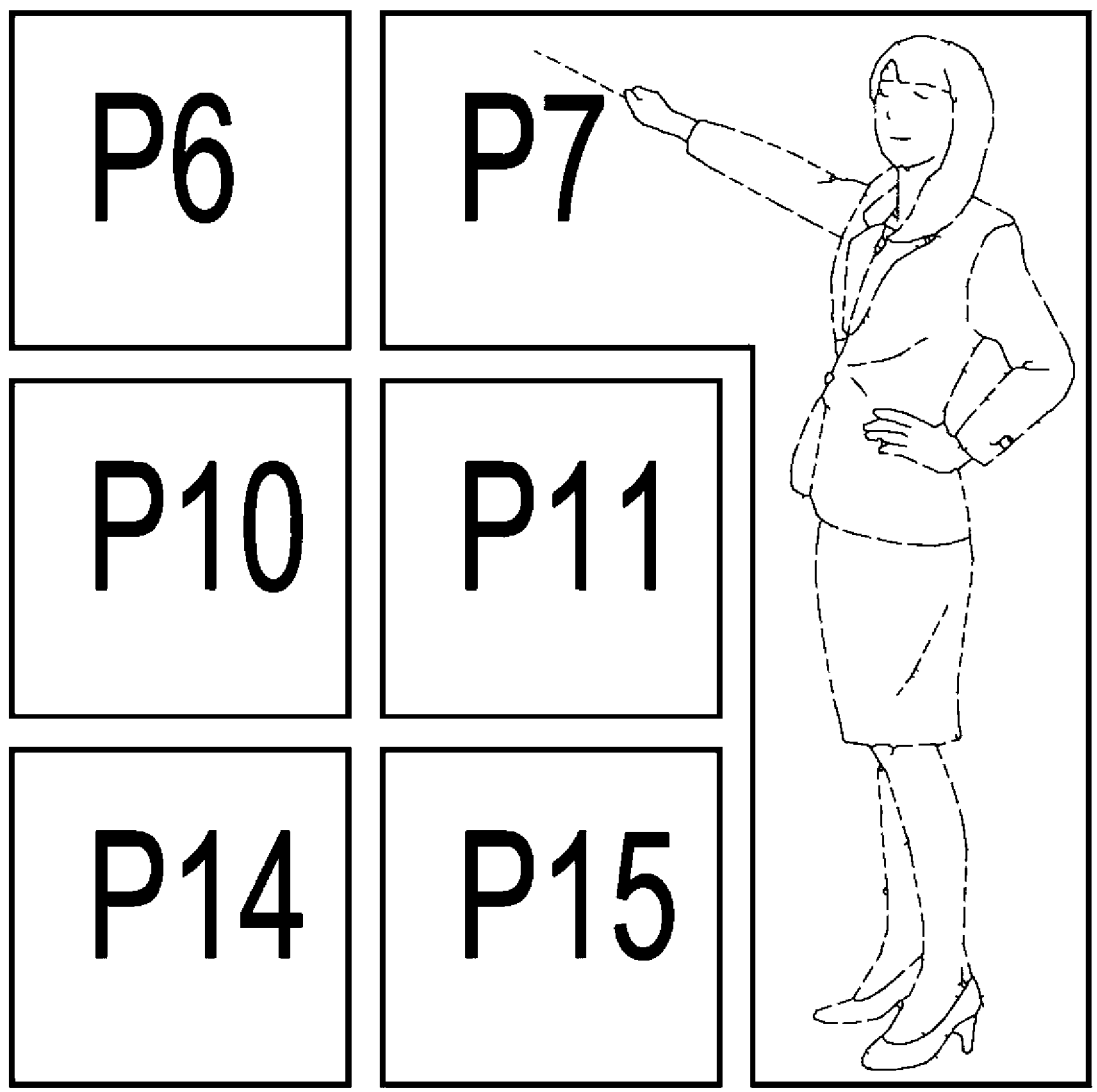
FIG. 27 shows a display example of the key type enlargement area.

The shape other than the quadrilateral may be, for example, a key type such as an L shape shown in FIGS. 26 and 27 in addition to the enclosing frame shape shown in FIG. 25. In FIG. 26A, the enlargement target located at the start point of the trajectory TR is the picture P7. The trajectory TR extends from the picture P7 which is the start point to the picture P8 on the right side and extends downward by changing the direction by 90° from the position of the picture P8 to reach the picture P16 which is the end point. Accordingly, as shown in FIG. 26B, the display cells CL of four squares, in which the pictures P7, P8, P12, and P16 are disposed, overlapping the trajectory TR are designated as the enlargement area. The display cell after the enlargement of the picture P7 has the key type such as the L shape as a whole. As described above, the enlargement area may have the shape other than the quadrilateral.

As an example of the picture P7 shown in FIG. 27, there may be a pose that fits the key type shape depending on the pose of the subject. In the example of the picture P7 shown in FIG. 27, the subject is a standing person and the person poses with right arm extended in the lateral direction. As described above, it is possible to set the shape of the enlargement area to an appropriate shape in accordance with the pose of the subject or the shape of the subject by enabling the enlargement area to have the shape other than the quadrilateral.

As described above, even in the case where the enlargement area has the shape other than the quadrilateral, the trimming can be performed by the same method as in the case described in FIG. 11. That is, for example, the key type display cell and the picture P7 to be enlarged are displayed in an overlapped manner on the trimming position adjustment screen 14D shown in FIG. 11. In this state, the trimming position is adjusted such that the subject in the picture P7 is contained in the display cell.

As described above, in the examples shown in FIGS. 7, 8, 12, 13, 15, 16, 21, 23, 24, 26, and 27, the cell enlargement area determination unit 33A determines that the area where only the plurality of display cells CL overlapping the trajectory TR of the finger F in the swipe gesture are included is the enlargement area.

Modification Example 1-2

As shown in FIGS. 28A and 28B, in the case of designating the enlargement area, the trajectory TR may pass through the same pictures P a plurality number of times. In the examples of FIGS. 28A and 28B, with the display cell CL in which the picture P8 is disposed as the start point S, the trajectory TR extends on the left side toward the picture P7 and then changes the direction by 180° from the picture P7 to extend on the right side toward the picture P8 again. Thereafter, the trajectory TR extends downward by changing the direction by 90° in the picture P8 to reach the picture P16 passing through the picture P12. The trajectory TR extends upward by changing the direction by 180° in the picture P16 and passes through the picture P12 again to set the same picture P8 as the start point S to be the end point E. As described above, in the designation of the enlargement area, the trajectory TR may not be a single stroke in a strict sense of not passing through the display cell CL passed once. As shown in FIGS. 28A and 28B, the display cells CL overlapping the trajectory TR, during which the start point S is designated and then the finger F is separated from the touch panel 12, are designated as the enlargement area.

The operation of designating a picture P, such as the picture P8, located at a position other than the end of the enlargement area as the enlargement target is simplified by allowing such a designation method of the enlargement area. That is, the enlargement target shown in FIG. 26 is the picture P7, and the picture P7 is located at one end of the enlargement area. On the contrary, the enlargement target shown in FIG. 28 is the picture P8, and the picture P8 is located not at the end of the enlargement area but in the middle. As shown in FIGS. 28A and 28B, the operation in the case where a picture P, such as the picture P8, located at a position other than the end of the enlargement area is set as the enlargement target is simplified by allowing the trajectory TR to pass through the same picture P.

Such a designation method is also effective in the case of the shape of the enlargement area such as one row and three columns shown in FIGS. 7 and 8 in addition to in the case of the key type enlargement area of FIG. 28. Also for the case where the enlargement area has the shape of one row and three columns, in a case where the picture P11 in the middle is desired to be set as the enlargement target, the operation is troublesome in a case where the designation method as shown in FIGS. 28A and 28B is not allowed.

For example, even in a case where the designation method of the enlargement area as shown in FIGS. 28A and 28B is not allowed and only the single stroke in a strict sense is accepted as the designation method of the enlargement area, several methods as shown in FIGS. 29 to 31 may be considered as the method of setting the picture P in the middle located at the position other than the end of the enlargement area as the enlargement target.

Figures 29A, 29B, 29C:
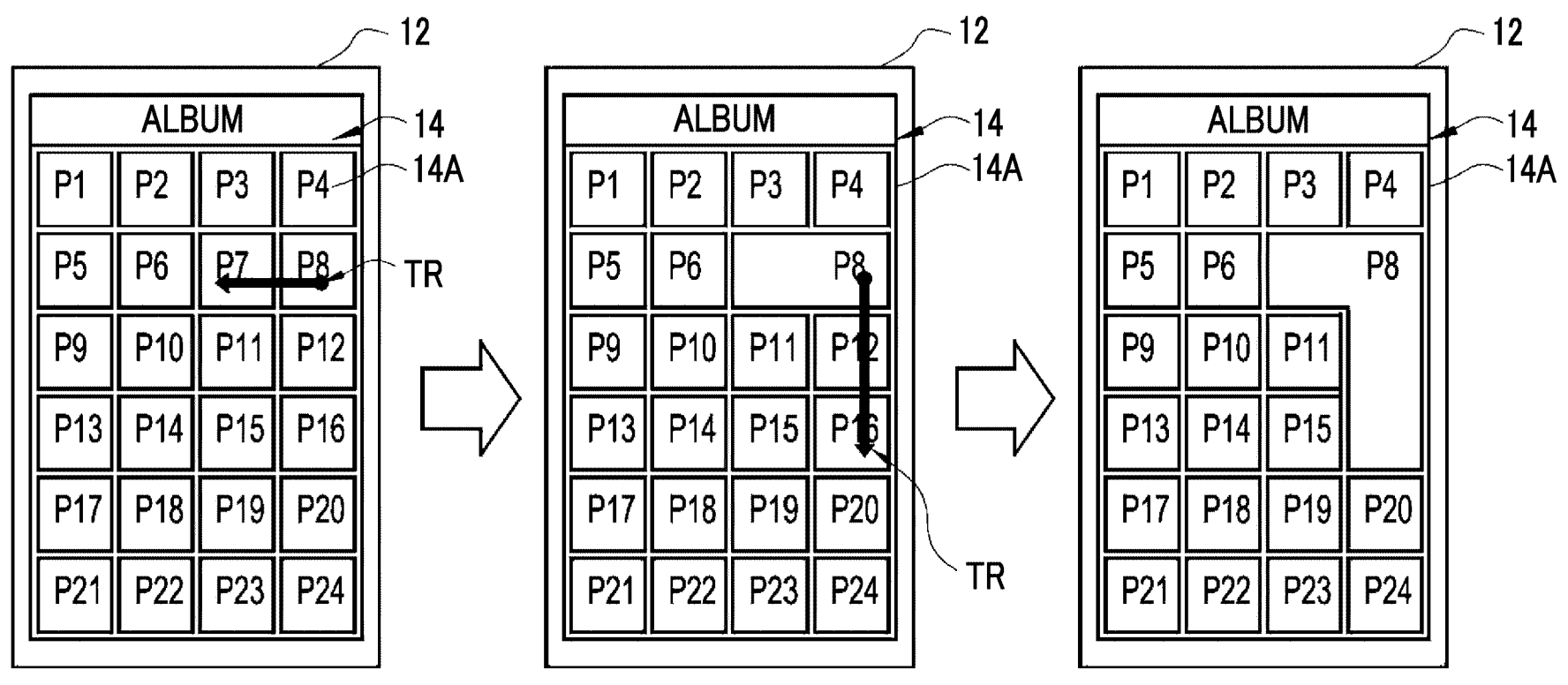

FIGS. 29A, 29B, and 29C are a method of setting the picture P8 located at the position (middle) other than the end of the enlargement area as the enlargement target by a two-stage enlargement operation. In FIGS. 29A, 29B, and 29C, first, the picture P8 is designated as the enlargement target, and the swipe gesture of the linear trajectory TR extending in the lateral direction is performed with the display cell CL of the picture P8 as the start point and the picture P7 as the end point. Accordingly, the picture P8 is extended to one row and two columns as shown in FIG. 29B. Here, furthermore, the swipe gesture of the linear trajectory TR extending downward is performed with the picture P8 as the start point and the picture P16 as the end point. Accordingly, as shown in FIG. 29C, it is possible to enlarge the picture P8 located in the middle of the enlargement area to the key type shape as the enlargement target.

Figure 30A:
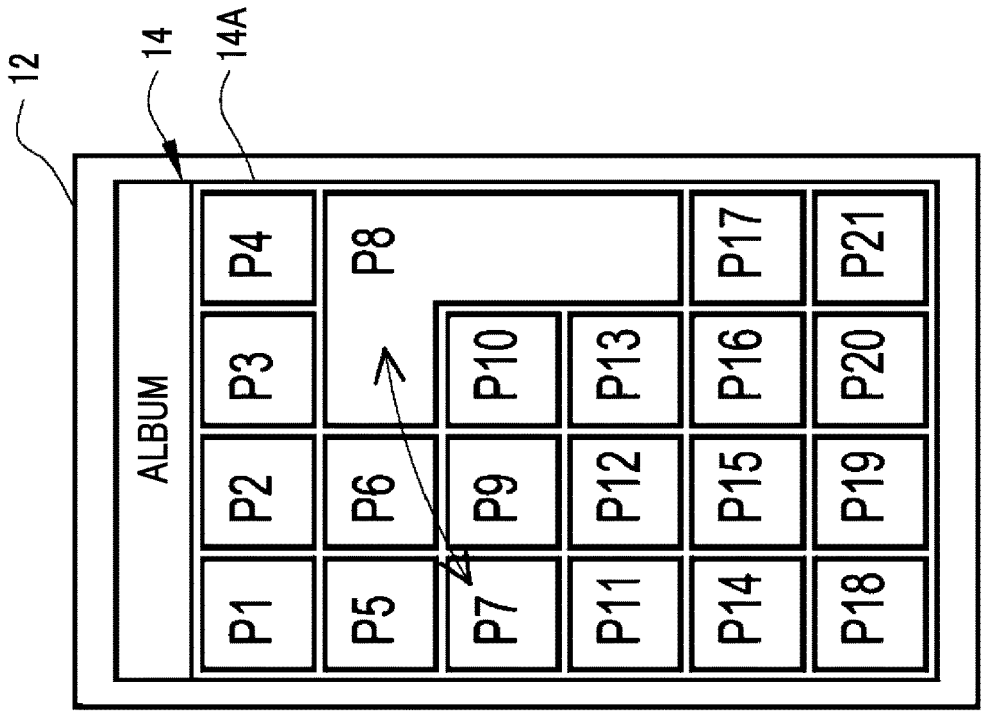
FIGS. 30A and 30B are diagrams showing a second modification example of the designation method of the key type enlargement area.
Figure 30B:
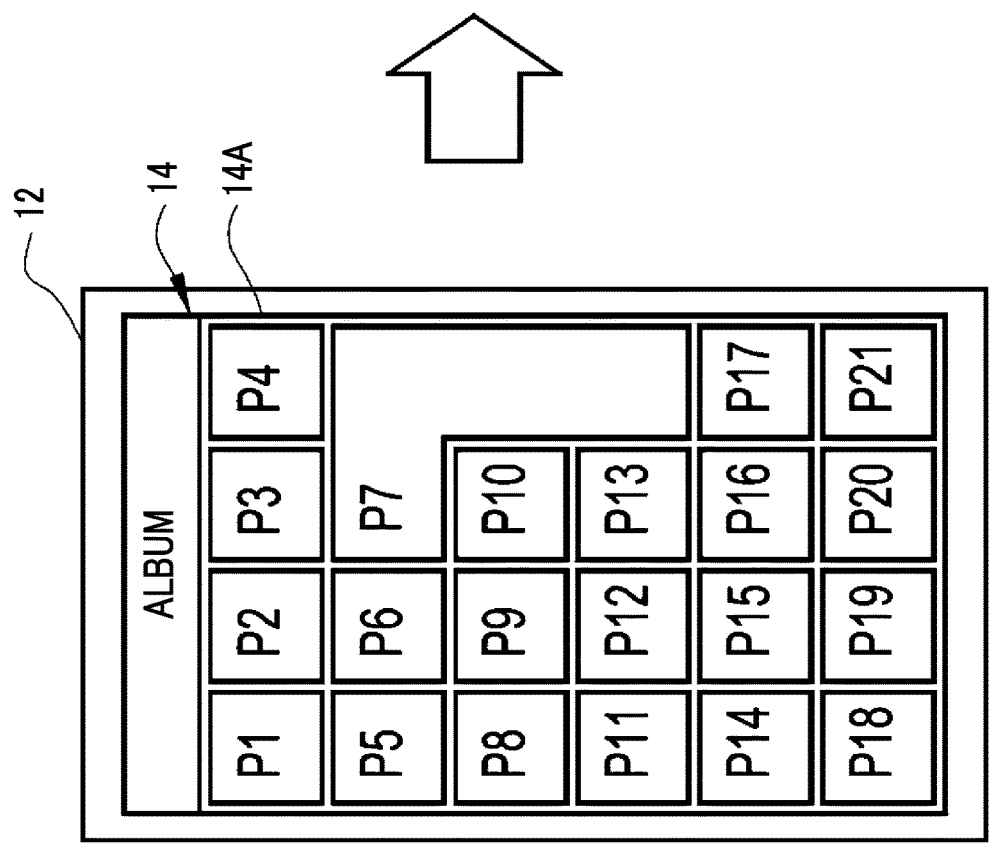

A method shown in FIGS. 30A and 30B may be employed. FIGS. 30A and 30B show the method of setting the picture P8 located at the position (middle) other than the end of the enlargement area as the enlargement target by a two-stage operation of the enlargement and the replacement of the picture P. In FIG. 30, first, the picture P7 located at the end of the enlargement area is enlarged by the same method as in FIG. 26 as shown in FIG. 30A. Thereafter, the display cell CL of the picture P7 is replaced by the display cell CL of the picture P8 to enlarge the picture P8 to the key type. The replacement between the picture P7 and the picture P8 is performed in the same manner as the drag operation shown in FIG. 6.

Figure 31C:
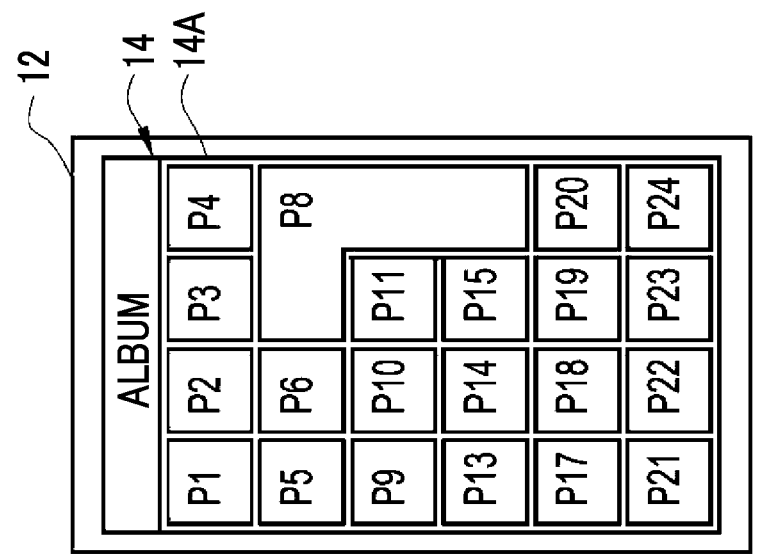
FIGS. 31A, 31B, and 31C are diagrams showing a third modification example of the designation method of the key type enlargement area.
Figure 31B:
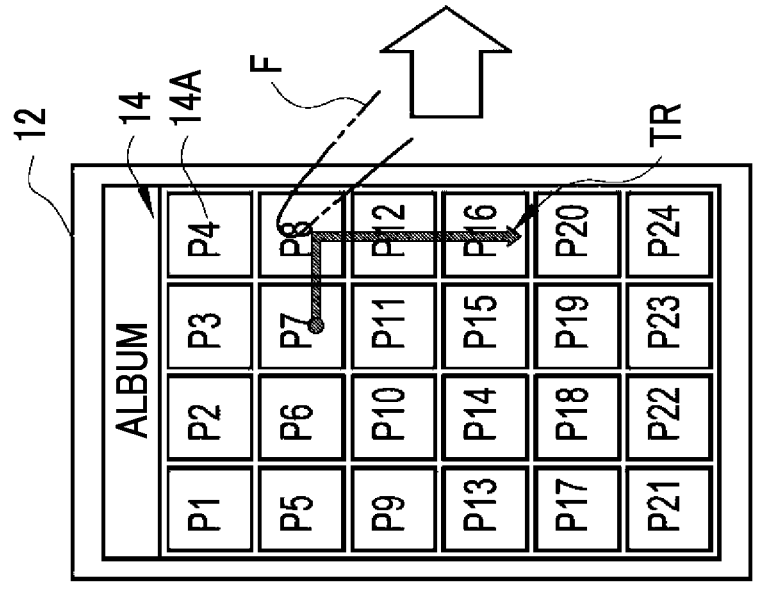
Figure 31A:
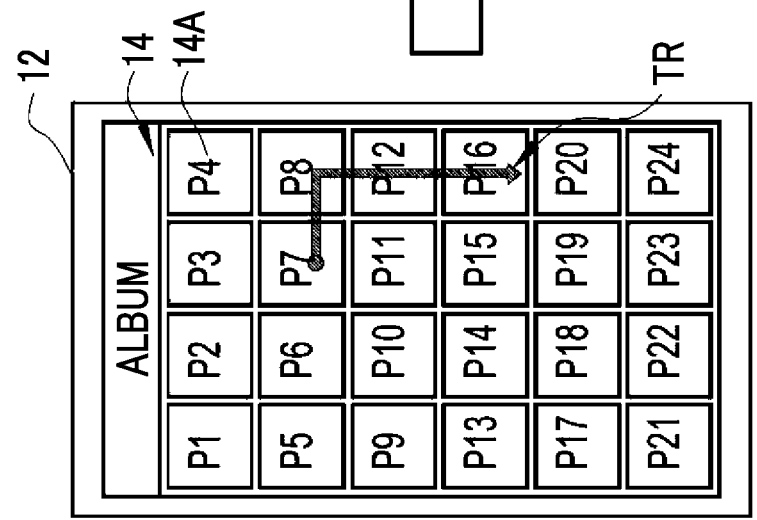

A method shown in FIGS. 31A, 31B, and 31C may also be considered. Contrary to the method of designating the enlargement target first and then designating the enlargement area in designation order, FIGS. 31A, 31B, and 31C show the method of designating the enlargement area first and then designating the enlargement target. As shown in FIG. 31A, first, the swipe gesture of the key type trajectory TR is performed to designate the enlargement area. Next, the picture P8 to be enlarged is designated with the finger F as shown in FIG. 31B. Accordingly, it is possible to enlarge the picture P8 to the key type shape as shown in FIG. 31C.

In the method shown in FIG. 31, the swipe gesture of the trajectory TR may be confused with the scroll operation of the screen in the case of designating the enlargement area shown in FIG. 31A. Therefore, prior to the designation of the enlargement area, for example, it is necessary to input an instruction to enlarge the picture P using the edit menu 14C or the like shown in FIG. 5.

As described above, even in a case where the method shown in FIGS. 28A and 28B is not adopted, the methods as shown in FIGS. 29 to 31 may be considered. However, since the method shown in FIGS. 28A and 28B can be operated by only one swipe gesture, the operation is the easiest compared with the methods shown in FIGS. 29 to 31.

With the contents shown in FIGS. 1 to 31, it is possible to grasp the picture display control device described in the following additional items.

Additional Item A1

A picture display control device comprising:

a screen generation unit that generates a picture arrangement screen displaying a plurality of pictures by arranging in a grid shape a plurality of picture display cells in which pictures are disposed frame by frame and whose sizes change to N times a reference size in units of the reference size;

an operation acceptance unit that accepts a cell enlargement instruction to designate one of the picture display cells and to enlarge the picture display cell through a gesture which is an instruction operation to enlarge the size of the designated picture display cell and the gesture of tracing the picture arrangement screen with a finger;

a cell enlargement area determination unit that determines how many reference sizes in units of the reference size corresponds to the size of the picture display cell after the enlargement and determines what shape an enlargement area after the enlargement has according to a trajectory of the finger in the picture arrangement screen in the gesture for the picture display cell designated as an enlargement target; and an enlargement processing unit that enlarges the picture display cell and the picture of the enlargement target in accordance with the determined enlargement area.

Here, N is a natural number of one or more.

Additional Item A2

The picture display control device according to additional item A1, wherein the gesture is a swipe gesture of tracing the picture arrangement screen with one finger with the picture display cell to be enlarged the picture arrangement screen as a start point.

Additional Item A3

The picture display control device according to additional item A2, wherein the cell enlargement area determination unit determines an enlargement area based on a trajectory of the finger from touching the picture arrangement screen with the finger to separating the finger from the picture arrangement screen.

Additional Item A4

The picture display control device according to additional item A3, wherein the cell enlargement area determination unit determines an area where only picture display cells overlapping the trajectory are included as the enlargement area.

Additional Item A5

The picture display control device according to additional item A3 or A4, wherein the trajectory is allowed to pass through the same picture display cell a plurality number of times in the swipe gesture.

Modification Example 1-3

Figure 32B:
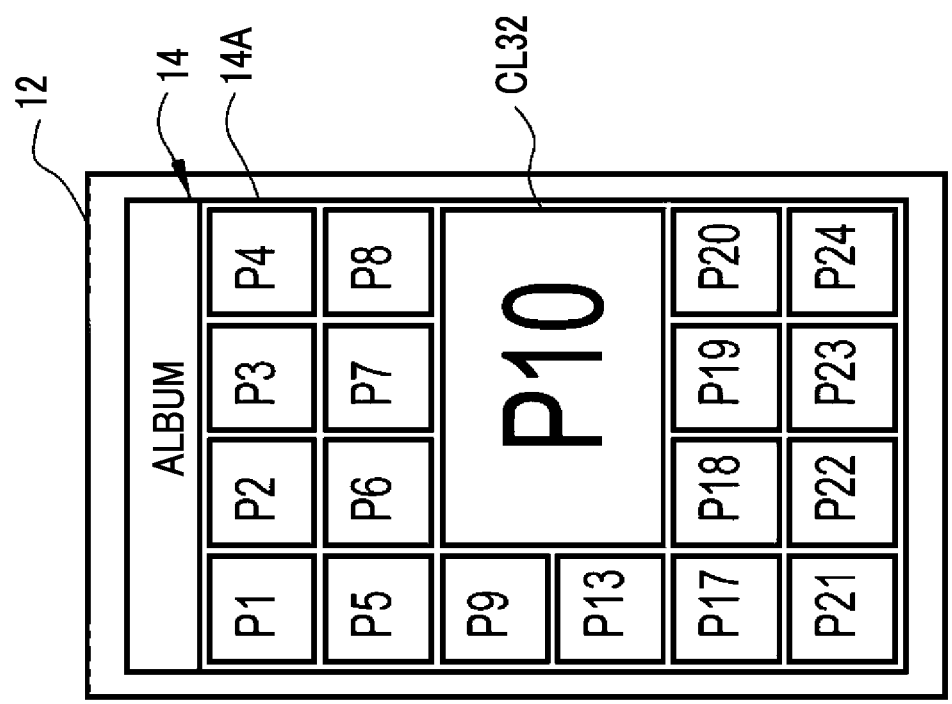
FIGS. 32A and 32B are diagrams of an example of identifying and displaying an enlargement area.
Figure 32A:
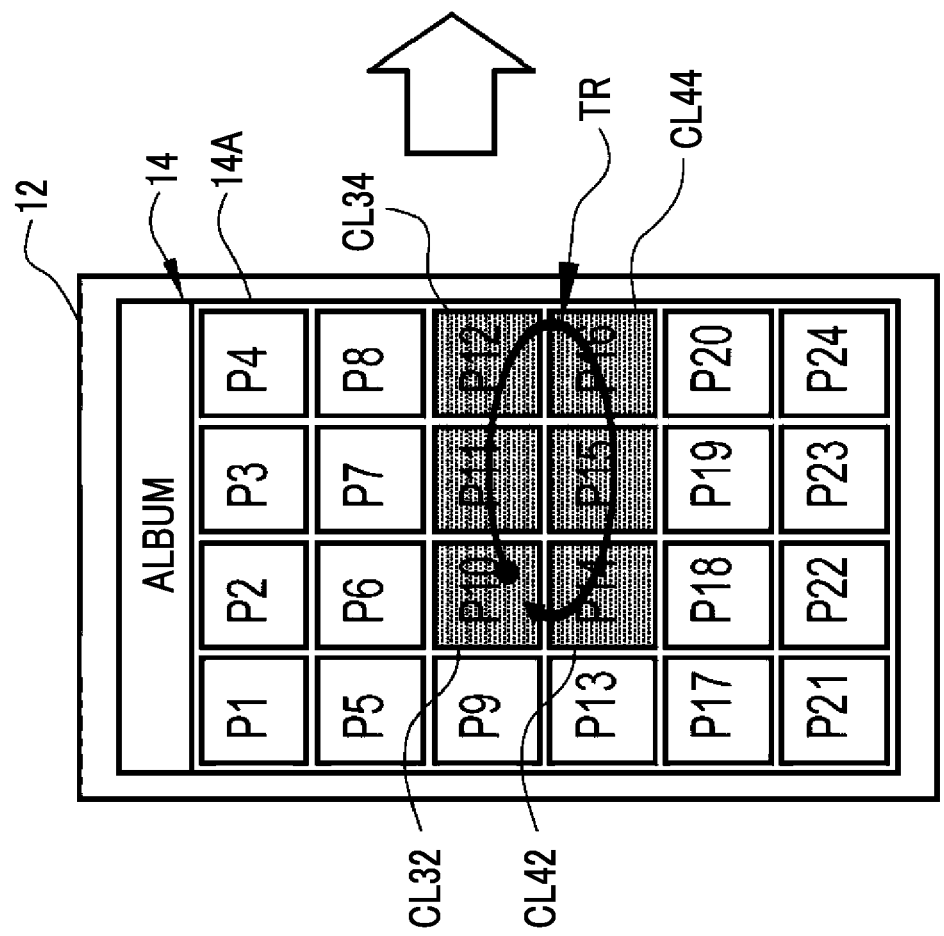

As shown in FIG. 32, in the case of the cell enlargement instruction, the enlargement area overlapping the trajectory TR of the finger F may be displayed in a form identifiable from an area not overlapping the trajectory TR of the finger F during the swipe gesture is performed. As shown in FIG. 32A, the album screen generation unit 34 grays out the enlargement area of six squares of the display cells CL32 to CL34 and the display cells CL42 to CL44 overlapping the trajectory TR of the finger F as indicated by latching or the like during the swipe gesture is performed to display the enlargement area thereof in a form identifiable from the other area.

With this, it is easy for the user 13 to intuitively grasp a range of the enlargement area overlapping the trajectory TR even in the middle of the swipe gesture. Therefore, it is easy to accurately designate a final enlargement area, such as the display cell CL32 shown in FIG. 32B, desired by the user 13.

Modification Example 1-4

As shown in FIGS. 33A and 33B, the display cell CL to be enlarged located at the start point S of the trajectory TR may be displayed in a form identifiable from other display cells CL during the swipe gesture is performed. In the example shown in FIG. 33A, the display cell CL32 in which the picture P10 is disposed is designated as the enlargement target and is the start point S of the trajectory TR. As shown in FIG. 33B, the trajectory TR of the swipe gesture continues from the display cell CL32 in which the start point S is located to the display cells CL in which the pictures P11, P12, and P16 are disposed.

In this case, the album screen generation unit 34 highlights the display cell CL32 in which the start point S is located in a form identifiable from the display cells CL in which the pictures P11, P12, and P16 are disposed. As the form of highlighting the display cell CL32, for example, there is a form of displaying the outer periphery of the display cell CL32 in a thick frame as shown in FIG. 33B. There is no loss of sight of the display cell CL to be enlarged and the picture P even in the middle of the swipe gesture by highlighting the display cell CL to be enlarged as described above.

As shown in FIGS. 34A, 34B, and 34C, various forms of highlighting the display cell CL to be enlarged may be considered. For example, there are a form in which the display cell CL32 to be enlarged blinks as shown in FIG. 34A, a form in which the display cell CL32 to be enlarged is vibrated as shown in FIG. 34B, a form in which the display cell CL32 to be enlarged is expanded or contracted as shown in FIG. 34C, and the like. Any of these forms may be employed as the form of highlighting the display cell CL.

In the examples shown in FIGS. 33 and 34, other display cells CL other than the display cell to be enlarged among the display cells CL in the enlargement area overlapping the trajectory TR are grayed out similar to the example shown in FIG. 32A to display other display cells CL in a form identifiable from other display cells other than the enlargement area.

Figure 35B:
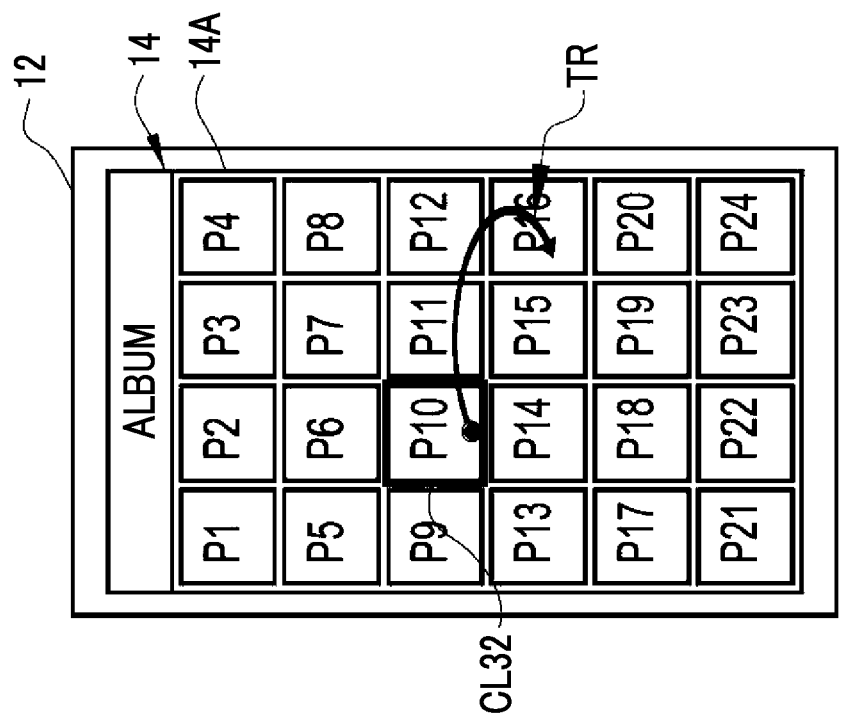
FIGS. 35A and 35B are explanatory diagrams of a modification example of identifying and displaying the enlargement area.
Figure 35A:
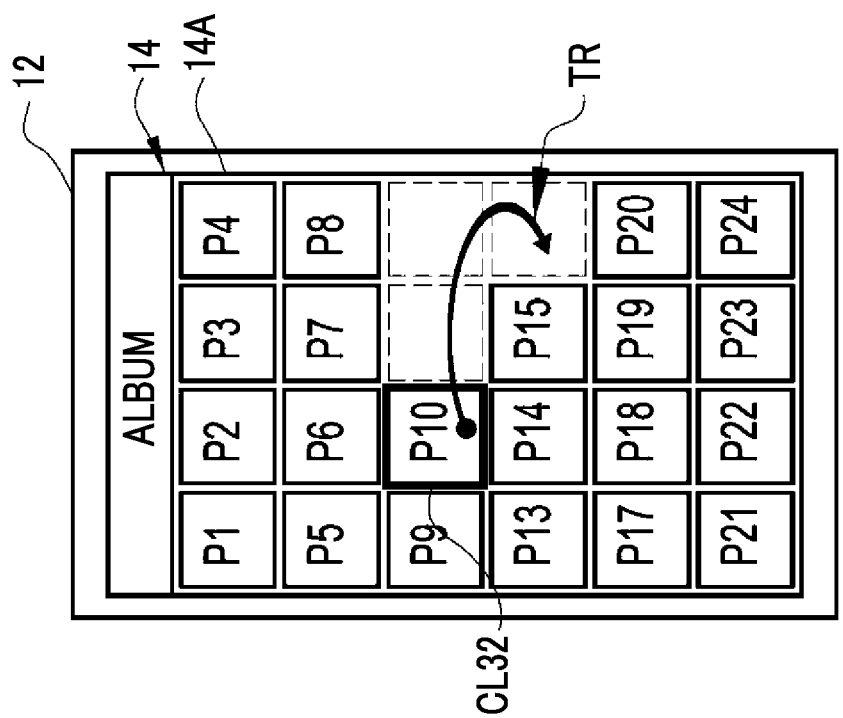

As the identifiable display form of other display cells CL other than the display cell to be enlarged among the display cells CL in the enlargement area overlapping the trajectory TR, a form as shown in FIGS. 35A and 35B may be employed. That is, as shown in FIG. 35A, the outer periphery of the display cell CL to be enlarged (display cell CL32 in the example) is displayed in a thick frame. Other display cells CL can be identified by graying out the display cells CL other than the enlargement target of the enlargement area. FIG. 35B is the same as FIG. 35A in that the outer periphery of the display cell CL to be enlarged is displayed in a thick frame. A different point is that the enlargement area can be identified by displaying the trajectory TR itself. That is, the trajectory TR shown in FIG. 35A is illustrated for convenience while the trajectory TR shown in FIG. 35B is displayed on the album screen 14 such that the user 13 can visually recognize. In this case, it is also possible for the user 13 to intuitively grasp the range of the enlargement area.

Second Embodiment

Figure 36C:
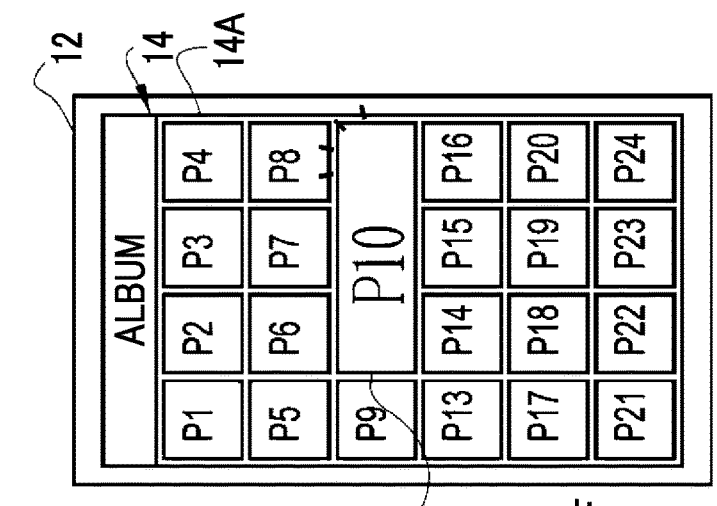
FIGS. 36A, 36B, and 36C are explanatory diagrams showing an enlargement area designation method of one row and three columns according to a second embodiment.
Figure 36B:
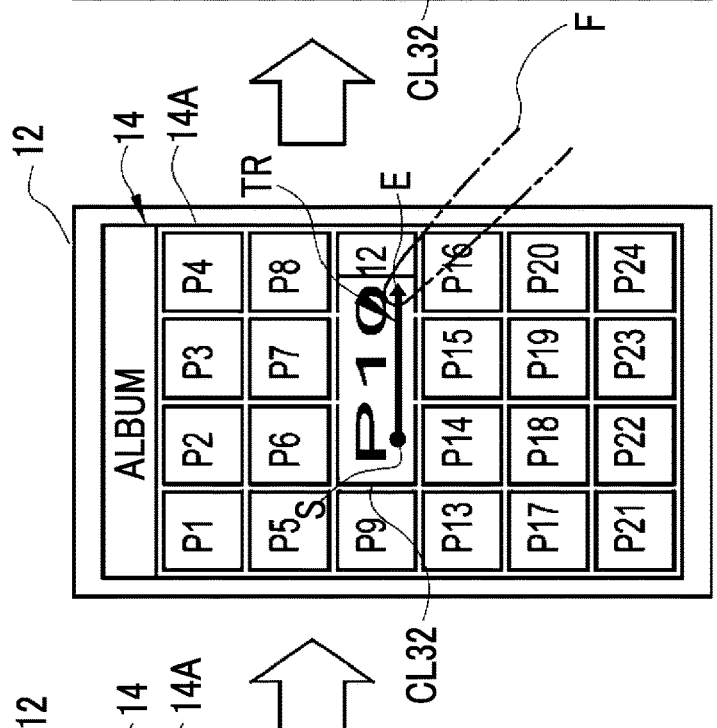
Figure 36A:
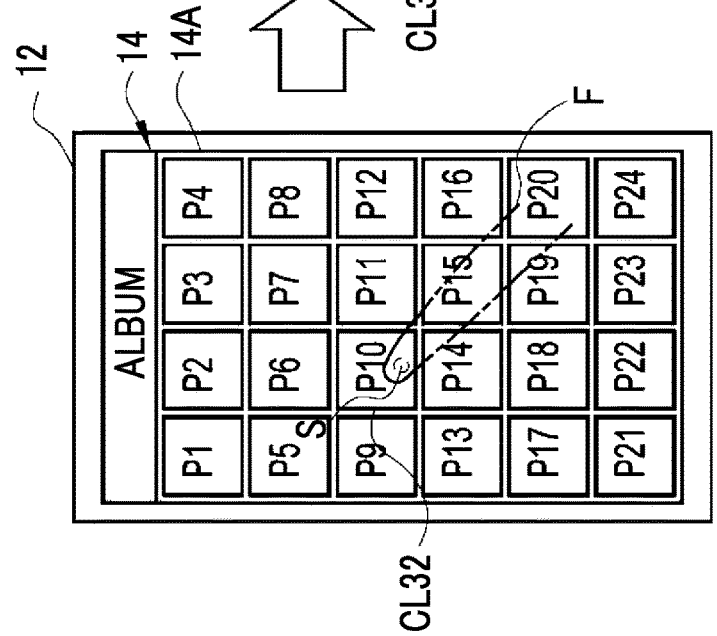

A second embodiment shown in FIGS. 36 and 37 differs from the first embodiment in the designation method of the enlargement area. Since other points are the same as the first embodiment, a different point will be mainly described. As shown in FIG. 36A, the display cell CL to be enlarged (display cell CL32 in the example) is designated. The designation method of the display cell CL to be enlarged is an operation of touching the display cell CL32 with the finger F. The designation method of the enlargement area is performed by the swipe gesture as shown in FIG. 36B without separating the touched finger F from the display cell CL32 to be enlarged in the FIG. 36A. The swipe gesture shown in FIG. 36B is an operation of stretching one end of the display cell CL 11 to be enlarged with the finger F in an enlargement direction. As shown in FIG. 36B, the display cell CL32 to be enlarged and the picture P10 to be disposed in the display cell CL32 are displayed in a stretched state along the trajectory TR on which the finger F moves during the swipe gesture is performed.

In the second embodiment, the cell enlargement area determination unit 33A determines the enlargement area based on the positions of the start point S and the end point E of the trajectory TR of the finger F. In the examples of FIGS. 36A, 36B, and 36C, the trajectory TR is a straight line extending in the lateral direction and there are the display cells CL of three squares from the start point S to the end point E of the trajectory TR. The cell enlargement area determination unit 33A determines that the enlargement area is one row and three columns based on such a trajectory TR. As shown in FIG. 36C, the display cell CL32 to be enlarged and the picture P10 to be disposed in the display cell CL32 are enlarged to a size of the determined enlargement area of one row and three columns.

Figure 37C:
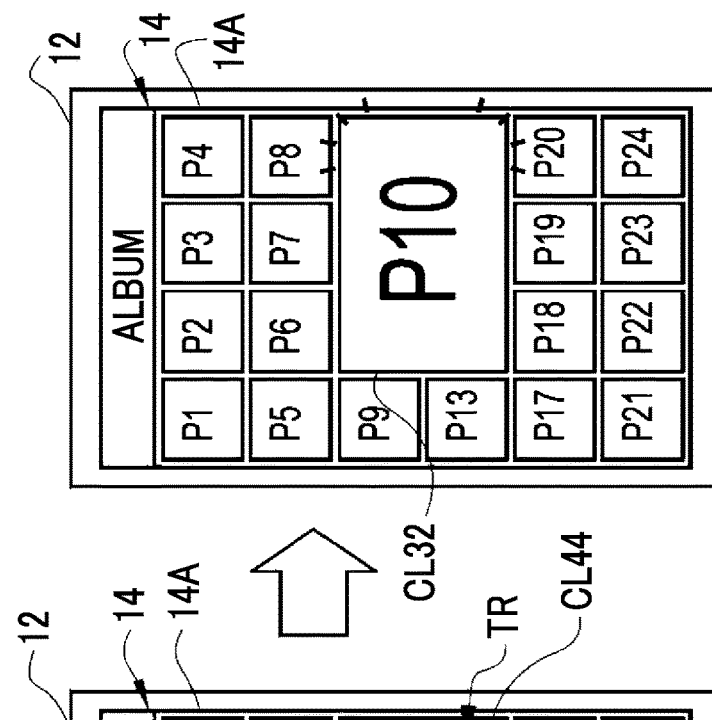
FIGS. 37A, 37B, and 37C are explanatory diagrams showing the enlargement area designation method of two rows and three columns in the second embodiment.
Figure 37B:
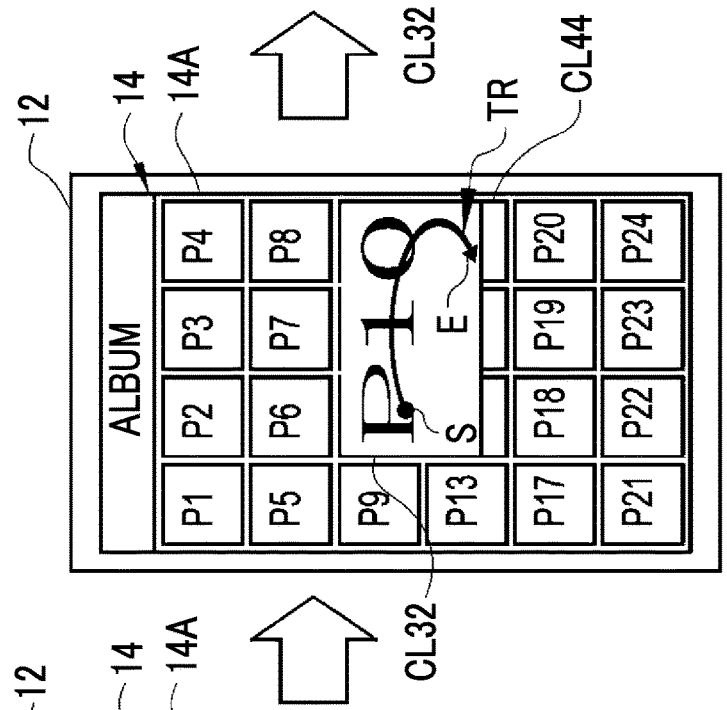
Figure 37A:
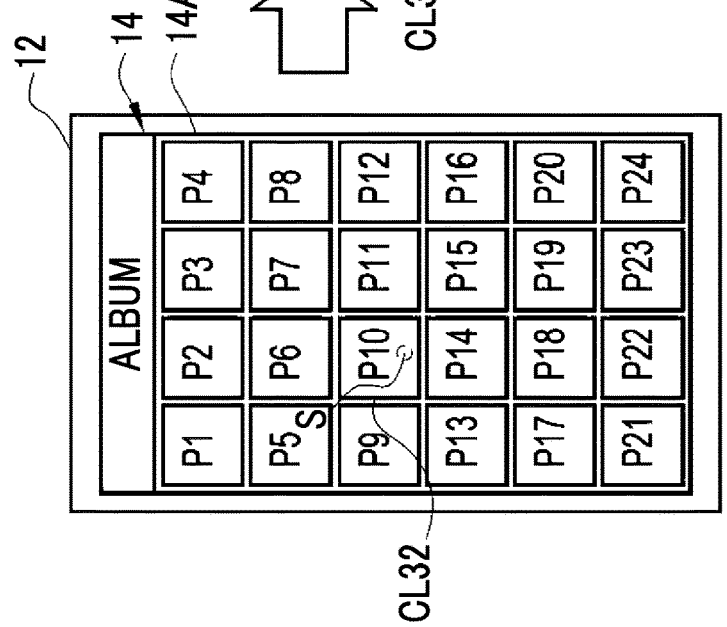

In the examples shown in FIGS. 37A, 37B, and 37C, the display cell CL32 having the reference size of one row and one column is enlarged to the size of the enlargement area of two rows and three columns. As shown in FIG. 37A, the display cell CL32 is touched with the finger F to be designated as the enlargement target. As shown in FIG. 37B, for the enlargement target, the swipe gesture is performed such that one end of the enlargement target is stretched using one finger F while the touched state is maintained from the touched start point S.

The trajectory TR of the swipe gesture shown in FIG. 37B advances on the right side once and changes a path downward after passing through the display cell CL34 such as drawing a circular arc from the start point S. The end point E of the trajectory TR reaches the display cell CL44. The trajectory TR advances by three squares in the lateral direction and advances by two squares in the longitudinal direction. The cell enlargement area determination unit 33A determines that the enlargement area of the display cell CL32 has six squares of two rows and three columns based on the start point S and the end point E of such a trajectory TR. As shown in FIG. 37C, the enlargement processing unit 33 enlarges the display cell CL32 to be enlarged and the picture P10 to the size of the determined enlargement area.

Even in the case where the enlargement area is designated by the operation of stretching one end of the enlargement target as the swipe gesture as in the second embodiment, the enlargement instruction is performed with one finger F similar to the first embodiment. Therefore, it is easy to perform the enlargement instruction even in a case where the screen size of the touch panel 12 is small. Since the operation is intuitively performed also in the second embodiment, it is easy to perform the designation of the enlargement area as intended by the user 13. The picture P10 to be enlarged is displayed in the stretched state along the trajectory TR of the finger F during the swipe gesture is performed. Therefore, it is easy for the user 13 to recognize the picture P to be enlarged also during the swipe gesture is performed.

Modification Example 2-1

FIGS. 38A and 38B are examples of the swipe gesture of the trajectory TR similar to FIGS. 25A and 25B of the first embodiment. In the second embodiment, the enlargement area is determined based on the start point S and the end point E of the trajectory TR. In FIGS. 25A and 25B of the first embodiment, the enlargement area is determined as the hollow form excluding the display cells CL of four squares in the center not overlapping the trajectory TR from the enlargement area.

On the contrary, in the second embodiment, the enlargement area is determined based on the start point S and the end point E. Therefore, even in a case where there is a portion not overlapping the trajectory TR, it is possible to determine the portion as the enlargement area. In the examples of FIG. 38A, the cell enlargement area determination unit 33A determines also the display cells CL of four squares in the center surrounded by the trajectory TR as the enlargement area. Accordingly, as shown in FIG. 38B, the enlargement area of the display cell CL21 having the reference size of one row and one column before the enlargement is determined as an area having the square shape of four rows and four columns in which four squares in the center are added to 12 squares overlapping the trajectory TR.

The mode of determining only the display cells CL overlapping the trajectory TR as the enlargement area as shown in FIGS. 25A and 25B and the mode of determining also the display cells CL surrounded by the trajectory TR as the enlargement area even in the case where there are the display cells CL not overlapping the trajectory TR as shown in FIGS. 38A and 38B may be switchable to separately use both modes. In this case, the cell enlargement area determination unit 33A switches the determination method of the enlargement area depending on a set mode.

Modification Example 2-2

In the second embodiment, the swipe gesture using one finger F is described as the gesture to designate the enlargement area. However, the gesture may be, for example, pinch out in which two fingers F are spread on the display cell CL to be enlarged. Needless to say, the gesture using one finger F is preferable in the case where the screen of the touch panel 12 is small.

In each embodiment described above, the shape of the reference size of the display cell CL is the square shape. However, the shape thereof is not limited to the square shape but may have the rectangular shape. Like the rectangular shape, for example, the rectangular shape having the aspect ratio of 3 longitudinal×4 lateral, 9 longitudinal×16 lateral, or the like may be considered. In a case of the aspect ratio used standardly for such a photograph, the trimming in a case where a picture of the photograph is disposed in the display cell CL is unnecessary.

In the initial state, all the display cell CL may not have the same size. For example, a display cell CL in which a specific picture is disposed may have a size larger than display cells CL in which other pictures are disposed. As the determination method of the specific picture, for example, automatic determination may be performed based on contents (information on date, imaging location, and the like) of exchangeable image file format (EXIF) data attached to picture data.

Using a technique of evaluating a picture by the picture analysis, a picture having high evaluation value may be determined as the specific picture. As the method of evaluating the picture by the picture analysis, for example, there is a method that high evaluation is given to a picture in which a person appears or a picture in focus using a picture evaluation technique as described in JP5655112B. The picture to which high evaluation is given using such a picture evaluation technique is determined as the specific picture.

The size of the display cell CL in which the specific is disposed in the initial state is a size of two rows and two columns of the reference size. With such a size, it is possible to visually emphasize the specific picture compared with other pictures.

Third Embodiment

The portable information terminal 10 of a third embodiment executes scroll processing of replacing a disposition position of a picture P disposed on the album screen 14, which is an example of the picture arrangement screen, frame by frame as the scroll processing. Here, the scroll processing of replacing the disposition position thereof frame by frame is referred to as one-frame scroll. The same numeral is assigned to the same configuration as each embodiment described above and the description thereof is omitted, and a different point will be mainly described.

Figure 39:
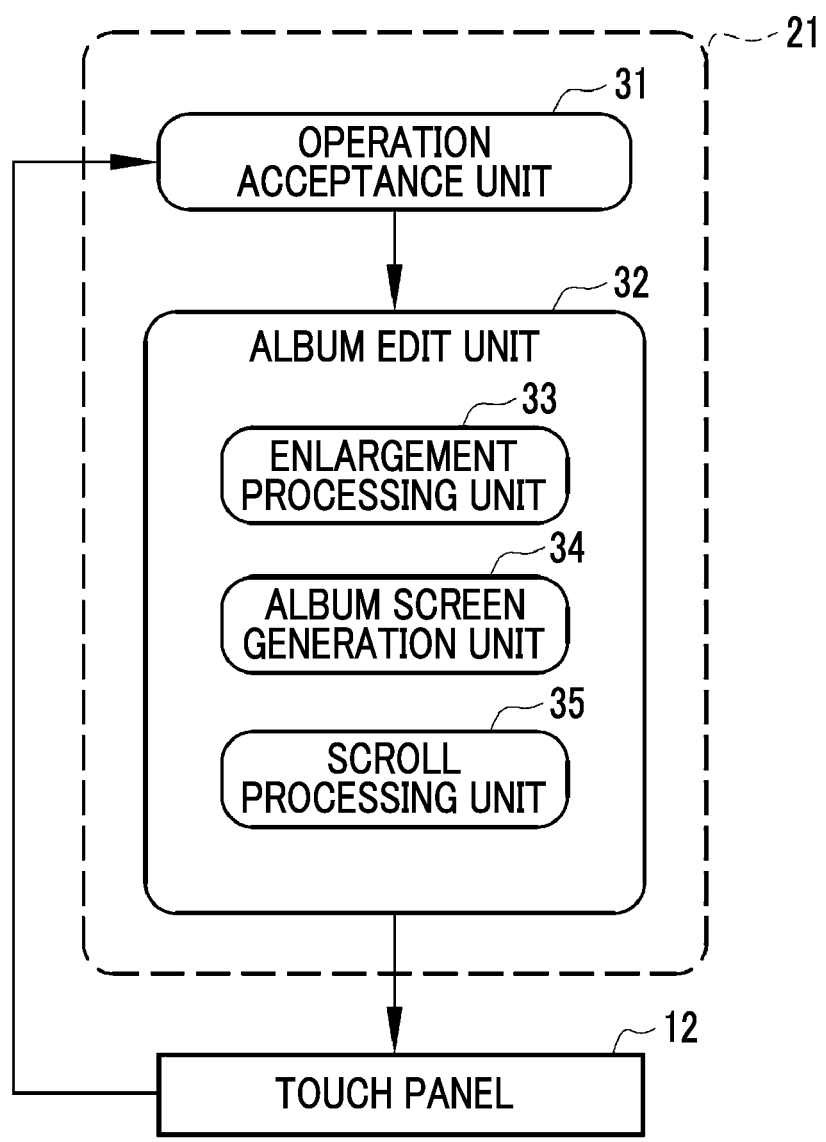
FIG. 39 is a functional block diagram of a third embodiment.

As shown in FIG. 39, the CPU 21 of the portable information terminal 10 functions as a scroll processing unit 35 in addition to the enlargement processing unit 33 and the album screen generation unit 34 in a case where the operating program is activated. The scroll processing unit 35 executes the one-frame scroll of the embodiment in addition to the normal scroll on the album page 14A described in the first embodiment. Here, the normal scroll refers to a row unit scroll shown in FIGS. 40A, 40B, and 40C or a continuous page scroll shown in FIGS. 41A, 41B, and 41C.

As shown in FIGS. 40A, 40B, and 40C, for example, a case where the pictures P of a total of 24 frames in six rows×four columns are displayed on the album screen 14 may be considered. The pictures P of 24 frames are displayed, for example, in the imaging date and time order. Only the pictures P of 24 frames are displayed on the touch panel 12 are displayed, but there are non-displayed pictures P having the imaging dates and times before and after those of the 24 frames in addition to the pictures P of the 24 frames. In FIGS. 40A, 40B, and 40C, the pictures P being displayed on the touch panel 12 are indicated by the solid line in the frame of the touch panel 12, and the non-displayed pictures P not displayed on the touch panel 12 are indicated by two-dot lines outside the frame of the touch panel 12.

In FIGS. 40A, 40B, and 40C, for example, in a case where the swipe gesture of the finger F with respect to the album screen 14 is performed, an execution instruction of the scroll is input to the operation acceptance unit 31 through the touch panel 12. The scroll processing unit 35 receives the execution instruction accepted by the operation acceptance unit 31. The scroll processing unit 35 executes the row unit scroll of shifting each of the disposition positions of the pictures P of 24 frames in row units while the arrangement state of the display cells CL of 24 frames with respect to the touch panel 12 is maintained.

That is, from the state of FIG. 40B where the pictures of 24 frames of pictures P22 to P45 are displayed, for example, a flick gesture of lightly brushing with the finger F is performed downward on the touch panel 12 such that the album screen 14 is fed downward with the finger F. By doing this, as shown in FIG. 40A, the pictures P older than the pictures P being displayed, in the example, the pictures P of four frames for one row of pictures P18 to P21 which have the imaging dates and times older than the picture P22 and are not displayed in the state of FIG. 40B are displayed on the touch panel 12. Instead, the pictures P of four frames for one row of pictures P42 to P45, which have the imaging date and time newer than the picture P41 and are displayed in the state of FIG. 40B, are hidden outside the frame of the touch panel 12 and are not displayed. As described above, in the case where the flick gesture is performed downward, the scroll in a return direction in which the displayed pictures P go back to the past is performed.

Conversely, from the state of FIG. 40B, the flick gesture is performed upward on the touch panel 12 such that the album screen 14 is fed upward with the finger F. By doing this, as shown in FIG. 40C, the pictures P having the imaging dates and times newer than the pictures P being displayed, in the example, the pictures P of four frames for one row of pictures P46 to P49 which have the imaging dates and times newer than the picture P45 and are not displayed in the state of FIG. 40B are displayed on the touch panel 12. Instead, the pictures P of four frames for one row of pictures P22 to P25, which have the imaging date and time older than the picture P26 and are displayed in the state of FIG. 40B, are hidden outside the frame of the touch panel 12 and are not displayed. As described above, in the case where the flick gesture is performed upward, the scroll in a feed direction in which the newer pictures P are displayed is performed.

In the row unit scroll, each of the disposition positions of the pictures P of 24 frames is shifted in row units on the album screen 14 displayed on the touch panel 12 while the arrangement state of the plurality of picture cells CL (24 frames in the example) with respect to the touch panel 12 is maintained.

The continuous page scroll shown in FIG. 41, which is the other normal scroll, is a scroll of relatively moving the entire album page 14A with respect to the touch panel 12. In FIGS. 41A, 41B, and 41C, the precondition that the pictures P of 24 frames are disposed on the album screen 14 and are displayed on the touch panel 12 is the same as FIGS. 40A, 40B, and 40C. In addition, the operation method in which the scroll is performed by the downward or upward flick gesture is also the same as FIGS. 40A, 40B, and 40C.

From the state of FIG. 41B, in a case where the downward flick gesture is performed with the finger F, the album page 14A moves downward with respect to the touch panel 12 as shown in FIG. 41A. Accordingly, the scroll in the return direction in which the pictures P displayed on the touch panel 12 are replaced by the old images P is performed. In the continuous page scroll, the entire album page 14A continuously moves with respect to the touch panel 12, not in row units. Therefore, the non-displayed pictures P18 to P21 gradually enter a display region of the touch panel 12, and the entire pictures P18 to P21 of four frames for one row are displayed in a case where the album page 14A moves by one row.

From the state of FIG. 41B, in a case where the upward flick gesture is performed with the finger F, the album page 14A moves upward with respect to the touch panel 12 as shown in FIG. 41C. Accordingly, the scroll in the feed direction in which the pictures P displayed on the touch panel 12 are replaced by the new images P is performed. In the continuous page scroll, as described above, the non-displayed pictures P46 to P49 gradually enter the display region of the touch panel 12, and the entire pictures P46 to P49 of four frames for one row are displayed in the case where the album page 14A moves by one row.

In the continuous page scroll shown in FIGS. 41A, 41B, and 41C, the entire album page 14A relatively moves with respect to the touch panel 12 including the plurality of display cells CL on the album page 14A unlike the row unit scroll shown in FIGS. 40A, 40B, and 40C. Since the entire album page 14A continuously moves, for example, it is possible to stop the scroll in the middle of the row as shown in FIG. 41A or FIG. 41C. Therefore, in the continuous page scroll, the arrangement state of the display cells CL with respect to the touch panel 12 is not maintained unlike the row unit scroll shown in FIGS. 40A, 40B, and 40C.

The scroll processing unit 35 executes the one-frame scroll shown in FIGS. 42 to 47 in addition to such a row unit scroll and continuous page scroll.

Figure 42:
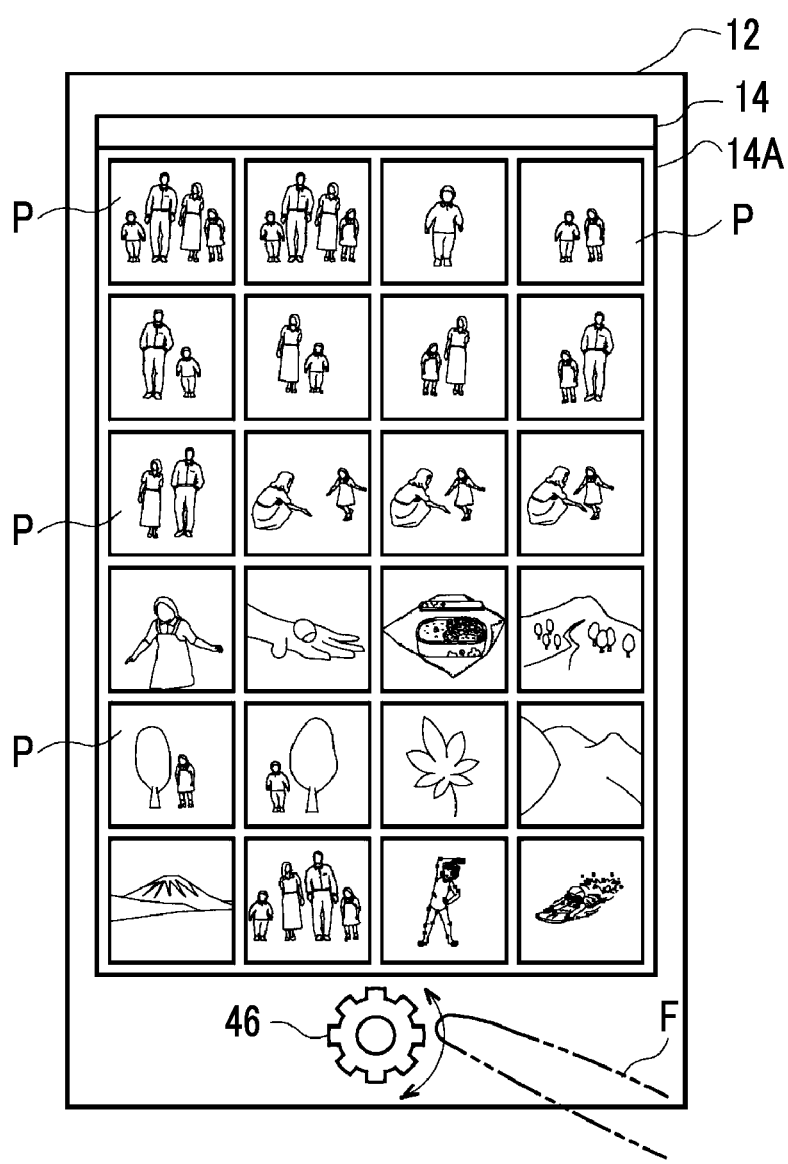
FIG. 42 shows a diagram showing an operation unit of one-frame scroll of the third embodiment.

As shown in FIG. 42, the album screen 14 is provided with a reel unit 46 which is an operation unit of the one-frame scroll. The reel unit 46 is the operation unit composed of a graphical user interface (GUI). The reel unit 46 has a shape imitating a reel or a gear which is a rotation body and has a circular portion. Since the shape imitates the rotation body, the touch operation on the reel unit 46 is a rotation gesture of rotating the finger in a state where the reel unit 46 is touched. Here, the state where the reel unit 46 is touched includes a state where the periphery (for example, range of about 10 mm from the outer periphery) of the reel unit 46 is touched.

In a case where the touch operation is performed on the reel unit 46, the execution instruction of the one-frame scroll is input to the operation acceptance unit 31. As described above, the operation acceptance unit 31 accepts the execution instruction of the one-frame scroll (scroll processing) through the touch operation on the reel unit 46.

The scroll processing unit 35 executes the one-frame scroll in a case where the operation acceptance unit 31 accepts the execution instruction.

The operation acceptance unit 31 performs a performance of rotating the reel unit 46 in accordance with the rotation gesture in a case where the rotation gesture with respect to the reel unit 46 is accepted. Specifically, the operation acceptance unit 31 rotates the reel unit 46 displayed on the touch panel 12 by picture processing to perform a visual performance as if the reel unit 46 is rotated by the rotation gesture of the finger F.

Figure 43:
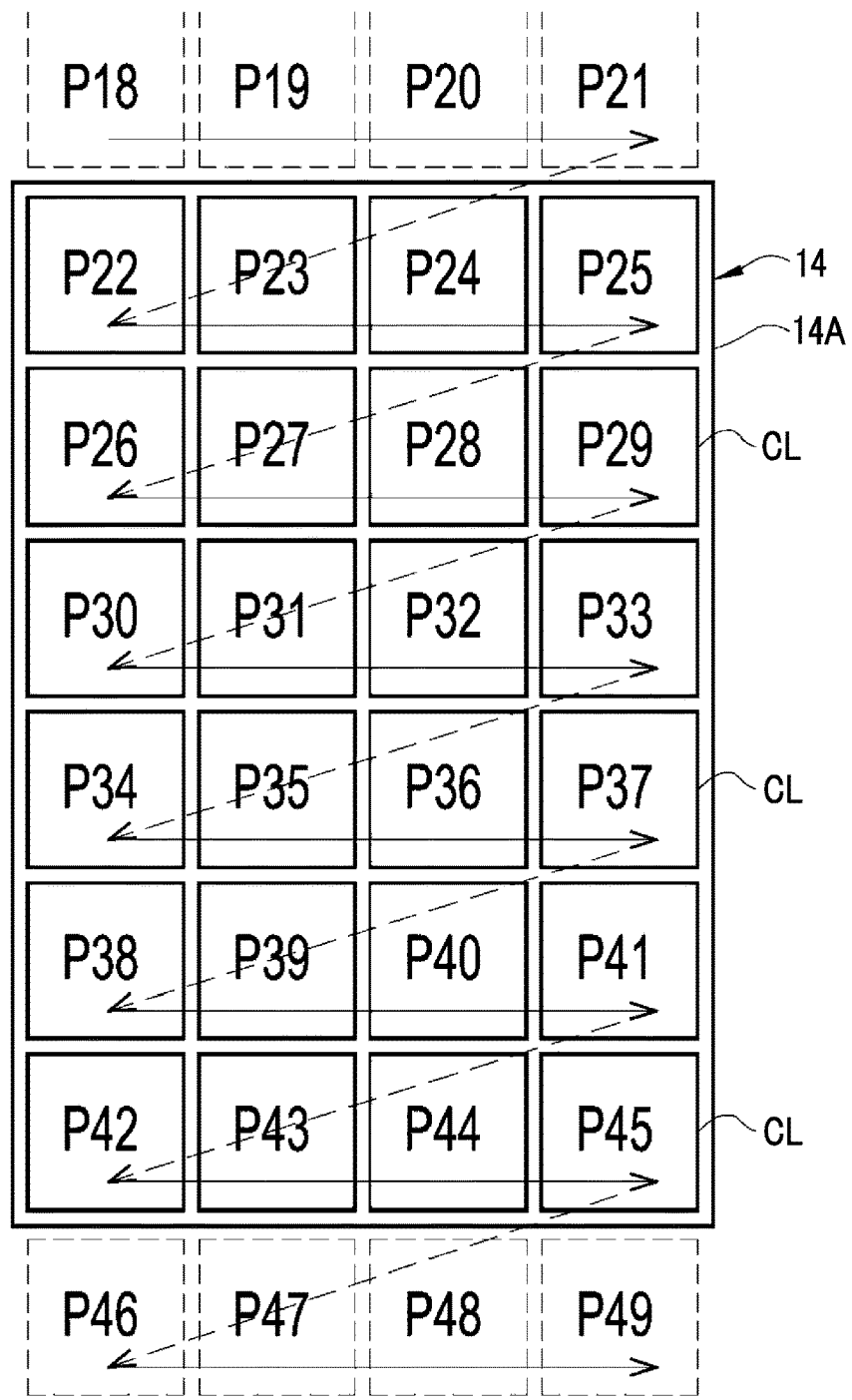
FIG. 43 shows a diagram showing a movement path in a return direction in the one-frame scroll.
Figure 44:
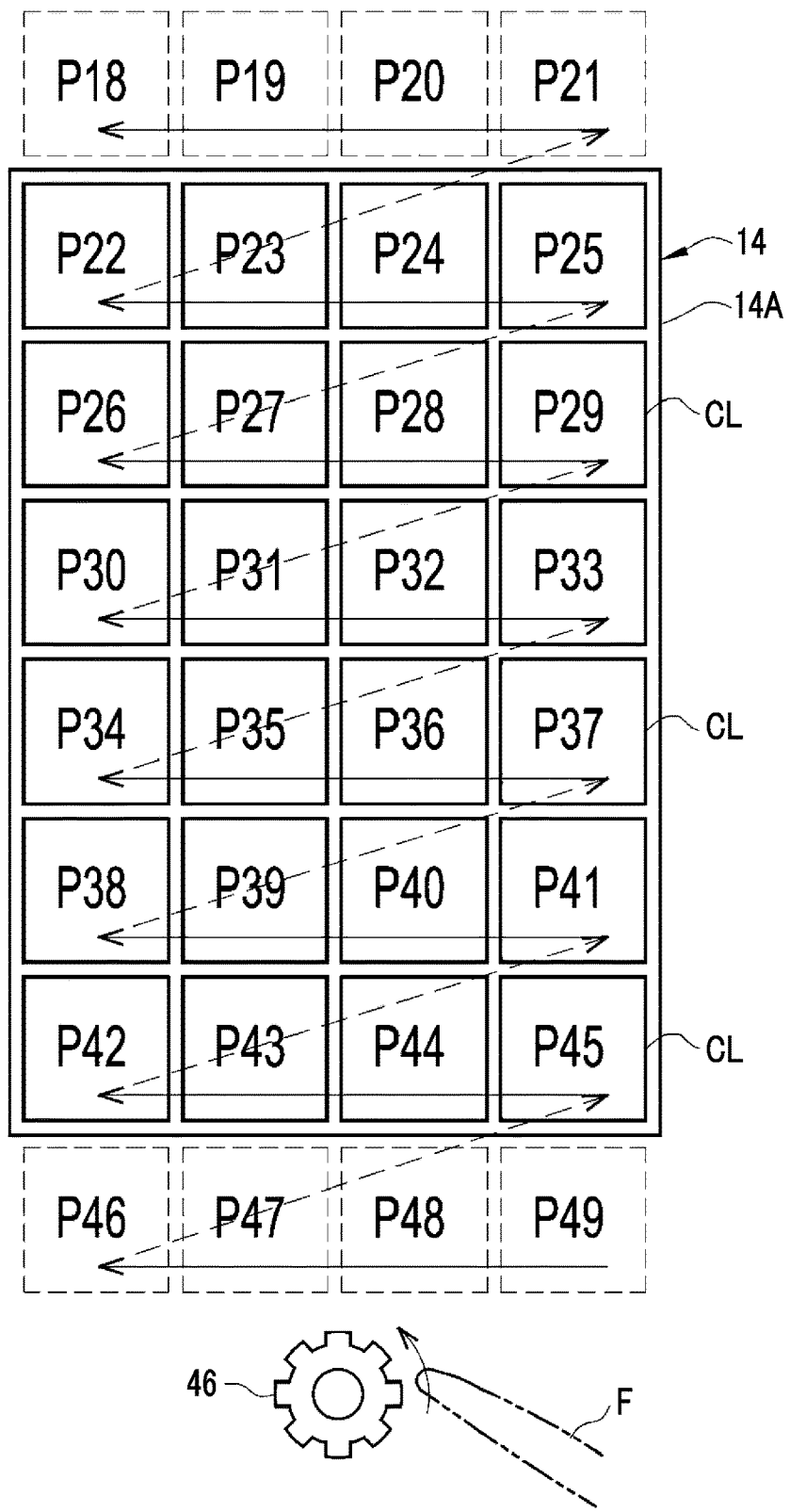
FIG. 44 is a diagram showing a movement path in a feed direction in the one-frame scroll.
Figure 45C:
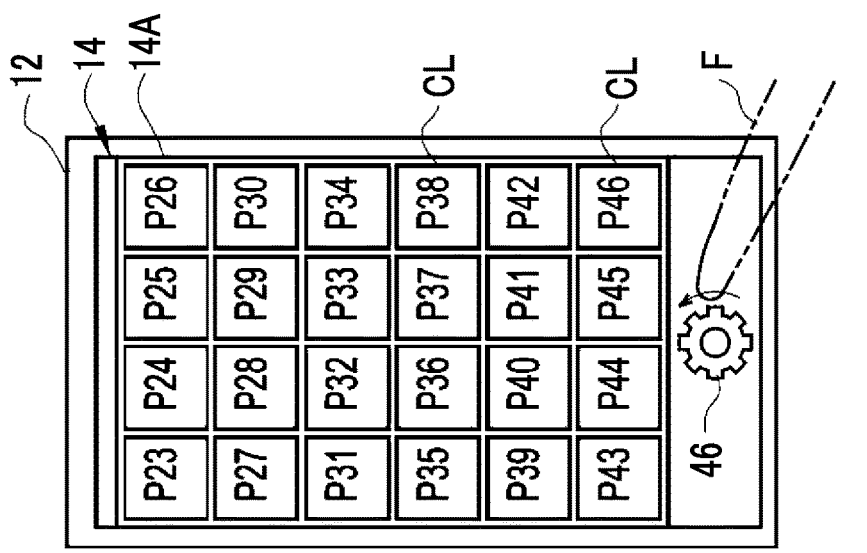
FIGS. 45A, 45B, and 45C are diagrams showing the one-frame scroll.

As shown in FIGS. 43 to 45, the one-frame scroll is scroll processing of shifting each of the disposition positions of the plurality of pictures P frame by frame while the arrangement state of the plurality of display cells CL with respect to the touch panel 12 is maintained. The one-frame scroll is the same as the row unit scroll shown in FIGS. 40A, 40B, and 40C in that the one-frame scroll is the processing of replacing the pictures P to be disposed in the plurality of display cells CL arranged in the album screen 14 while the arrangement state of the display cells CL is maintained. However, the one-frame scroll differs from the row unit scroll shown in FIGS. 40A, 40B, and 40C in that each of the disposition positions of the plurality of pictures P is moved not in the row units but in the frame units of frame by frame.

In FIGS. 43 and 44, arrows indicate movement paths of each picture P in the one-frame scroll. The arrow shown in FIG. 43 indicates the movement path of the picture P in a case where a rotation gesture to rotate the reel unit 46 clockwise is performed. The example of FIG. 43 shows the movement path in the case of the scroll in the return direction. In the scroll in the return direction, the pictures P displayed on the touch panel 12 are replaced by the pictures P having old imaging dates and times frame by frame. The pictures P having new imaging dates and times are saved to the non-display region from the latest picture P in place of the pictures P having old imaging dates and times.

In the example shown in FIG. 43, the pictures P21, 20, 19, and • • • older than the picture P22 enter the display region frame by frame, and the saving to the non-display region is sequentially performed from the latest picture P45. For the plurality of display cells CL in the album screen 14 being displayed on the touch panel 12, the disposition position of each picture P is moved frame by frame along the movement path indicated by the arrow.

Conversely, the arrow shown in FIG. 44 indicates the movement path of the picture P in a case where a rotation gesture to rotate the reel unit 46 counterclockwise is performed. The example of FIG. 44 shows the movement path in the case of the scroll in the feed direction. In the scroll in the feed direction, the pictures P displayed on the touch panel 12 are replaced by the pictures P having new imaging dates and times frame by frame. The pictures P having old imaging dates and times are saved to the non-display region in place of the pictures P having new imaging dates and times.

In the example shown in FIG. 44, the pictures P46, 47, 48, and • • • older than the picture P22 enter the display region frame by frame, and the saving to the non-display region is sequentially performed from the latest picture P45. For the plurality of display cells CL in the album screen 14 being displayed on the touch panel 12, the disposition position of each picture P is moved frame by frame along the movement path indicated by the arrow.

A movement form of the example has a Z shape as the entire album screen 14.

Specifically, the album screen 14 has a plurality of rows in which the plurality of display cells CL are arranged. In the example, there are six rows in which four display cells CL are arranged.

The scroll processing unit 35 moves a picture P to be disposed in a display cell CL located at one end in a row to a display cell CL located at an end of an adjacent next row in the one-frame scroll (scroll processing). More specifically, in the example, in the case where the picture P located at the end of the row is moved to the next row, the scroll processing unit 35 moves the picture to the end on a side opposite to the end of the row before the movement.

In the scroll in the return direction shown in FIG. 43, in a case where the scroll for one frame is performed, the picture P25 in a first row is moved to a second row which is the next row adjacent to the first row. In this case, the picture P25 located on the right end in the first row is moved to the left end on a side opposite to the right side of the first row before the movement in the second row in the case of being moved to the second row.

The scroll processing unit 35 moves frame by frame other pictures P other than the picture P to be disposed in the display cell CL located at one end to the display cells CL adjacent in the rows. For example, in the first row shown in FIG. 43, the pictures P22 to P24 other than the picture P25, moving to the second row and to be disposed in the display cell CL located at the left end, are respectively moved frame by frame to the right adjacent display cells CL adjacent to each other in the first row.

The case of the scroll in the feed direction shown in FIG. 44 is the same as that in FIG. 43 except that a movement direction is different. That is, in the example shown in FIG. 44, in the case where the scroll for one frame is performed, the picture P42 in a sixth row is moved to a fifth row which is the next row adjacent to the sixth row. In this case, the picture P42 located at the left end in the sixth row is moved to the right end on a side opposite to the left end of the sixth row in the fifth row before the movement in the case of being moved to the fifth row which is the next row of the sixth row.

The scroll processing unit 35 moves frame by frame other pictures P other than the picture P to be disposed in the display cell CL located at one end to the display cells CL adjacent in the rows. For example, in the sixth row shown in FIG. 44, the pictures P43 to P45 other than the picture P42, moving to the fifth row and to be disposed in the display cell CL located at the right end, are respectively moved frame by frame to the left adjacent display cells CL adjacent to each other in the sixth row. In this manner, each picture P is moved frame by frame in the Z shape as a whole.

Figure 45B:
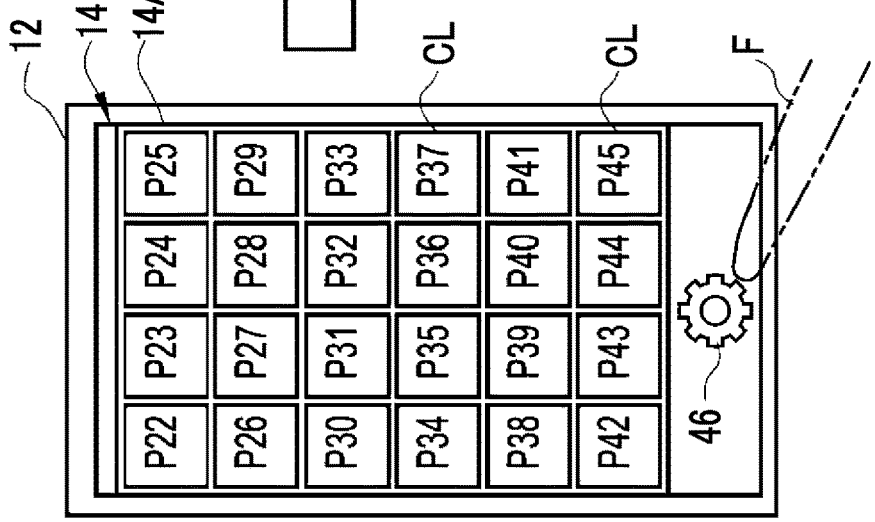
Figure 45A:
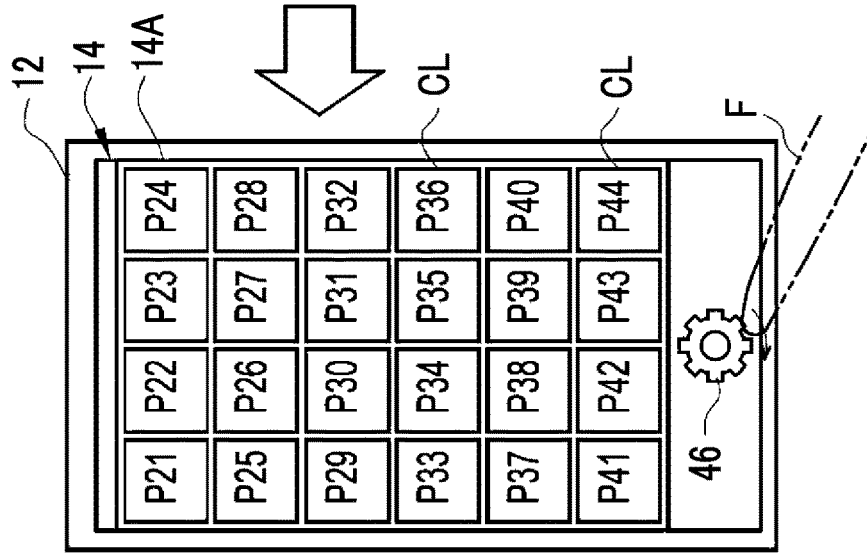

As shown in FIG. 45, in a state of FIG. 45B, in a case where the rotation gesture is performed for one frame clockwise with the finger F with respect to the reel unit 46, the scroll in the return direction is performed. Accordingly, the picture P21 older than the picture P22 being displayed in FIG. 45B enters the display region of the touch panel 12. The latest picture P45 displayed in FIG. 45B is saved to the non-display region. Conversely, in the state of FIG. 45B, in a case where the rotation gesture is performed for one frame counterclockwise with the finger F with respect to the reel unit 46, the scroll in the feed direction is performed. Accordingly, the picture P46 newer than the latest picture P45 being displayed in FIG. 45B enters the display region of the touch panel 12. The oldest past picture P22 displayed in FIG. 45B is saved to the non-display region in FIG. 45A.

Figure 46:
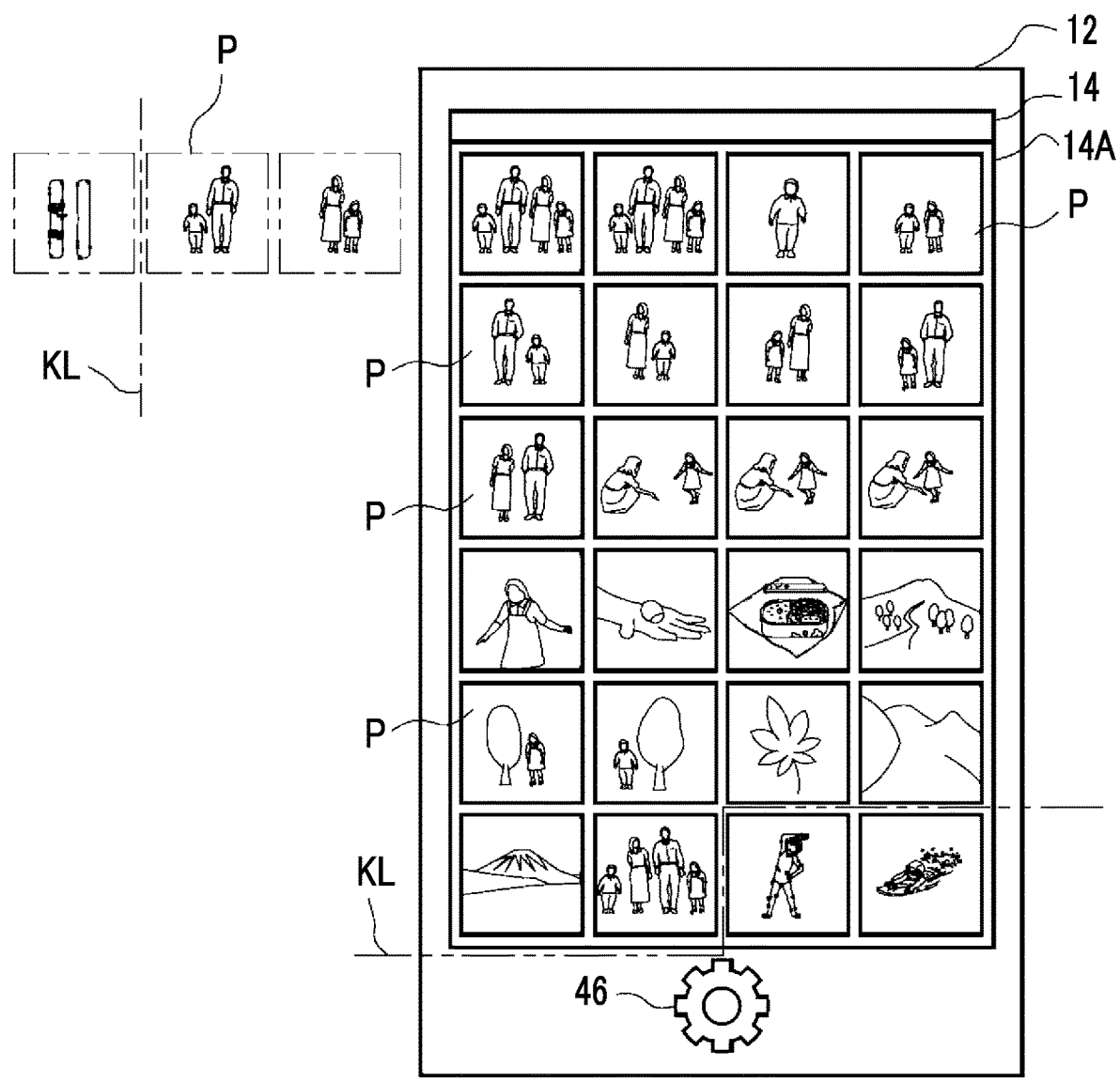
FIG. 46 is a diagram showing a case where photographs at different events are mixed on the album screen.
Figure 47:
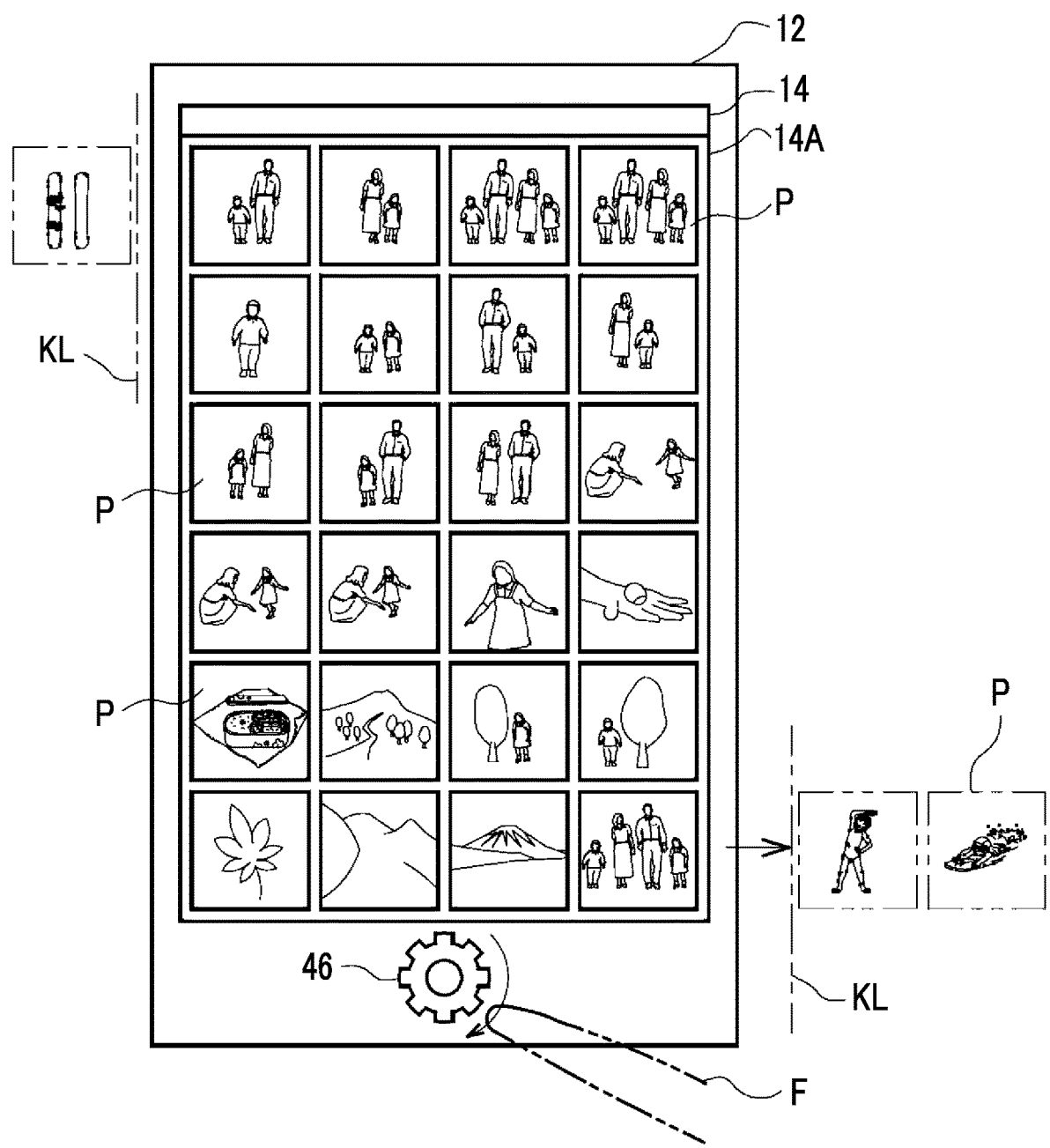
FIG. 47 is a diagram showing an effect of the one-frame scroll.

With such a one-frame scroll, the effects as shown in FIGS. 46 and 47 are obtained. In an example shown in FIG. 46, most of the pictures displayed on the album screen 14 are photographs imaged in a case where a family goes hiking in the mountain. However, pictures P of two frames on the right side in the sixth row are photographs in which a child swims, and a group of the pictures P is different from that of the photographs of the hiking with a boundary line KL as a boundary. As indicated by two-dot lines on the upper left of FIG. 46, in the non-display region, it is assumed that there are just two frames of hiking photographs and a photograph of another group as indicated by the boundary line KL before the hiking photographs.

As described above, in a case where the photographs of different events are mixed in the album screen 14, there may be a case where it is desired to collect the photographs included in one screen in the same event. For example, there is a case where it is desired to collect only the hiking photographs as the photographs in the album screen 14 and exclude the photographs of the events other than the hiking, such as a case of printing the album screen 14 on which the hiking photographs are arranged. In the example shown in FIG. 46, since the scroll is performed only in row units in the row unit scroll shown in FIG. 40 or the continuous page scroll shown in FIG. 41, it is impossible to exclude the photographs of other events separated by the boundary line KL only by the scroll operation.

On the contrary, with the one-frame scroll in the example, it is possible to collect only the hiking photographs on the album screen 14 as shown in FIG. 47 by performing the scroll in the return direction for two frames.

As in the portable information terminal 10, in the case where the input by the touch operation on the touch panel 12 is mainly performed as the input of the operation instruction, it is difficult to perform a complicated operation to collect a group of related pictures. With the technique of the disclosure, the group of pictures to be displayed on the touch panel 12 can be easily collected as the group of related pictures only by the simple operation of the scroll operation.

The touch operation of one-frame scroll is the rotation gesture to rotate the finger F in the state of touching the reel unit 46 which is one example of the operation unit. With such a rotation gesture, it is possible to perform the intuitive operation such as winding up the pictures P frame by frame and thus for the user 13 to obtain good operation feeling.

There are the following advantages by setting the touch operation of one-frame scroll as the rotation gesture. That is, as described in the row unit scroll (refer to FIG. 40) described above, the flick gesture of lightly brushing with the finger F is common as the touch operation of the scroll in the state of touching the screen of the touch panel 12. Such a flick gesture is similar to the swipe gesture, shown in FIG. 13 and the like, as the touch operation to designate the enlargement area of the display cell CL. Therefore, there may be a case where it is difficult to distinguish the flick gesture and the swipe gesture in the portable information terminal 10 depending on the performance of the touch panel 12.

As described below, of course, it is possible to combine the function of the one-frame scroll and the enlargement function of the display cell CL in the portable information terminal 10. The rotation gesture is significantly different from the swipe gesture compared with the flick gesture. Therefore, even in the case where the function of the one-frame scroll and the enlargement function of the display cell CL are combined, it is easy to distinguish the rotation gesture from the swipe gesture which is the touch operation to designate the enlargement area by setting the touch operation of one-frame scroll as the rotation gesture. Accordingly, a possibility that the portable information terminal 10 erroneously recognizes the touch operation of one-frame scroll and the designation operation of the enlargement area of the display cell CL is reduced.

The operation acceptance unit 31 performs a performance of rotating the reel unit 46 in accordance with the rotation gesture in a case where the rotation gesture is accepted. Since the reel unit 46 is rotated in accordance with the rotation gesture, it is possible for the user 13 to obtain operating feeling visually and thus further to obtain good operation feeling. The reel unit 46 has the circular portion. Therefore, the reel unit 46 has good matching with the rotation gesture and has less visual discomfort. Of course, the performance of rotating the reel unit 46 may not be performed only by displaying the reel unit 46 as the operation unit.

The touch operation of one-frame scroll is not limited to the rotation gesture but may be other gestures. The form of the operation unit may also not be formed of teeth such as the reel unit 46 but may be a simple circle. In a case where the touch operation is a gesture other than the rotation gesture, the operation unit may also not be the circle, and the shape of the operation unit may be, for example, a lever shape or a pair of left and right arrow shapes. As described above, even in the case where the touch operation is a gesture other than the rotation gesture, there is an advantage that the erroneous recognition as the swipe gesture, which is the designation operation of the enlargement area of the display cell CL, is reduced as long as the gesture is a gesture that is clearly distinguishable from the swipe gesture.

In the example, in the one-frame scroll, the picture P is moved in Z shape as shown in FIGS. 43 and 44. Therefore, the manner of movement of the picture P is natural and thus there is little discomfort.

Modification Example 3-1

Figure 48:
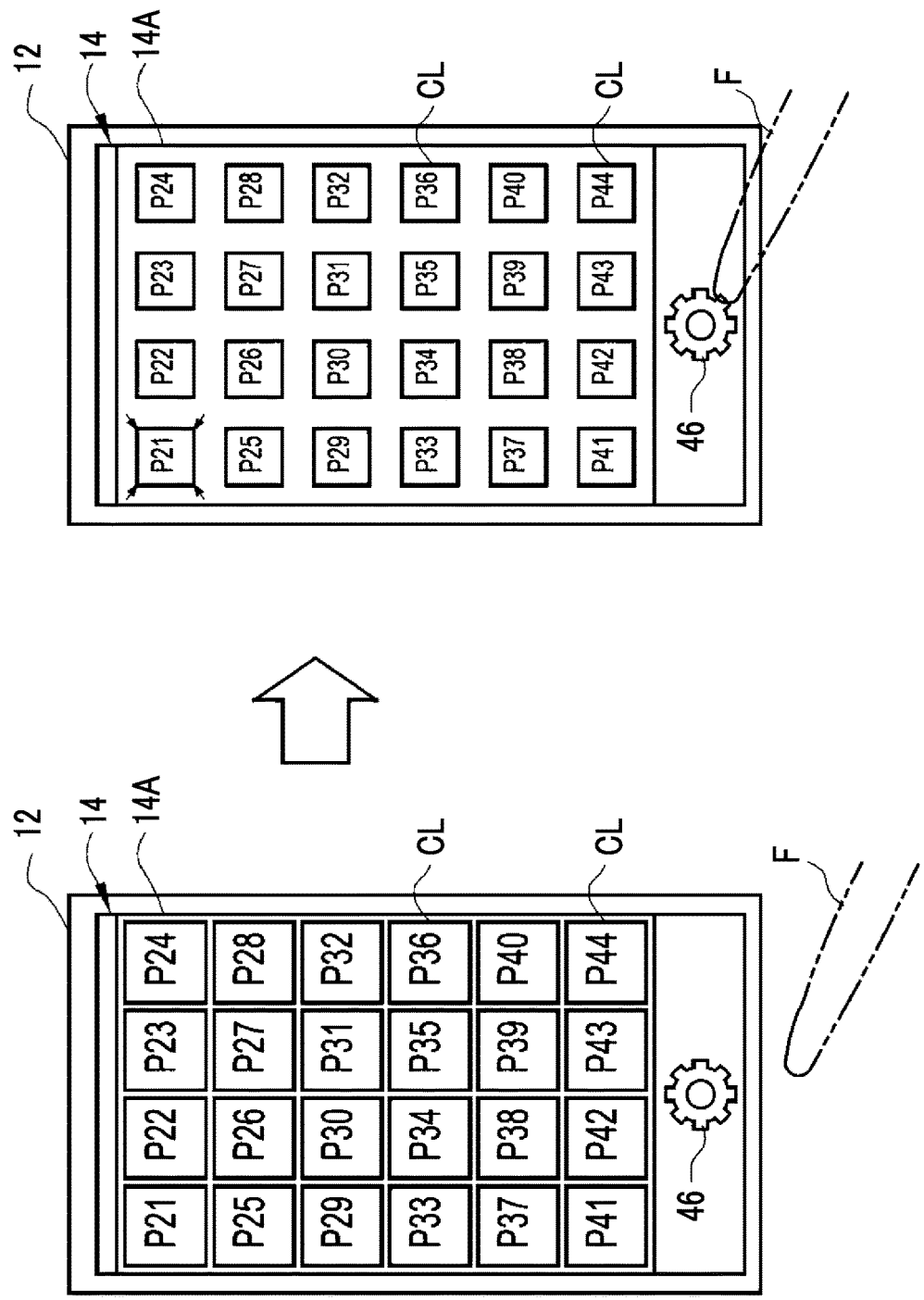
FIGS. 48A and 48B are diagrams showing an example of performing a performance on the display in the middle of the one-frame scroll.
Figure 49:
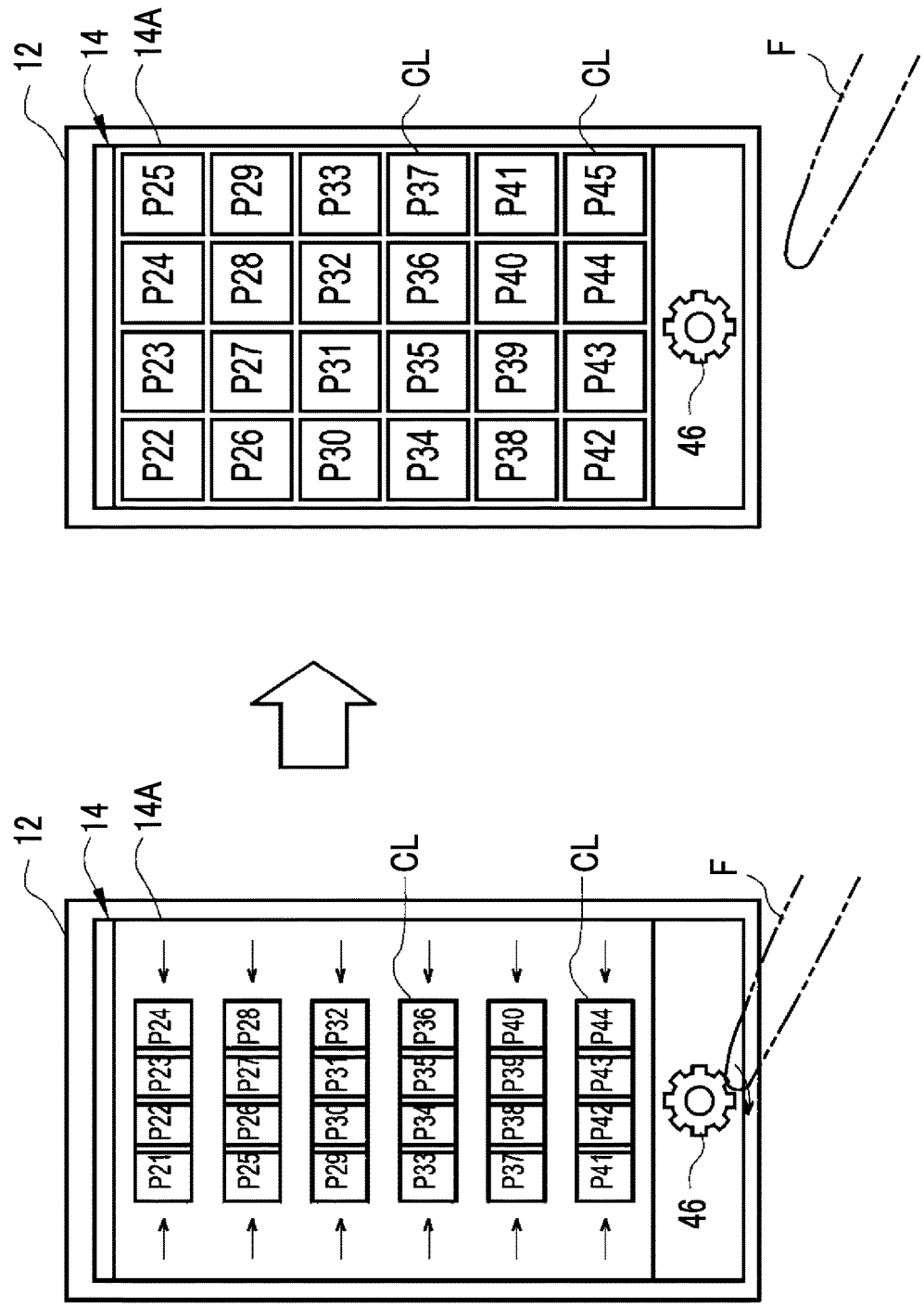
FIGS. 49A and 49B are diagrams showing a continuation of FIG. 48 of the example of performing the performance on the display in the middle of the one-frame scroll.

FIGS. 48 and 49 are forms of executing visual performances during a transitional period in the middle of the one-frame scroll (scroll processing). Specifically, in a case where the arrangement state of the display cells CL before the touch operation on the reel unit 46 is started is set as an initial state, the scroll processing unit 35 executes the visual performance of changing the arrangement state from the initial state during a period from the start of the touch operation performed with the finger F touching the reel unit 46 to the end of the touch operation with the finger F separating from the reel unit 46. The scroll processing unit 35 returns the arrangement state to the initial state after the end of the touch operation to maintain the arrangement state before and after the one-frame scroll.

FIG. 48A shows a state before the start of the touch operation for the one-frame scroll without the finger F touching the reel unit 46. This arrangement state is the initial state. In FIG. 48B, the finger F touches the reel unit 46, and the touch operation is started. However, FIG. 48B shows a stage before the rotation gesture is performed. With the beginning of the transitional period from the state shown in FIG. 48B, the scroll processing unit 35 starts the visual performance.

In the state of FIG. 48B, the scroll processing unit 35 contracts the sizes of the display cell CL and the picture P in the album screen 14 compared with the initial state shown in FIG. 48A. The contracted state of the display cell CL and the picture P continues until the one-frame scroll is completed. In a case where the rotation gesture is performed from the state shown in FIG. 48B, the scroll processing unit 35 starts the one-frame scroll.

FIG. 49A shows a state in the middle of the scroll for one frame where the one-frame scroll is started from the state shown in FIG. 48B and then the finger F is not separated from the reel unit 46. The scroll processing unit 35 performs the performance as shown in FIG. 49A according to the movement of the finger F with respect to the reel unit 46 during the finger F touches the reel unit 46 and the rotation gesture is performed with the finger F. That is, the visual performance such as bringing each column of the display cell CL and the picture P closer to the center or conversely separating intervals of each column.

The scroll processing unit 35 executes the scroll for one frame in a case where an operation amount of the finger F exceeds a threshold value set in advance and finalizes the executed scroll in a case where the finger F is separated from the reel unit 46 in the state, in a case of accepting the rotation gesture of the finger F. Therefore, for example, in the state where the user 13 repeats the rotation gesture clockwise or counterclockwise while touching the reel unit 46 with the finger F, the scroll processing unit 35 performs the scroll but does not finalize the scroll.

During such a transitional period, the scroll processing unit 35 replaces the disposition positions of the pictures P while performing the performance shown in FIG. 49A, that is, executes the scroll for one frame according to the operation amount of the rotation gesture. Thereafter, with the separation of the finger F from the reel unit 46, the scroll is finalized at the stage where the touch operation ends and the display cells CL after the completion of the scroll are returned to the same initial state as FIG. 48A as shown in FIG. 49B.

As described above, the execution of the one-frame scroll by the scroll processing unit 35 while the arrangement state of the display cells CL is maintained means that the arrangement state of the display cells CL is maintained at least before the start of the scroll shown in FIG. 48A or after the completion of the scroll shown in FIG. 49B. As shown in FIGS. 48B and 49A, in the middle of the scroll processing, the scroll processing unit 35 disturbs the arrangement state of the display cells CL to perform the performance on the display.

As described above, there is an effect that the user 13 clearly recognizes that the scroll is executed by performing the performance of contracting the sizes of the display cell CL and the picture P or disturbing the arrangement state of the display cells CL in the middle of the one-frame scroll. In the one-frame scroll, the arrangement state thereof is maintained before the start of the scroll and after the completion of the scroll. Since the movement amount of the picture P is small in the one-fame units, the change of the album screen 14 before and after the scroll is small. Therefore, such a visual performance is performed. Accordingly, since it is easy for the user 13 to recognize that the one-frame scroll is performed, such a visual performance is significantly effective in the one-frame scroll.

The performance shown in FIGS. 48B and 49A is an example and another performance may be employed. For example, various performances such as a performance of regarding each picture P as a card and rotating the card such that the front and back of the card are reversed and a performance that each picture P randomly scatters in the album screen 14 may be considered. Any of the performances may be added.

Modification Example 3-2

The scroll processing unit 35 may change the speed of the one-frame scroll. The speed of the one-frame scroll refers to, for example, the number of replacements of the disposition positions of the pictures P per unit time. Since the picture P is switched in frame units in the one-frame scroll, the speed of the scroll is slow compared with the row unit scroll shown in FIG. 40 or the continuous page scroll shown in FIG. 41. Therefore, in a case of searching for a picture P at a separated position, it takes time for the scroll. It is possible to shorten the scroll time by increasing the speed of the scroll.

As a trigger to change the speed of the one-frame scroll, first, the operation amount per unit time of the rotation gesture may be considered. In a case where the operation amount per unit time of the rotation gesture, that is, the rotation gesture is performed quickly, the speed of the scroll processing is set to be increased.

Figure 50:
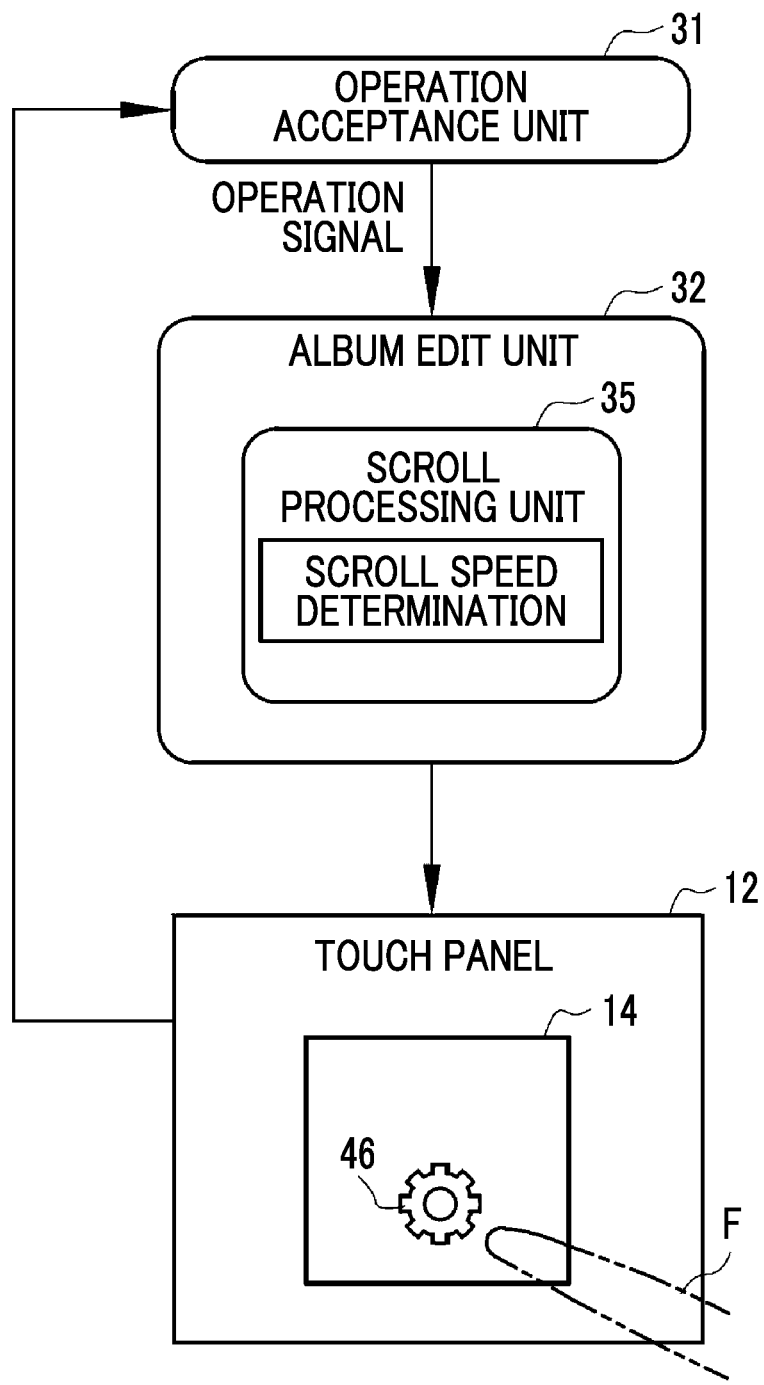
FIG. 50 is a diagram showing a configuration of changing a speed of the one-frame scroll.

In this case, for example, as shown in FIG. 50, the scroll processing unit 35 acquires an operation signal of the rotation gesture with respect to the reel unit 46 through the operation acceptance unit 31 from the touch panel 12. The scroll processing unit 35 calculates the operation amount per unit time based on the operation signal and determines the scroll speed based on the calculation result. The speed of the scroll is increased according to the determination result.

As another trigger to change the speed of the one-frame scroll, for example, the long press operation of the reel unit 46 or the like may be considered. By long pressing the reel unit 46 for a predetermined time, the speed of the one-frame scroll is set to be increased compared with the case of the rotation gesture. During the long pressing continues, the one-frame scroll also continues. In a case where the long pressing ends by the user 13 separating the finger F from the reel unit 46, the one-frame scroll ends.

Modification Example 3-3

As the movement form of the one-frame scroll, the Z shape shown in FIGS. 43 and 44 is described as an example. However, the S shape shown in FIGS. 51 and 52, a spiral shape shown in FIG. 53, or the like may be considered other than the Z shape. Any of these shapes may be adopted.

Modification Example 3-3-1

Figure 51:
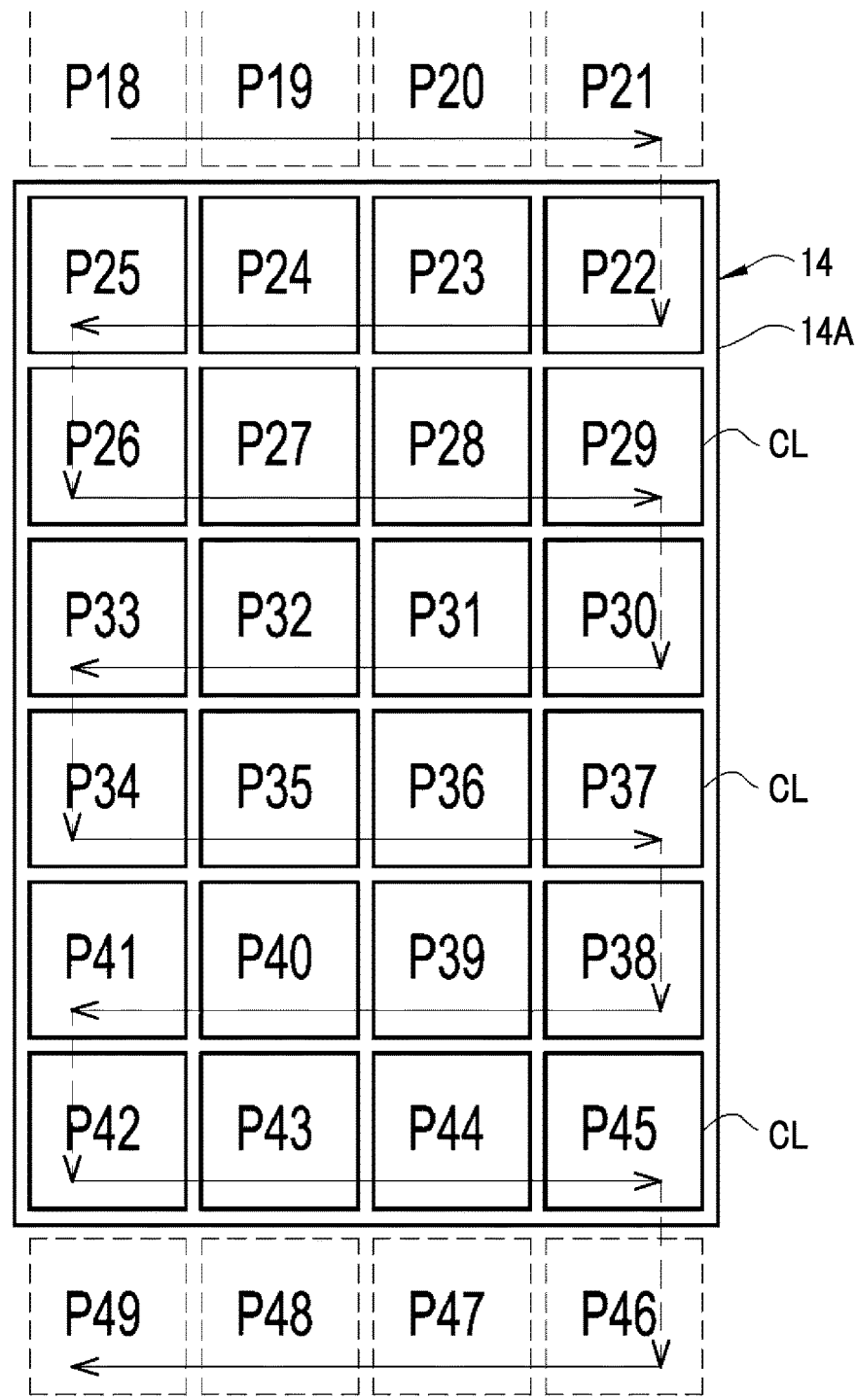
FIG. 51 is a diagram showing an S shape movement form of the one-frame scroll and a movement path in the return direction.
Figure 52:
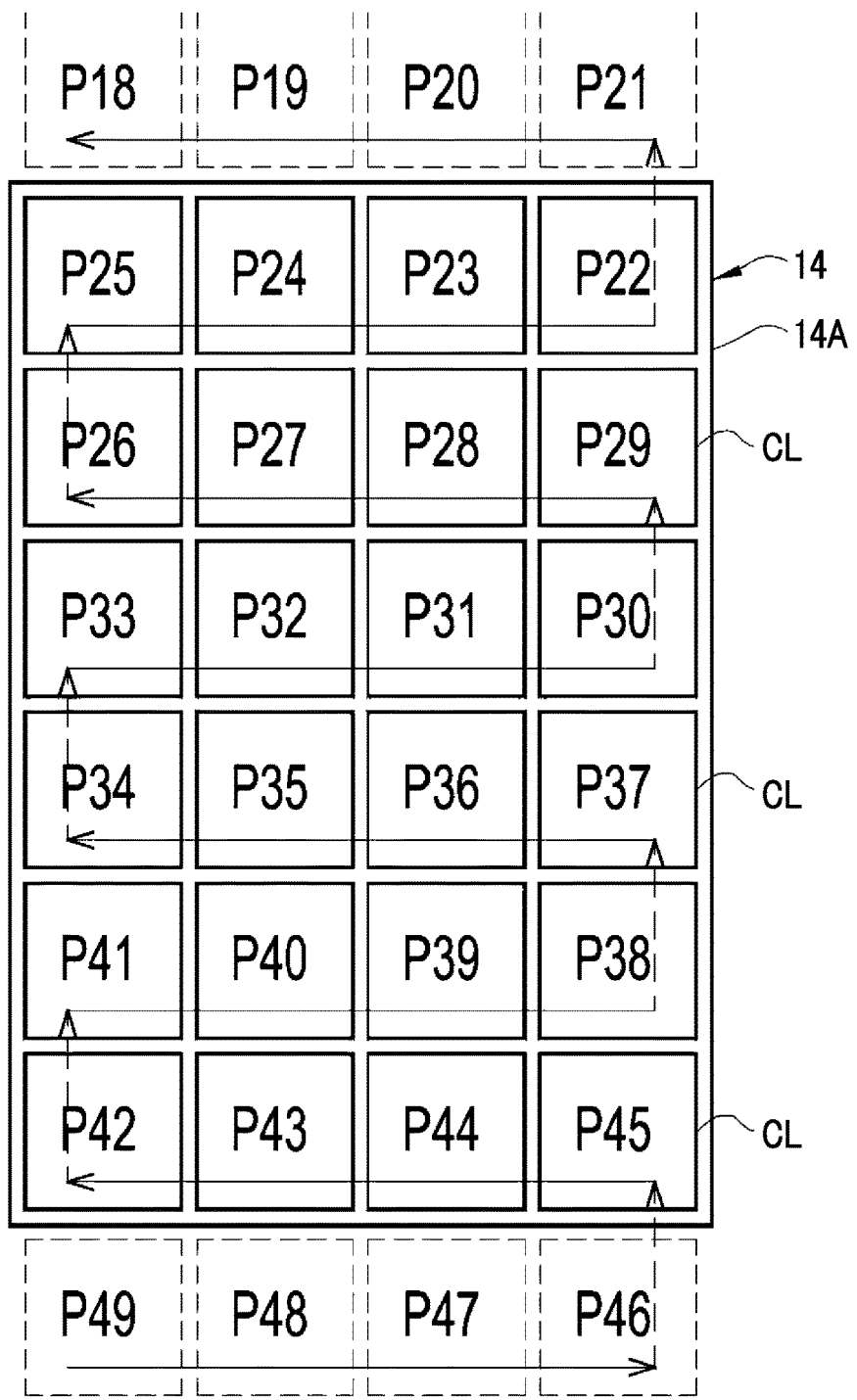
FIG. 52 is a diagram showing an S shape movement form of the one-frame scroll and a movement path in the feed direction.

In the S shape shown in FIGS. 51 and 52, similar to the Z shape, the scroll processing unit 35 moves a picture P to be disposed in a display cell CL located at one end in a row to a display cell CL located at an end of an adjacent next row in the one-frame scroll (scroll processing). Other pictures P are moved frame by frame to the display cells CL adjacent in the row. However, in the case of the S shape shown in FIGS. 51 and 52, unlike the Z shape, in the case where a picture P located at one end in a row is moved to a next row, the scroll processing unit 35 moves the picture P to an end on the same side as the end of the row before the movement in the next row.

For example, as shown in FIG. 51, in a case where the picture P25 located at the left end of the first row is moved to the next second row, the picture P25 is moved to the same left end as the first row before the movement. Accordingly, each picture P is moved in the S shape as a whole.

The arrow shown in FIG. 51, similar to FIG. 43, indicates the movement path of the picture P in the case where the rotation gesture to rotate the reel unit 46 clockwise is performed. The example of FIG. 51 shows the movement path in the case of the scroll in the return direction. In the scroll in the return direction, the pictures P21, P20, and • • • older than the picture P22 enter the display region of the touch panel 12 frame by frame. Conversely, FIG. 52, similar to FIG. 44, shows the movement path of the picture P in the case where the rotation gesture to rotate the reel unit 46 counterclockwise is performed. The example of FIG. 52 shows the movement path in the case of the scroll in the feed direction. In the scroll in the feed direction, the pictures P46, P47, and • • • newer than the picture P45 enter the display region of the touch panel 12 frame by frame.

Modification Example 3-3-2

Figure 53:
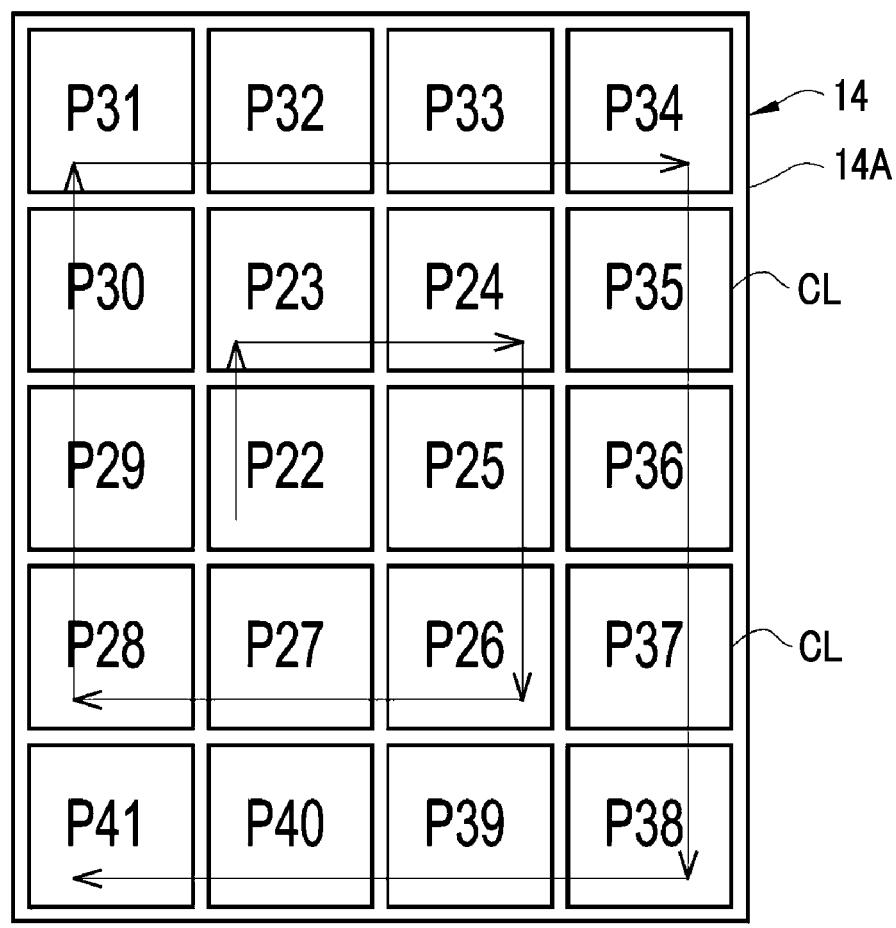
FIG. 53 is a diagram showing a spiral shape movement form of the one-frame scroll.

FIG. 53 shows the case where the movement form of the one-frame scroll is the spiral shape. In the example of FIG. 53, the scroll processing unit 35 moves the pictures P frame by frame in the spiral shape with the display cell CL located at the center of the album screen 14 as the center in the one-frame scroll (scroll processing). In the example of FIG. 53, each picture P is shifted in the spiral shape as a whole with the display cell CL in which the picture P22 located at the center of the album screen 14 is disposed as the center.

The picture P22 located at the center of the spiral is the oldest picture P of the pictures P being displayed. In the case where the one-frame scroll in the return direction is performed, the picture P older than the picture P22 enters the display cell CL located at the center. In the example of FIG. 53, the picture P41 in the left corner of the lower end is the latest picture P, and the latest picture P is saved to the non-display region from the position of the picture P41 in the case where the one-frame scroll in the return direction is performed.

Conversely, in the case where the one-frame scroll in the feed direction is performed (not shown), the pictures P are saved to the non-display region frame by frame from the display cell CL (position of picture P22) in the center and pictures P newer than the picture P41 enter the display region from the position of the picture P41.

As described above, by setting the movement form of the one-frame scroll to the S shape or the spiral shape, the picture P makes a rare movement compared with the Z shape. Therefore, it is possible to expect an effect of visually entertaining the user 13. In addition, these movement forms may be changed by setting.

As described above, various movement forms such as the Z shape, the S shape, and the spiral shape may be considered as the movement form of the one-frame scroll. In all the movement forms described above, the plurality of pictures P are disposed in the plurality of display cells CL in the album screen 14 in continuity according to a time series. The scroll processing unit 35 moves each of the disposition positions of the pictures P frame by frame according to time series in the one-frame scroll (scroll processing). As described above, in the case where the plurality of pictures P are disposed in continuity according to the time series, the movement form may be according to time series and may be a form other than the above movement forms may be employed.

Modification Example 3-4

Figure 54C:
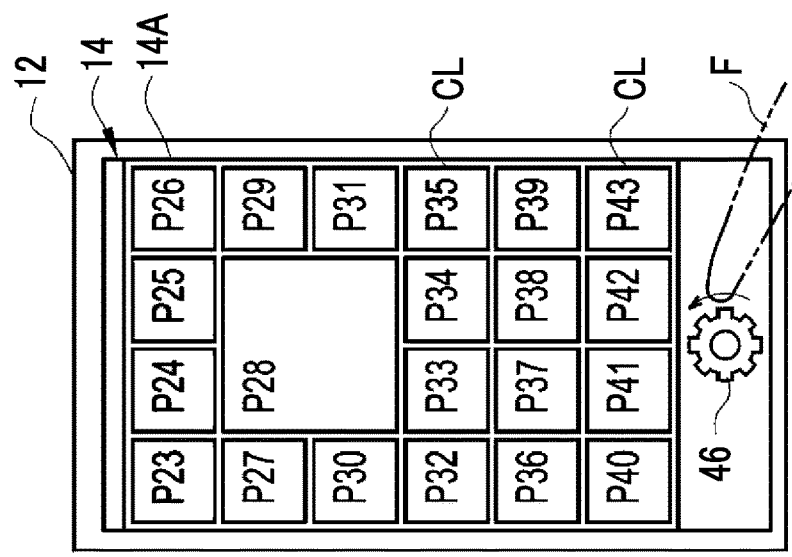
FIGS. 54A, 54B, and 54C are diagrams showing the one-frame scroll in a case where there is an enlargement frame.
Figure 54B:
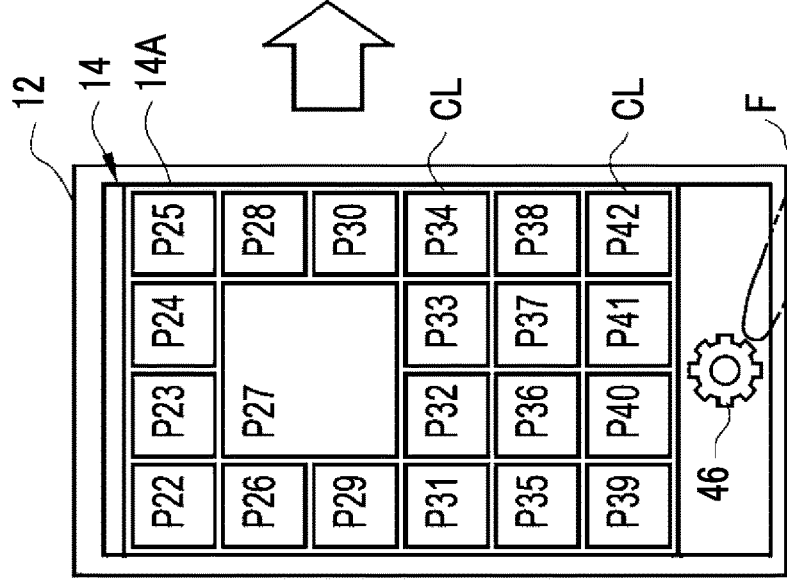
Figure 54A:
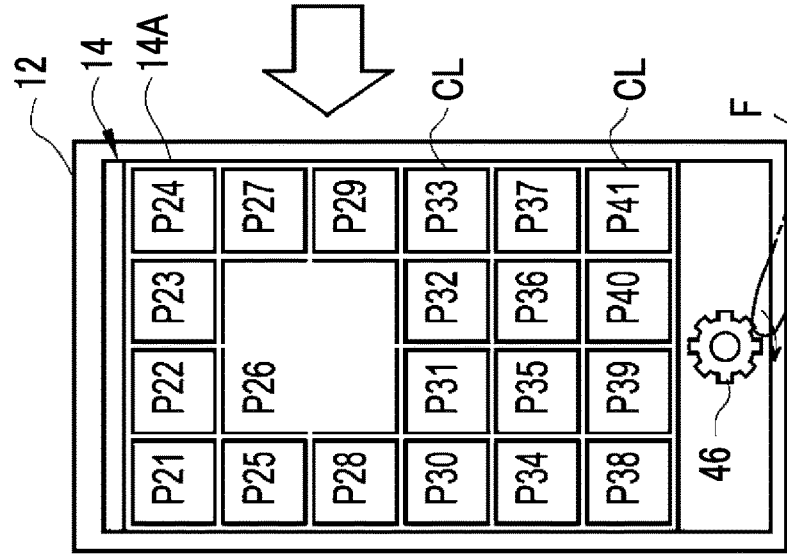

As shown in FIGS. 54A, 54B, and 54C, even in a case where there are enlarged display cells CL and pictures P in the album screen 14, it is possible to perform the one-frame scroll. In FIG. 54, FIG. 54B is a reference state. In FIG. 54B, the picture P27 is enlarged to four squares of two rows×two columns. In this state, as shown in FIG. 54A, in a case where the one-frame scroll toward the past is performed, the enlarged picture P27 is replaced by the picture P26. Conversely, as shown in FIG. 54C, in a case where the one-frame scroll toward the future is performed, the enlarged picture P27 is replaced by the picture P28.

Fourth Embodiment

In the portable information terminal 10 of a fourth embodiment shown in FIGS. 55 to 62, a scroll lock is possible. That is, the scroll processing unit 35 performs the scroll lock that fixes the disposition position in the album screen 14 of the picture P subjected to the designation operation at the time of the scroll on the album screen 14. In the state where the scroll lock is performed, the scroll processing is executed for another picture P on the album screen 14. In the fourth embodiment, the same configuration as each embodiment described above will also be indicated by the same numeral, and a different point will be mainly described.

Figure 55:
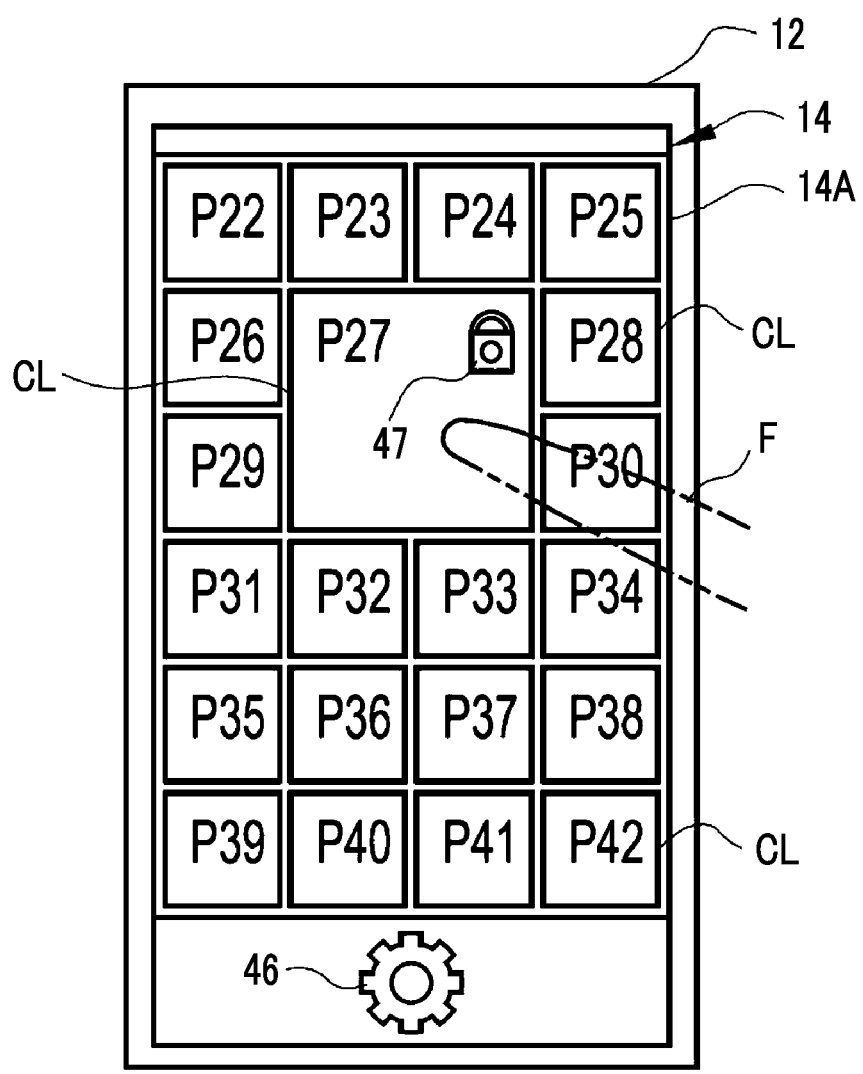
FIG. 55 is a diagram showing a scroll lock of a fourth embodiment.

FIG. 55 shows a state where the picture P27 in the album screen 14 is scroll-locked. The operation acceptance unit 31 accepts the designation operation to designate a picture P disposed in at least one display cell CL in the album screen 14 as a lock target which is a target of the scroll lock. The operation acceptance unit 31 functions as a picture designation acceptance unit.

The designation operation of the lock target is performed by, for example, selecting the item of the scroll lock from the edit menu 14C shown in FIG. 5 and then performing a single tap of lightly hitting the picture P in the album screen 14 once with the finger F. As shown in the picture P27 of FIG. 55, in a case where the picture P is enlarged, it may be regarded that the designation operation of the lock target is performed for the picture P to be enlarged.

In the case where such a designation operation of the lock target is performed, the operation acceptance unit 31 accepts the designation operation. The operation acceptance unit 31 transmits an instruction to set the designated picture P as the lock target to the scroll processing unit 35. The scroll processing unit 35 performs the scroll lock that fixes the disposition position in the album screen 14 of the designated picture P based on the instruction from the operation acceptance unit 31.

The scroll processing unit 35 records information on the picture P to be locked in the work memory 22 or the storage device 23 in the case where the scroll lock is performed.

The scroll processing unit 35 executes the scroll processing in a case where the operation acceptance unit 31 accepts the execution instruction of the scroll processing similar to the third embodiment. The scroll processing unit 35 performs the scroll lock for the picture P (picture P27 in FIG. 55) subjected to the designation operation as the lock target.

The scroll processing unit 35 displays the scroll-locked picture P and the pictures P other than the scroll-locked picture P in an identifiable manner on the album screen 14. In the example, a lock mark 47 schematically representing a padlock is displayed in the upper right corner of the picture P to be locked. In the example, the lock mark 47 is displayed in the picture P27 to be locked. It is possible to identify the picture P27 to be locked and the pictures P other than the picture P27 by the display of the lock mark 47.

The scroll lock is released by single tapping the position of the lock mark 47 of the picture P to be locked. In a case where the scroll lock is released, the display of the lock mark 47 disappears.

The scroll processing unit 35 executes the scroll processing for other pictures P in the album screen 14 in the state where the picture P to be locked is scroll-locked.

Figure 56C:
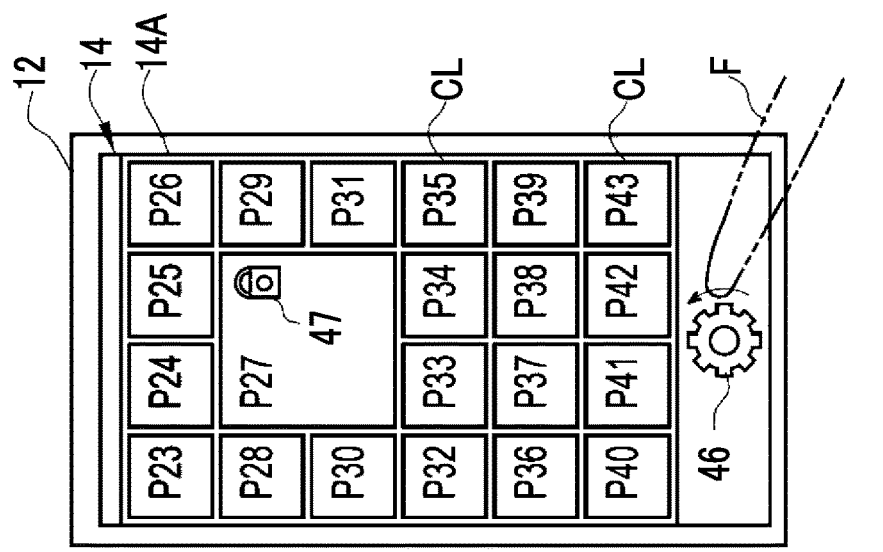
FIGS. 56A, 56B, and 56C are diagrams showing the scroll in a case where the scroll lock is set.
Figure 56B:
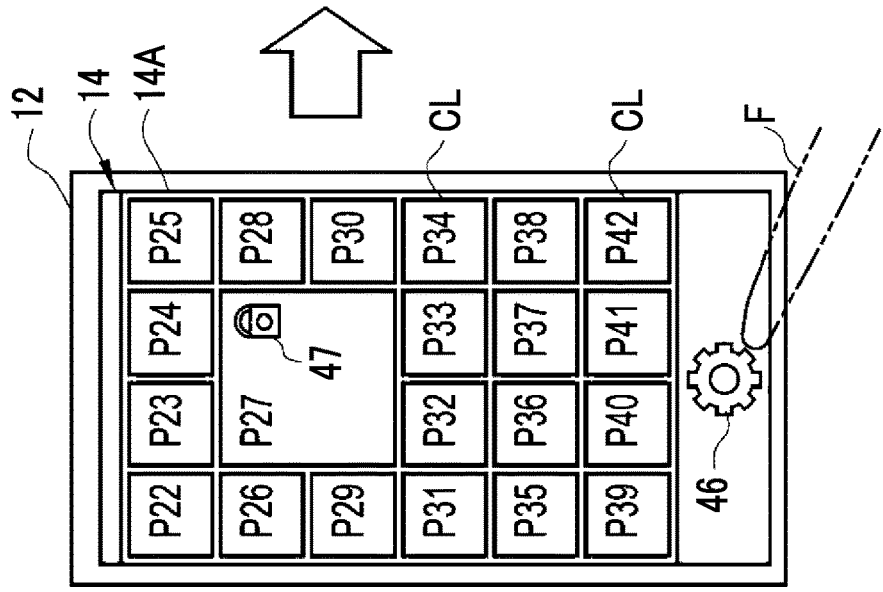
Figure 56A:
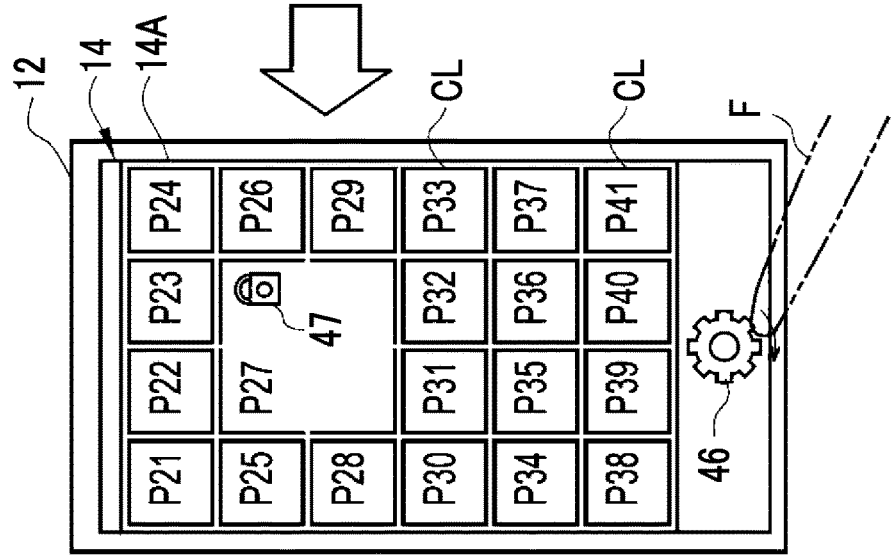

In examples shown in FIGS. 56A, 56B, and 56C, the scroll lock is set to the picture P27. In this case, a reference state shown in FIG. 56B is changed to a state shown in FIG. 56A in a case where the one-frame scroll for one frame in the return direction is performed by the rotation gesture with respect to the reel unit 46. In FIG. 56A, the disposition position of each picture P, excluding the scroll-locked picture P27, is moved frame by frame. In FIG. 56A, the picture P27 continues to be the enlargement target without replacing the enlarged picture P27 with the picture P26 as in FIG. 54A.

As shown in FIG. 56C, the scroll-locked picture P27 is not scrolled and the disposition positions of the pictures P other than the picture P27 are moved frame by frame similar to the case where the scroll is performed in the feed direction with FIG. 56B as the reference.

As described above, since the scroll lock can be set to the designated picture P, it is easy to search for the plurality of pictures P even in the case where the screen displaying the picture P is small such as the touch panel 12 of the portable information terminal 10. For example, in a case where one favorite picture P is found and then the scroll lock is set to the picture P, it is possible to display the favorite picture P found first on the touch panel 12 even in a case where the scroll is performed in order to search for a next picture P. Therefore, there is no possibility of losing the favorite picture P found first. With such a scroll lock, the screen division for disposing the favorite picture P or the like is also unnecessary. Therefore, it is easy to search for the plurality of pictures even in the case where the screen is small as in the portable information terminal 10.

The scroll processing combined with the scroll lock function of the fourth embodiment is not limited to the one-frame scroll. For example, the scroll processing may be the row unit scroll shown in FIG. 40 or the continuous page scroll shown in FIG. 41.

However, in the case where the plurality of pictures P are arranged in the grid shape such as the album screen 14, it is possible to improve the appearance of the screen at the time of the scroll in a case where the scroll lock and the one-frame scroll are combined.

For example, FIGS. 57A, 57B, and 57C show examples of combining the scroll lock and the row unit scroll. In FIGS. 57A, 57B, and 57C, similar to FIGS. 56A, 56B, and 56C, the picture P27 is enlarged and the scroll lock is set to the picture P27. With FIG. 57B as a reference state, FIG. 57A shows a state where the scroll in the return direction for one row is performed, and FIG. 57C shows a state where the scroll in the feed direction for one row is performed.

As shown in FIGS. 57A and 57C, in the row unit scroll, in the case where there is the picture P to which the scroll lock is set, an omission portion may occur due to the influence of the scroll lock.

In FIGS. 57A, 57B, and 57C, the picture P27 exists in the second row and the third row. In a case where the scroll in the return direction for one row is performed in the state of FIG. 57B, the pictures P29 and P30 in the third row of FIG. 57B are moved to the fourth row thereof where the picture P27 does not exist as shown in FIG. 57A. By doing this, since the picture P27 is scroll-locked, the picture P27 is not moved and thus two squares between the pictures P29 and P30 are in an omission state as shown in FIG. 57A.

Conversely, in a case where the scroll in the feed direction for one row is performed in the state of FIG. 57B, the pictures P26 and P28 in the second row of FIG. 57B are moved to the first row thereof where the picture P27 does not exist as shown in FIG. 57C. By doing this, since the picture P27 is scroll-locked, the picture P27 is not moved and thus two squares between the pictures P26 and P28 are in the omission state.

On the contrary, in the case of the one-frame scroll as shown in FIG. 56, since the picture P is moved frame by frame, there is no omitted square as shown in FIG. 57. As described above, in the case where the scroll lock and one-frame scroll are combined, it is possible to improve the appearance of the album screen 14 at the time of the scroll with no omitted square in the case where the scroll is performed.

As shown in FIGS. 57A, 57B, and 57C, in the case where there is the picture P to which the scroll lock is set, there may also be invisible pictures P, which are hidden by the shadow of the lock target, in the case where the row unit scroll is performed. For example, in FIG. 57A, the pictures P23 and P24 are hidden by the shadow of the picture P27 to be locked. In FIG. 57C, the pictures P32 and P33 are hidden by the shadow of the picture P27 to be locked. It is also possible to eliminate such inconvenience by combining the scroll lock and one-frame scroll.

The enlarged picture P is described as the lock target in the examples shown in FIGS. 56A, 56B, and 56C, but, of course, the picture P to be locked may not be enlarged as shown in FIGS. 58A, 58B, and 58C. In FIGS. 58A, 58B, and 58C, the picture P27 is the lock target similar to the examples shown in FIGS. 56A, 56B, and 56C, but the picture P27 is not enlarged. In FIG. 58, FIG. 58B shows a reference state. FIG. 58A shows a state where the scroll for one frame in the return direction with FIG. 58B as the reference. FIG. 58C shows a state where the scroll for one frame in the feed direction with FIG. 58B as the reference.

In the example, the lock mark 47 is displayed on the picture P to be locked during the scroll lock is set. However, the lock mark 47 may not be displayed during the entire period in which the scroll lock is set. A purpose of making the lock target identifiable is to distinguish the picture P to be locked and the pictures P other than the picture P at least during the scroll processing is executed. Therefore, the lock mark 47 may be displayed at least during the scroll processing is executed.

Of course, it is preferable that the lock mark 47 is displayed over the entire period in which the scroll lock is set as shown in the example. This is because it is possible to immediately understand which picture is the lock target even in a state where the scroll is not performed.

The form of displaying the picture P to be locked and the pictures P other than the picture in an identifiable manner is not limited to the lock mark 47. For example, there are a method of contracting and displaying the picture P to be locked compared with other pictures P, a method of making the picture P to be locked translucent, a method of assigning hatching, a method of blinking, and the like. There is also a method of vibration or the like that applies a performance as if the picture P vibrates visually by moving the picture P little by little. Any of these methods may be employed.

Modification Example 4-1

Figure 59:
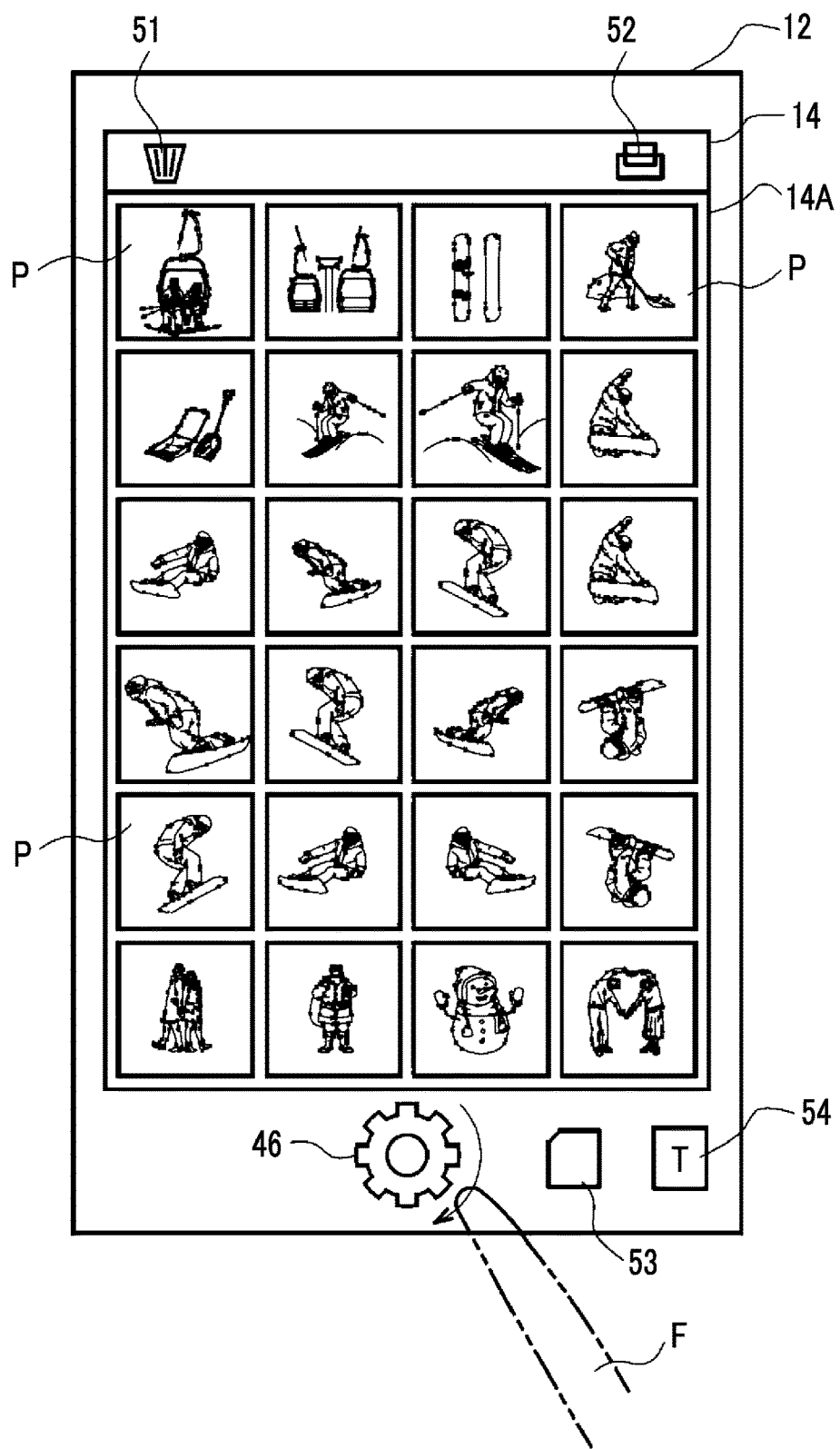
FIG. 59 is a diagram showing an album screen on which an edit function is enhanced.

A modification example of the fourth embodiment shown in FIG. 59 has an operation screen on which a picture layout edit function is enhanced. As described below, the scroll lock exhibits a further effect in a case where the picture layout edit is performed on the picture arrangement screen, such as the album screen 14, on which the plurality of pictures P are arranged in the grid shape.

As shown in the example, it is possible to create a postcard for a direct mail in which a plurality of pictures P are disposed using the album screen 14. The album screen 14 shown in FIG. 59 is provided with various operation units useful for the picture layout edit so as to make easy to create such a postcard.

For example, a numeral 51 is a trash box icon, and it is possible to delete an unnecessary picture P from the album screen 14 by dragging the unnecessary picture P to the trash box icon 51. A printer icon 52 is an operation unit that performs an instruction to output an edited album screen 14 to the printer. As described above, the portable information terminal 10 has a function of issuing the instruction to print the album screen 14.

A store and read icon 53 is an operation unit used for opening various folders in the storage device 23 in a case of storing data of the edited album or reading various pieces of data. Various data include, for example, a mark other than the photograph, such as a logomark, or a picture representing a character string in addition to the album data. As described below, it is also possible to dispose a picture other than such a photograph in the display cell CL of the album screen 14. A template icon 54 is an operation unit for opening a template folder in order to read a created template or store the created template.

The album screen 14 provided with such an operation unit is displayed by, for example, selecting a picture layout edit mode from the edit menu 14C and transferring to the selected picture layout edit mode.

The portable information terminal 10 of the example has the function of editing a picture layout similar to the example described above. The edit function includes the enlargement of the picture P in the album screen 14, deletion of the picture P from the album screen 14, and movement of the disposition position of the picture P in the album screen 14. The movement of the disposition position of the picture P is performed, for example, in the same manner as the example shown in FIGS. 6A and 6B. That is, a picture P desired to be moved in the album screen 14 is long pressed with the finger F to designate the picture P as a movement target. In a case where the picture P is dragged to a position desired to be moved without separating the finger F from the movement target, the disposition positions between the picture P and a picture P at a movement destination are replaced. Accordingly, the movement is completed. The edit processing such as enlargement, deletion, and movement is executed by the album edit unit 32.

FIG. 59 shows an example, for example, in which the user 13 who is a host of a ski class creates a postcard with photographs imaging a state of the ski class. The postcard is used to connect to a commercial opportunity, for example, by including a thank-you letter for a ski class participant, special treatment information that can be used next time or later, and the like. By using the photograph in which the participant is imaged for the postcard, the postcard may be an album in which memories are recorded for the participant.

In the case where the postcard is created, first, the user 13 who is the host images the photograph of the participant who participates in the ski class by using the portable information terminal 10. A plurality of pictures P shown in FIG. 59 are examples of the photographs imaging the state of the ski class. These pictures P are stored in the picture storage unit 23A. In the case where the postcard is created, these pictures P are read by the album edit unit 32 and the plurality of read pictures P are arranged in time series on the album screen 14 as shown in FIG. 59.

On the album screen 14 shown in FIG. 59, the user 13 selects the picture P used for the postcard while using the functions of the one-frame scroll and the scroll lock. For example, the user 13 performs the one-frame scroll to select a necessary picture P. The scroll lock is set to the selected picture P, and the one-frame scroll is performed again to search for a next picture P. The picture P is enlarged as necessary. In addition, the disposition positions of the plurality of pictures P arranged in time series are moved. The user 13 performs such a picture layout edit with respect to the plurality of pictures P to be displayed on the album screen 14 to create the postcard.

Figure 60:
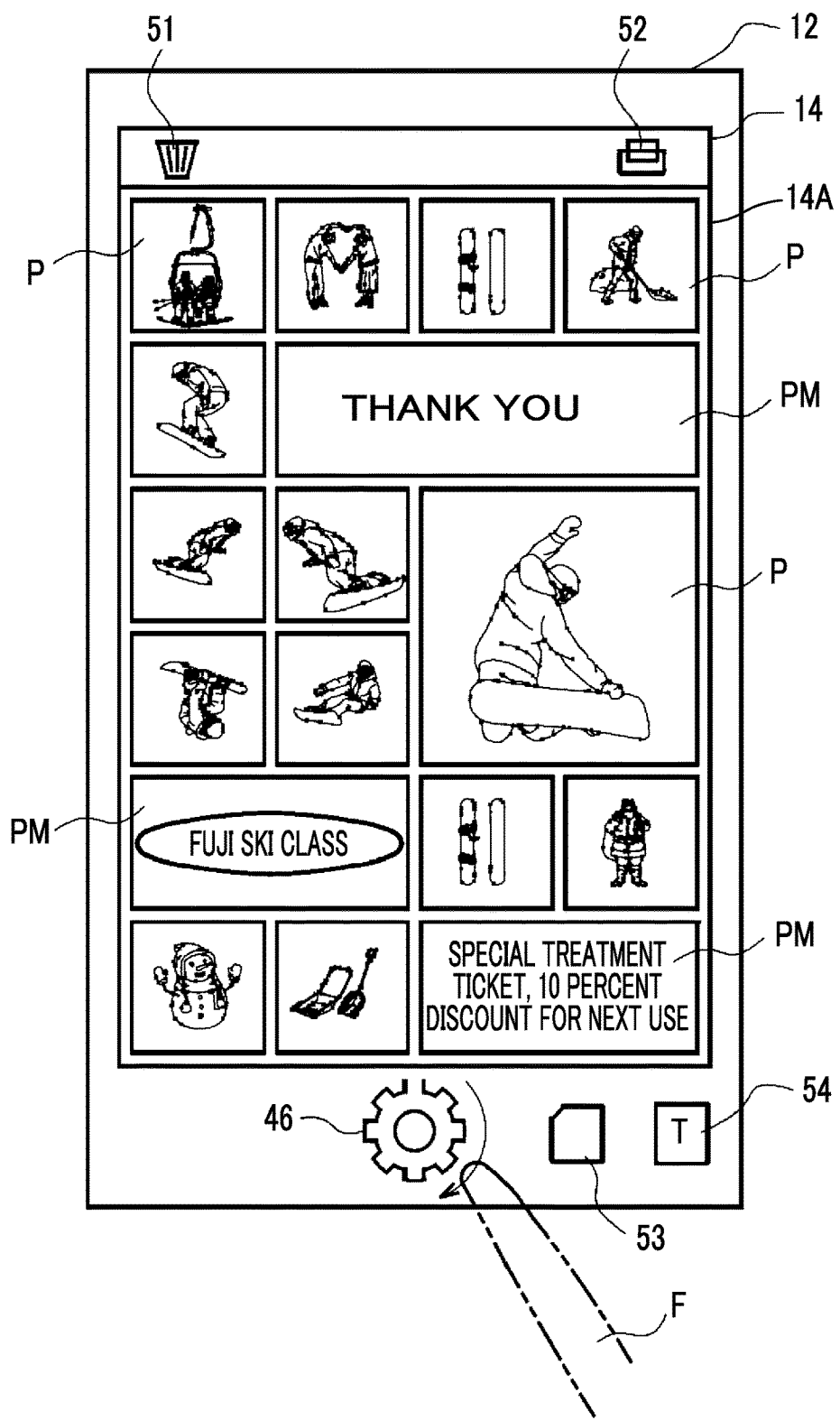
FIG. 60 is a diagram showing an example of a postcard.

FIG. 60 is an example of an edited album screen 14 for the postcard. As shown in FIG. 60, one of the plurality of pictures P is enlarged, and pictures PM representing the mark or the character string are also included in addition to the photographs. The pictures PM include a thank-you message such as "THANK YOU" (corresponding to character string), a logomark displaying a name of the ski class such as "FUJI SKI CLASS", and a picture representing the character string displaying contents of "special treatment ticket" that can be used next time or later. Here, the mark displayed on the picture PM includes at least one of a character, a figure, a pattern, or combinations of two or more items selected among these items.

These pictures PM are included in various pieces of data and stored in the storage device 23. It is possible to read these pictures PM from the storage device 23 by operating the store and read icon 53 and dispose these pictures PM in predetermined display cells CL in the album screen 14. For such pictures PM, in the case where these pictures PM are disposed in the display cells CL, it is also possible to perform the picture layout edit such as enlargement, movement, and deletion similar to the picture P which is the photograph. It is possible to set the scroll lock also to the pictures PM.

As described above, it is possible for the user 13 to perform the picture layout edit based on the album screen 14 shown in FIG. 59, in which the imaged pictures P are arranged and displayed by using the portable information terminal 10. Accordingly, it is possible to perform the edit of the picture P and the picture PM for the postcard as shown in FIG. 60. Since the portable information terminal 10 comprises the functions of the one-frame scroll and the scroll lock, it is easy to directly edit the album screen 14.

In the case where the screen of the touch panel 12 is small as in the portable information terminal 10, the visibility deteriorates in the case where the screen is divided. Therefore, it is difficult to perform the picture layout edit using the screen division function in the portable information terminal 10. By using the one-frame scroll and the scroll lock, it is possible to easily perform edit work such as deciding of the layout of the necessary picture P, setting of the scroll lock to the picture P having decided layout, and selecting of a next picture P and deciding of the layout of the next picture P on the album screen 14. In a case where the scroll lock is set to the picture P having decided layout, it is possible to search for the next picture P while confirming the decided layout on the album screen 14. As described above, since it is easy to directly perform the edit with respect to the album screen 14, it is easy to perform the picture layout edit even without using the screen division function. Therefore, the picture layout edit function using the one-frame scroll and the scroll lock is suitable for the portable information terminal 10.

Moreover, since the picture layout edit can be performed only by the portable information terminal 10 without using an apparatus such as a desktop personal computer, for example, it is also possible to create the postcard on the day of the ski class and hand the postcard over or send data to the participant. There is an increasing number of hosts who individually hosts a class, such as a cooking class, a yoga class, or a surfing class, other than the ski class. The portable information terminal 10 that can be easily used is significantly useful in a case where such a host creates a message card such as the postcard. Of course, the picture layout edit function of the portable information terminal 10 is not limited to such a use and may be used for another use such as creation of the thank-you letter of various parties such as the birthday party and the welcome and farewell party.

The photograph and the logo can be mixed on the album screen 14 as shown in FIG. 60 by allowing the picture PM representing the mark or the character string in addition to the picture P, which is the photograph, to be disposed in the display cell CL. Therefore, it is convenient to create the postcard for an invitation letter or a thank-you letter.

For the picture P to which the scroll lock is set, the edit such as enlargement, deletion, and movement may be prohibited. The picture P to be locked may be considered as a picture selected as the necessary picture P. The picture P to which the scroll lock is set may also be considered as a temporarily edited picture. Therefore, it is possible to suppress an unintentional edit by prohibiting the edit in addition to the scroll lock. Of course, the prohibition of the edit can be released, and the edit with respect to the picture P for which the edit is prohibited is possible in a case where the prohibition is released. As described above, the scroll lock may be set automatically with respect to the enlarged picture P. This is because the enlarged picture may also be considered as the temporarily edited picture P.

Figure 61:
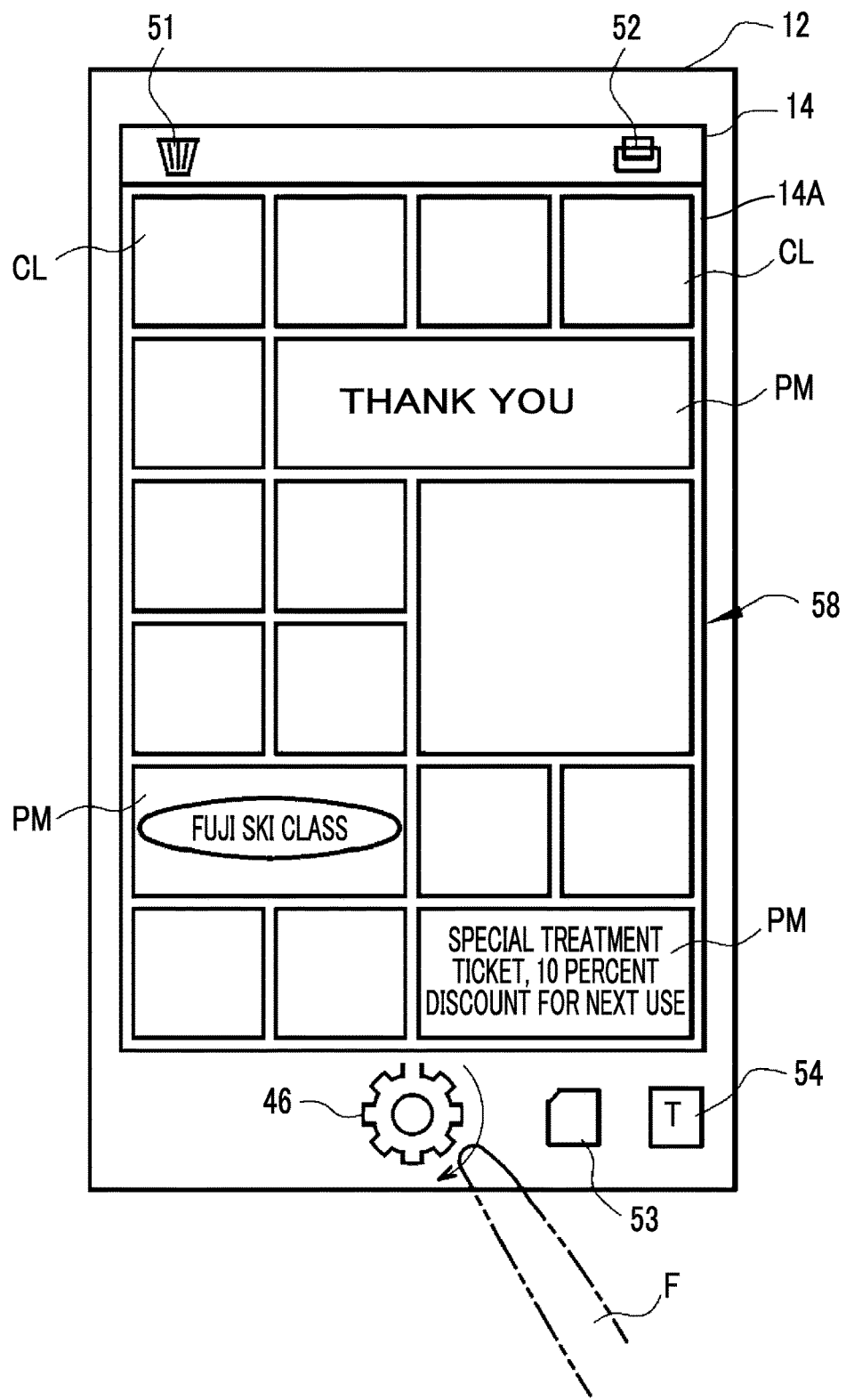
FIG. 61 is a diagram showing an example of a template.

As shown in FIG. 61, a template 58 may be stored. The template 58 is data of the album screen 14 in a state where display cells CL for which pictures P to be disposed are not designated are included and only the layout of the display cells CL in the album screen 14 is decided. The album edit unit 32 can store the data of such a template 58 as template data.

In the template 58 shown in FIG. 61, only the pictures PM representing the mark or the character string are disposed, and only the layout and the enlargement size are decided but the pictures P to be disposed are not designated for the display cells CL in which the pictures P are disposed. As in the template 58, the pictures P may be not designated for all the display cells CL in which the pictures P are disposed. In a case where such a template 58 can be stored, it is convenient in a case where the similar postcard is created next time.

Figure 62:
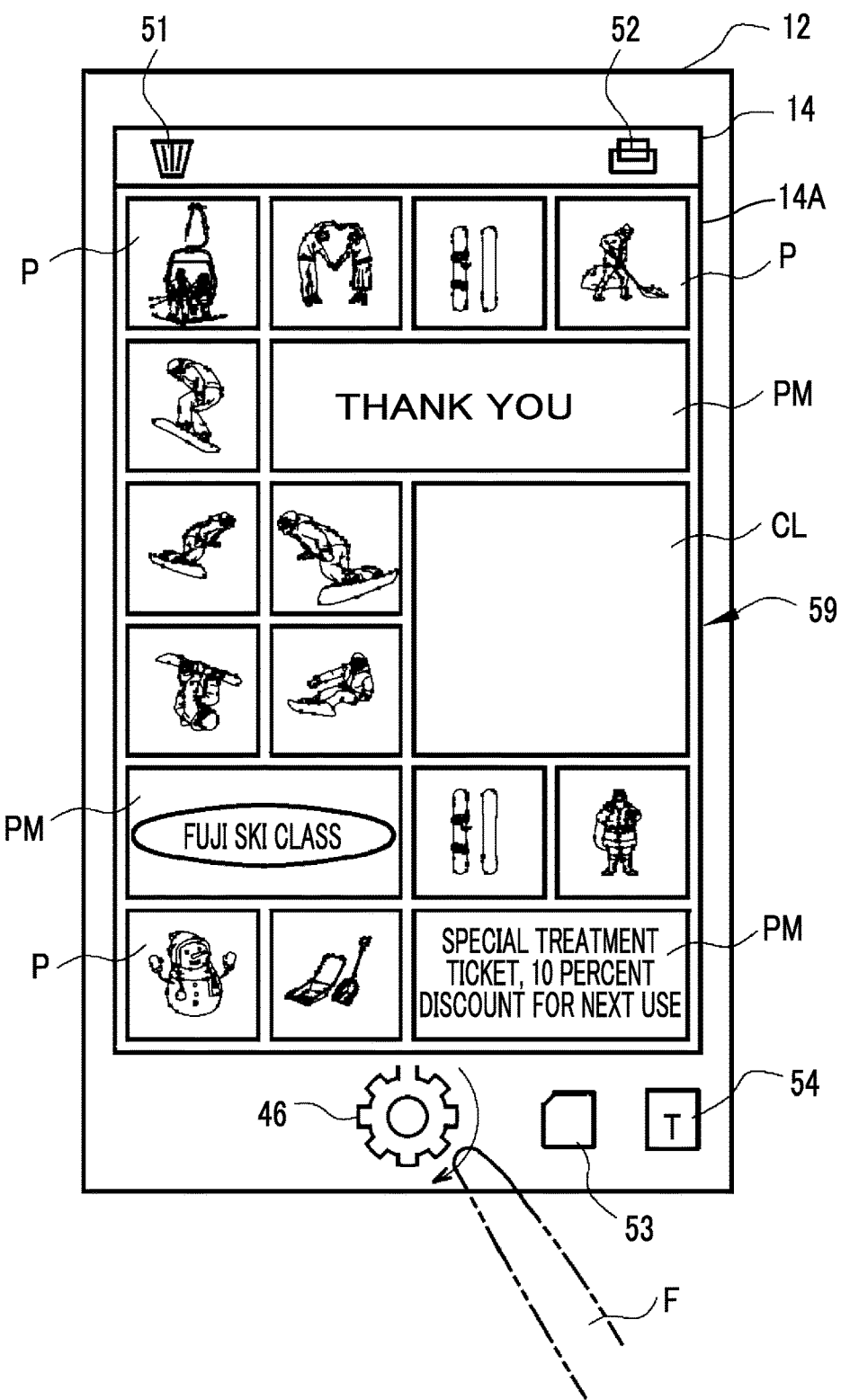
FIG. 62 is a diagram showing another example of the template.

As shown in FIG. 62, a template 59 in which the pictures P to be disposed are designated for some display cells CL and the pictures P to be disposed are not designated for the remaining display cells CL may be stored. In the template 59, the picture P to be disposed is not designated for only one frame of the enlarged display cell CL, and the pictures P to be disposed are designated for the remaining display cells CL. As a use method of the template 59, for example, for the display cells CL for which the pictures P are not designated, different pictures P (for example, face pictures or the like of individual participants) are disposed, for example, for each participant of a destination of the postcard. In a case where such a template 59 can be stored, it is easy to create the postcard with replaced photographs for each participant.

Figure 63:
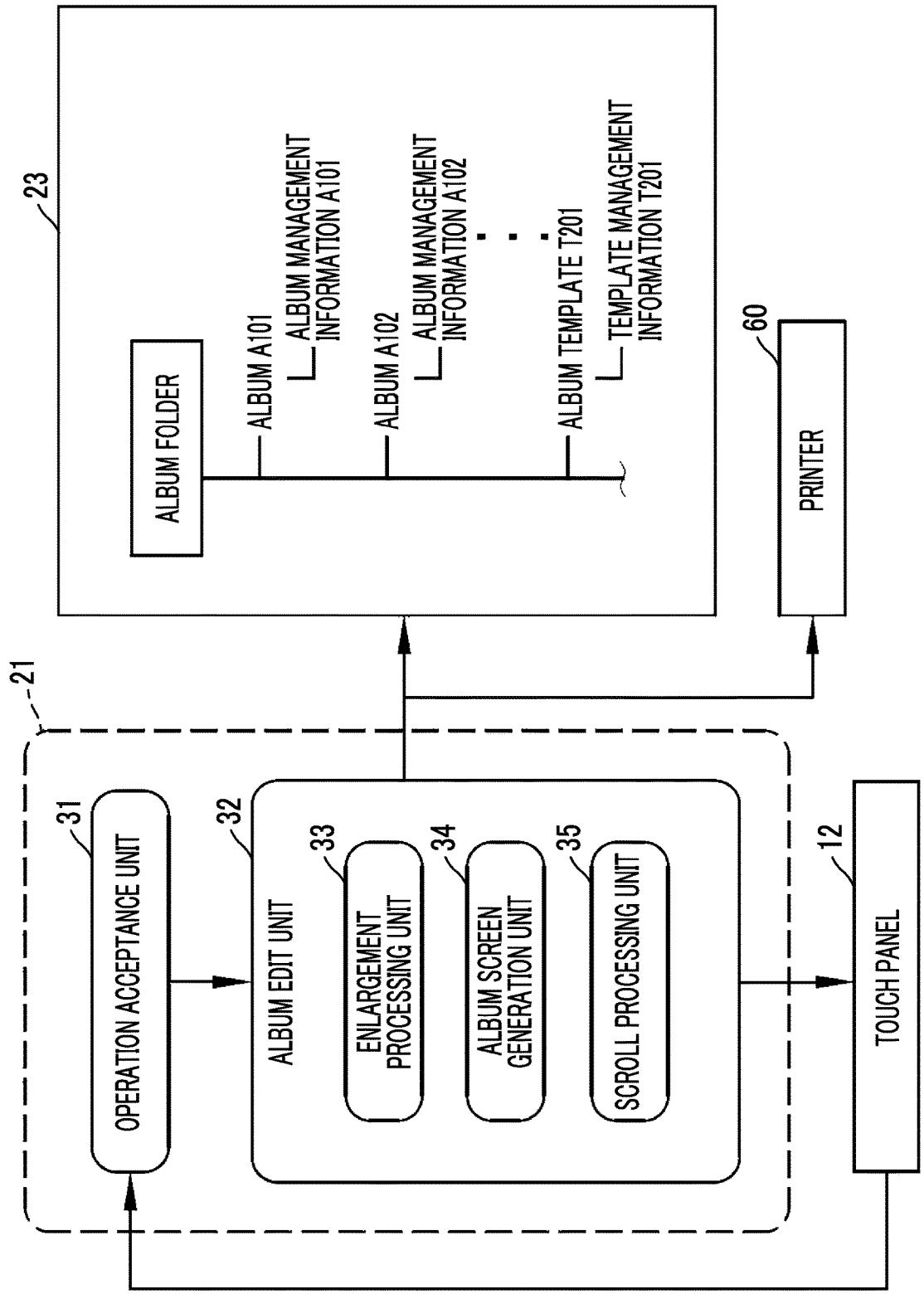
FIG. 63 is a diagram for describing storage of the template and a print function.

As shown in FIG. 63, the template data such as the template 58 and the template 59 is stored in an album folder in the storage device 23 as an album template (T201 in example of FIG. 63). Template management information (T201 in example of FIG. 63) of the album template is data in which the selected picture and the layout information (cell number, size, and the like) are recorded similar to the album management information 30A shown in FIGS. 3 and 9.

Data such as an edited postcard is stored as data of the album including the album management information. The data of the edited postcard is output to a printer 60 to be printed. Of course, the data of the edited postcard may be sent to the destination in a form of an electronic mail.

The execution instruction of the scroll processing of the fourth embodiment may not be accepted through the touch operation and may be accepted, for example, through a mechanical operation unit such as a dial provided in the portable information terminal 10.

The scroll lock of the fourth embodiment is not limited to the album screen 14 which is an example of the picture arrangement screen on which the display cells CL are arranged in the grid shape. For example, the scroll processing is executed on the picture arrangement screen on which the plurality of pictures P are arranged in one row or one column, the scroll lock may be employed.

In the above embodiments, the portable information terminal 10 may be a tablet computer, a notebook personal computer, or the like other than the smartphone.

The example in which a picture storage unit is provided in the storage device 23 of the portable information terminal 10 is described, but the picture storage unit may be disposed in a picture server on a network such as the Internet. In this case, the portable information terminal 10 accesses the picture server via the network to read the picture P.

Figure 64:
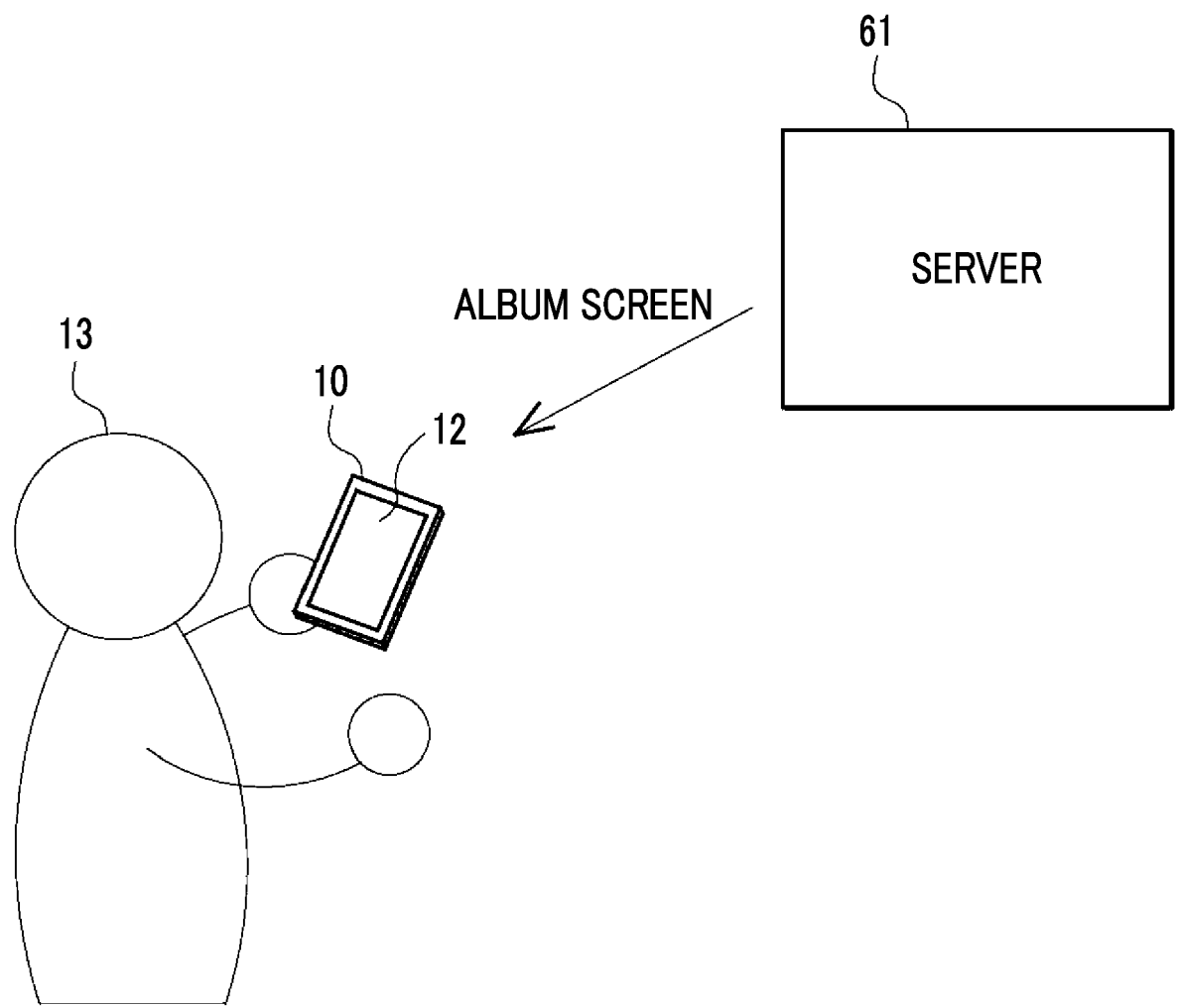
FIG. 64 is an explanatory diagram of a form of using a data processing server.

In the above embodiments, the example in which the portable information terminal 10 functions as the picture display control device, but a data processing server 61 shown in FIG. 64 may function as the picture display control device. The data processing server 61 is a computer, and a basic configuration thereof is the same as that of FIG. 2. Of course, processing capability of a CPU is remarkably high compared with the portable information terminal 10, and capacities of the work memory and the storage device are also remarkably large.

The electronic album application 30 is executed by such a CPU of the data processing server 61 to realize the operation acceptance unit 31, the album edit unit 32, the enlargement processing unit 33, the cell enlargement area determination unit 33A, the album screen generation unit 34, and the scroll processing unit 35. A browser is installed in the portable information terminal 10. The portable information terminal 10 accesses the data processing server 61 through the browser to download the album screen 14 from the data processing server 61. The downloaded album screen 14 is displayed on the touch panel 12.

In a case where the touch operation is performed through the touch panel 12, the portable information terminal 10 transmits the operation instruction to the data processing server 61. The data processing server 61 updates the album screen 14 by executing the album edit processing based on the received operation instruction and distributes the updated album screen 14 to the portable information terminal 10. By doing this, it is possible to cause the data processing server 61 to function as the picture display control device.

The constituent elements may be separated to the portable information terminal 10 and the data processing server 61, such as the operation acceptance unit 31 and the album screen generation unit 34 are provided in the portable information terminal 10 and the remaining is provided in the data processing server 61. In this case, a computer system composed of the portable information terminal 10 and the data processing server 61 functions as the picture display control device.

In each embodiment described above, hardware structures of the processing units executing various pieces of processing, such as the operation acceptance unit 31, the album edit unit 32, the enlargement processing unit 33, the cell enlargement area determination unit 33A, the album screen generation unit 34, and the scroll processing unit 35, are various processors as shown below.

Various processors include a central processing unit (CPU), a programmable logic device (PLD), a dedicated electric circuit, and the like. The CPU is a general-purpose processor that executes software (operating program) to function as various processing units as well known. The PLD is a processor whose circuit configuration can be changed after manufacturing, such as a field programmable gate array (FPGA). The dedicated electric circuit is a processor having a circuit configuration designed specially for executing specific processing, such as an application specific integrated circuit (ASIC).

One processing unit may be composed of one of these various processors or a combination of two or more processors having the same type or different types (for example, combination of a plurality of FPGAs, or CPU and FPGA). A plurality of processing units may be composed of one processor. An example of composing the plurality of processing units with one processor, first, there is a form in which one processor is composed of a combination of one or more CPUs and software and the processor functions as the plurality of processing units. Second, there is a form of using a processor realizing the functions of the entire system including the plurality of processing units with one integrated circuit (IC) chip, as represented by a system on chip (SoC) or the like. As described above, various processing units are composed of one or more processors described above as the hardware structure.

Furthermore, the hardware structure of these various processors is, more specifically, a circuitry combining circuit elements such as a semiconductor element.

From the above description, it is possible to grasp the picture display control device described in the following additional items.

Additional Item B1

A picture display control device comprising:

a screen generation processor that generates a picture arrangement screen on which a plurality of picture display cells in which pictures are disposed frame by frame are arranged in a grid shape and which is displayed on a display unit;

an operation acceptance processor that accepts an execution instruction to perform scroll processing of replacing the picture to be disposed on the picture arrangement screen through a touch operation on an operation unit composed of a graphical user interface; and a scroll processor that executes the scroll processing in a case where the operation acceptance processor accepts the execution instruction, in which the scroll processing is executed by shifting each disposition position of a plurality of pictures frame by frame while an arrangement state of the plurality of picture display cells with respect to the display unit is maintained.

Additional Item C1

A picture display control device comprising:

a screen generation processor that generates a picture arrangement screen on which a plurality of picture display cells in which pictures are disposed frame by frame are arranged and which is displayed on a display unit;

a picture designation acceptance processor that accepts a designation operation to designate the picture disposed at least one picture display cell in the picture arrangement screen;

an operation acceptance processor that accepts an execution instruction to perform scroll processing of replacing the picture to be disposed on the picture arrangement screen; and a scroll processing processor that executes the scroll processing in a case where the operation acceptance processor accepts the execution instruction, in which the scroll processing is executed for other pictures in the picture arrangement screen in a state where a scroll lock for fixing a disposition position in the picture arrangement screen is set to the picture subjected to the designation operation.

Needless to say, the technique of the disclosure is not limited to each embodiment described above, and various configurations may be employed without departing from the scope of the invention. It is also possible to combine various embodiments and various examples described above as appropriate. The technique of the disclosure extends to a computer readable recording medium (USB memory, digital versatile disc (DVD)-read only memory (ROM) or the like) storing the operating program of the picture display control device in a non-transitory manner, in addition to the operating program of the picture display control device.

What is claimed is:

1. A picture display control device comprising:
a processor configured to:

generate a picture arrangement screen on which a plurality of picture display cells in which pictures are disposed frame by frame are arranged and which is displayed on a display, the plurality of picture display cells being arranged in a grid shape on the picture arrangement screen;

accept a designation operation to designate at least one of the pictures disposed on the plurality of picture display cells in the picture arrangement screen;

set the at least one of the pictures in a state where a scroll lock is set for fixing a disposition position in the picture arrangement screen according to the designation operation;

accept an execution instruction to perform scroll processing of replacing the pictures to be disposed in the plurality of picture display cells on the picture arrangement screen; and execute the scroll processing in response to accepting the execution instruction, in which the scroll processing is executed for pictures other than the at least one of the pictures in the picture arrangement screen, wherein the processor performs one-frame scroll to replace the disposition positions of the pictures disposed in the plurality of picture display cells frame by frame in the scroll processing so as to scroll the pictures disposed in the plurality of picture display cells before and after the at least one of the pictures, for which the disposition position in the picture arrangement screen is fixed, according to a feed direction or a return direction of a movement form of the one-frame scroll.

2. The picture display control device according to claim 1, wherein the picture to which the scroll lock is set and other pictures are displayed in an identifiable manner at least during the execution of the scroll processing on the picture arrangement screen.

3. The picture display control device according to claim 1, wherein the processor is further configured to accept the execution instruction to perform the scroll processing through a touch operation on the display unit.

4. The picture display control device according to claim 1, wherein the processor is further configured to edit a picture layout in the picture arrangement screen.

5. The picture display control device according to claim 4, wherein the edit of the picture layout includes at least one of enlargement, deletion, or movement of the picture.

6. The picture display control device according to claim 5, wherein the edit of the picture layout is prohibited for the picture to which the scroll lock is set.

7. The picture display control device according to claim 5, wherein the scroll lock is settable to the enlarged picture.

8. The picture display control device according to claim 7, wherein the scroll lock is set to the enlarged picture in a case where the picture is enlarged.

9. The picture display control device according to claim 4, wherein the picture which is a target of the scroll lock includes a picture representing a mark or a character string in addition to a photograph, and wherein the mark includes at least one of a character, a figure, a pattern, or combinations of two or more items selected among these items.

10. The picture display control device according to claim 1, wherein the processor is further configured to issue an instruction to store the picture arrangement screen as data or an instruction to print the picture arrangement screen.

11. The picture display control device according to claim 10,
wherein the data of the picture arrangement screen is storable as template data in a state where the picture display cell is included and only a layout of the picture display cell in the picture arrangement screen is decided, the picture display cell not being designated for the picture to be disposed therein.

12. The picture display control device according to claim 1,
wherein the processor is further configured to execute the scroll processing by shifting a disposition position of each of the pictures frame by frame while an arrangement state of the plurality of picture display cells on the display unit is maintained.

13. A non-transitory computer-readable storage medium storing an operating program of a picture display control device, the non-transitory computer-readable storage medium containing instructions that cause a processor to:
generate a picture arrangement screen on which a plurality of picture display cells in which pictures are disposed frame by frame are arranged and which is displayed on a display, the plurality of picture display cells being arranged in a grid shape on the picture arrangement screen;
accept a designation operation to designate at least one of the pictures disposed on the plurality of picture display cells in the picture arrangement screen;
set the at least one of the pictures in a state where a scroll lock is set for fixing a disposition position in the picture arrangement screen according to the designation operation;
accept an execution instruction to perform scroll processing of replacing the pictures to be disposed in the plurality of picture display cells on the picture arrangement screen; and
execute the scroll processing in response to accepting the execution instruction, in which the scroll processing is executed for pictures other than the at least one of the pictures in the picture arrangement screen,
wherein the processor performs one-frame scroll to replace the disposition positions of the pictures disposed in the plurality of picture display cells frame by frame in the scroll processing so as to scroll the pictures disposed in the plurality of picture display cells before and after the at least one of the pictures, for which the disposition position in the picture arrangement screen is fixed, according to a feed direction or a return direction of a movement form of the one-frame scroll.

14. An operating method of a picture display control device comprising:
a screen generation step of generating a picture arrangement screen on which a plurality of picture display cells in which pictures are disposed frame by frame are arranged and which is displayed on a display, the plurality of picture display cells being arranged in a grid shape on the picture arrangement screen;
a picture designation acceptance step of accepting a designation operation to designate at least one of the pictures disposed on the plurality of picture display cells in the picture arrangement screen;
a scroll lock setting step of setting the at least one of the pictures in a state where a scroll lock is set for fixing a disposition position in the picture arrangement screen according to the designation operation;
an operation acceptance step of accepting an execution instruction to perform scroll processing of replacing the pictures to be disposed in the plurality of picture display cells on the picture arrangement screen;
a scroll processing step of executing the scroll processing in response to accepting the execution instruction in the operation acceptance step, and executing the scroll processing for pictures other than the at least one of the pictures in the picture arrangement screen; and
a one-frame scroll step of performing one-frame scroll to replace the disposition positions of the pictures disposed in the plurality of picture display cells frame by frame in the scroll processing so as to scroll the pictures disposed in the plurality of picture display cells before and after the at least one of the pictures, for which the disposition position in the picture arrangement screen is fixed, according to a feed direction or a return direction of a movement form of the one-frame scroll.

\* \* \* \* \*